(12) United States Patent
Mizusawa

(10) Patent No.: US 7,419,374 B2
(45) Date of Patent: Sep. 2, 2008

(54) RICE-BALL MAKING IMPLEMENT

(76) Inventor: Toshihide Mizusawa, 61-34-2, Saki, Mikuni-cho, Sakai-gun, Fukui-ken (JP) 913-0065

( * ) Notice: Subject to any disclaimer, the term of this patent is extended or adjusted under 35 U.S.C. 154(b) by 0 days.

(21) Appl. No.: 11/665,758

(22) PCT Filed: Oct. 18, 2005

(86) PCT No.: PCT/JP2005/019134

§ 371 (c)(1),
(2), (4) Date: Apr. 19, 2007

(87) PCT Pub. No.: WO2006/043560

PCT Pub. Date: Apr. 27, 2006

(65) Prior Publication Data

US 2007/0292553 A1    Dec. 20, 2007

(30) Foreign Application Priority Data

Oct. 20, 2004    (JP)    .............. 2004-305814

(51) Int. Cl.
*B28B 3/00*    (2006.01)
*A23P 1/00*    (2006.01)

(52) U.S. Cl. ............... 425/318; 425/340; 426/512

(58) Field of Classification Search .............. 425/318, 425/340; 249/DIG. 1; 426/512
See application file for complete search history.

(56) References Cited

U.S. PATENT DOCUMENTS 3,836,308 A * 9/1974 Upright ................. 425/318
4,163,639 A * 8/1979 Stern et al. .............. 425/318

FOREIGN PATENT DOCUMENTS

| JP | 64-49093 U | 3/1989 |
| JP | 8-140602 | 6/1996 |
| JP | 10-70963 | 3/1998 |
| JP | 2004-147504 | 5/2004 |

* cited by examiner

*Primary Examiner*—Yogendra Gupta
*Assistant Examiner*—Maria Veronica D Ewald
(74) *Attorney, Agent, or Firm*—Ronald E. Greigg

(57) ABSTRACT

To provide a rice-ball making implement by which a properly compacted and good-looking rice ball in a state of being packed can be made easily. Two containers (3), (3) are connected to be openable/closeable by the intermediary of a bend part (5). The container (3) comprises a base element (9) and a standing wall (10) formed on the outer peripheral edge of one side of the base element (9) in a protruding manner. Height of an upper edge of each of two side-part standing walls (16), (16) constituting the standing wall (10) is made to become gradually larger toward the front end. When the two containers (3) (3) are bent in a manner of closing them, a side-part standing wall (16*a*) and a front-end standing wall (19*a*) of one container (3*a*) overlaps an inside of a side-part standing wall (16*b*) and an inside of a front-end standing wall (19*b*) of the other container (3*b*).

16 Claims, 83 Drawing Sheets

PRIOR ART

PRIOR ART

PRIOR ART

PRIOR ART

PRIOR ART

RICE-BALL MAKING IMPLEMENT

FIELD OF THE ART

This invention relates to a rice-ball making implement by which a foodstuff like rice, mashed potatoes or bean curd lees can also be compacted to make a ball.

BACKGROUND OF THE INVENTION

To make the rice ball, in general, a predetermined amount of rice is held and compacted by hands to shape it into a triangular prism, a sphere, etc. However, there are the problems that weighing rice sensuously and fixing the shape are unexpectedly difficult and that the rice adheres to hands, which is troublesome.

In view of the problems, the inventor of this invention suggested, in the patent application Ser. No. 2004-117704, a rice-ball making implement (b) for making a rice ball, as shown in FIGS. 78 and 80, in which two containers (a), (a) with the opened tops are openably/closeably connected to each other, and the two containers (a), (a) are structured to show a substantially axisymmetric arrangement in the opened-up state. To explain the rice-ball making implement (b) more specifically, each of the containers (a), (a) comprises a base element (c) and a standing wall (d) with a predetermined height provided to protrude from an outer periphery of one side of the base element (c) so that the base element (c) and the standing wall (d) may form a containing part (f) for putting the foodstuff like the rice (e). Edge parts of facing standing wall parts (g), (g) of the right and left containers (a), (a) are connected to each other by a bend part (h). When the implement is bent at the bend part (h) in a manner of closing the two containers (a), (a), opening ends (a1), (a1) of the containers (a), (a) substantially meet, as shown in FIG. 81.

According to the rice-ball making implement, the foodstuff like the rice is placed in the two containers (a), (a) and the implement is bent at the bend part (h) in a manner of closing the two containers (a), (a). Thus, there is an advantage that the rice ball with an intended shape can be made hygienically without touching the foodstuff directly by hand.

To make the rice ball using the rice-ball making implement, the two containers (a), (a) are set to be in an opened-up state, a film-like object 0) is spread thereon, and the film-like object (j) is pressed into the containing parts (f) to form containing recesses (k), (k), as shown in FIG. 79. Then, as shown in FIG. 79, for example, a filling (n) is placed on bottom faces (m), (m) of the containing recesses (k), (k), and as shown in FIG. 80, the rice (e) is placed in the containing recesses (k), (k) in a manner that the upper face (p) of the rice (e) is heaped up to be slightly higher than an upper edge (q) of the standing wall (d). The reason why the upper surface (p) is made to be slightly higher is that the heaped-up part generates a pressurization force when the two containers (a), (a) are bent at the bend part (h), as shown in FIG. 81, and the rice ball which is properly compacted can be made by making the opening ends (a1), (a1) of the two containers (a), (a) substantially meet, as shown in FIG. 82.

However, there are problems in the conventional implement as mentioned below. Namely, since the upper surfaces (p), (p) of the rice (e) is made to be higher than the upper edge (q) of the standing wall when the rice (e) is placed in the two containers (a), (a), in the initial stage of bending the containers (a), (a) at the bend part (h), base-end-side parts (e 1), (e 1) (the part on the side of the bend part (h)) of the rice (e) contained in the containers (a), (a) come into contact with each other first, as shown in FIG. 83. In this state, the facing standing walls (d), (d) of the containers (a), (a) are open widely. After that, the containers (a), (a) are bent further at the bend part (h), however, as they are bent, the contained rice (e), (e) are gradually pressed by the bent containers (a), (a) from the facing side. As the rice is thus pressed, the facing standing walls (d), (d) of the containers (a), (a) come closer to each other and the rice is compacted gradually, when the rice (e) is apt to come out of a joint part (s) (FIGS. 81 and 83) of the facing standing walls (d), (d). It is troublesome to compacting the entire rice ball while carefully pressing the coming-out rice into the containers with fingers.

Since the height of the heap of the rice has to be estimated visually, there is a problem that the rice ball becomes soft when the heap is low and the rice cannot be sufficiently compacted. When the heap is high, since the amount of rice coming out of the joint part (s) of the standing walls (d), (d) becomes large when the containers (a), (a) are bent, it is difficult to press the coming-out rice into the container and is difficult to make the rice ball. In addition, the rice, which cannot be pressed into protrudes from a side face (u) of the rice ball (t), as shown by a code (t1) in FIG. 84, and the appearance of the rice ball is spoiled.

In the paragraph 0083 of the specification of the above-mentioned patent application, the rice-ball making implement as shown in FIGS. 85 and 86 is described, in which a size of the container (a2) is made to be slightly larger than that of the other container (a1) and a height of the standing wall (d) of the container (a2) is made to be slightly larger than that of the container (a1) so that a front side part (d1) of the standing wall (d) comprising the container (a1) may fit into the containing part (f) of the container (a2). According to this rice-ball making implement, since a front side part (d1) of the standing wall (d) of the container (a1) enters into the containing recess (k) of the other container (a2) while the rice existing in an upper part (the higher part of the standing wall (d)) of the standing wall of the container (a2) generates the pressurization force when the implement is bent at the bend part (h) in a manner of closing the container (a1), (a2) having the rice inside, as shown in FIG. 86, the compaction of the rice ball may be obtained by this entering action. However, since the entire standing walls (d), (d) comprising the containers (a1), (a2) protrude to the even height, when the containers (a1), (a2) containing the rice (e) to the same level as the upper edges of the standing walls are bent at the bend part (h) in a manner of closing them, as shown in FIG. 87, in the initial stage of bending, the base-side parts (e1), (e1) (the parts on the side of the bend part (h)) of the upper faces (p), (p) of the rice (e) come into contact with each other first, similarly to the above-mentioned case, as shown in FIG. 88. In this state, the facing standing walls (d), (d) of the containers (a), (a) are open widely. Therefore, similarly to the above-mentioned case, it is troublesome to compacting the entire rice ball carefully so that the rice may not come out of the joint part (s) of the facing standing walls. Even when the rice ball is compacted carefully like this, it is unavoidable that the rice comes out of the joint part (s), whereby it is difficult to make the rice ball having a good appearance.

An implement (w) for rolling rice with a layer sheet is suggested in the patent publication No. 64-49093, in which edges of rolling cylinder parts (t1), (t2) having a half-circular shape in cross section are connected by a hinge (u), and an insertion plate (v) for inserting one end of a layer sheet is mounted on a front end of the rolling cylinder part (t1), as shown in FIG. 89.

To form a sushi-roll by using the implement (w) for rolling rice with the layer sheet, the layer sheet (i) is laid along the inside of the rolling cylinder parts (t1), (t2) in its opened-up state, as shown in FIG. 89, one end of the layer sheet (i) is inserted into the insertion plate (v), vinegared rice (x) is placed in the rolling cylinder parts (t1), (t2) in its opened-up state, and a favorite filling (y) is placed in a center part of the other rolling cylinder part (t2). Then, as shown in FIG. 90, the rolling cylinder parts (t1), (t2) containing the vinegared rice (x) and the filling (y) are rolled up to make the sushi-roll. However, since both side ends (z), (z) of the rolling cylinder parts (t1), (t2) are open, a binding force is difficult to obtain when the rolling cylinder parts (t1), (t2) are rolled up and the vinegared rice (x) is compacted, which causes the problem of insufficient compacting. When the vinegared rice (x) is strongly compacted by force, it comes out of the open ends of the cylindrical part formed by the rolling, and there arises a problem that the sushi-roll is deformed wherefore the sushi-roll with good appearance cannot be made. Patent Document 1: Patent Publication No. 64-49093 (Pages 3 to 5, FIGS. 3 and 6)

DISCLOSURE OF THE INVENTION

This invention is developed in view of the above-mentioned problems. A purpose of the invention is to provide a rice-ball making implement by which a properly compacted and good-looking rice ball can be made easily.

To solve the above-mentioned problems, this invention adopts the following means. Namely, in the first aspect of the rice-ball making implement according to this invention, the rice-ball making implement comprises two containers having opened tops and being connected to each other to be openable/closeable. Each of the containers comprises a base element, standing walls with necessary heights projecting from outer peripheral edges of one side of the base element. A containing part is formed between the base element and the standing walls to contain the foodstuff. The upper edges of facing base-end standing walls of the two containers are interconnected by a bend part. A height of each of upper edges of two side-part standing walls of the containers extending from both ends of a base-end standing wall toward the front-side is set to be substantially the same as that of the upper edge of the base-end standing wall near the base end but the height gradually increases toward the front end. The heights of the front ends of the upper edges of the two side-part standing walls are set to be substantially the same. The front ends of the two side-part standing walls are connected by a front-end standing wall. A height of the upper edge of the front-end standing wall is set to be substantially the same as that of the front ends of the upper edges of the side-part standing walls. One of the container is made to be slightly larger than the other container so that the side-part standing walls and the front-end standing wall of the latter container may overlap with insides of the side-part standing walls and the front-end standing wall of the former container (but not necessarily overlap entirely) when the two containers are bent at the bend part in a manner of closing them.

In the second aspect of the rice-ball making implement according to this invention, the rice-ball making implement comprises two containers having opened tops and being connected to each other to be openable/closeable. Each of the containers comprises the base element, the standing walls with a necessary height projecting from the outer peripheral edges of one side of the base element. A containing part is formed between the base element and the standing walls to contain the foodstuff. The upper edges of the facing base-end standing walls of the containers are connected to each other by the bend part. The height of the upper edges of the two side-part standing walls extending from both ends of a base-end standing wall toward a front-side of the container is set to be substantially the same as that of an upper edge of the base-end standing wall near the base end but the height gradually increases toward the front end. The heights of the front ends of the upper edges of the two side-part standing walls are set to be substantially the same. The front ends of the two side-part standing walls are connected by a front-end standing wall. A height of the upper edge of the front-end standing wall is set to be substantially the same as that of the front ends of the upper edges of the side-part standing walls. One of the container is made to be slightly larger than the other container so that the side-part standing walls and the front-end standing wall of the latter container may overlap with the insides of the side-part standing walls and the front-end standing wall of the former container when the two containers are bent at the bend part in a manner of closing them.

In the third aspect of the rice-ball making implement of this invention, the rice-ball making implement comprises two containers having opened tops and being connected to each other to be openable/closeable. Each of the containers has standing walls with necessary heights projecting from the outer peripheral edges of one side of the base element. The containing part is formed between the base element and the standing walls to contain the foodstuff. The upper edges of the facing base-end standing walls of the two containers are connected to each other by the bend part. The height of each of the upper edges of the two side-part standing walls extending from both ends of the base-end standing wall toward the front-side is set to be substantially the same as that of the upper edge of the base-end standing wall near the base end but the height gradually increases toward the front end. The heights of the front ends of the upper edges of the two side-part standing walls are set to be substantially the same. Front ends of the two side-part standing walls are connected to each other. One of the containers is made to be slightly larger than the other container so that the side-part standing walls of the latter container may overlap with the insides of the side-part standing walls of the former container (but not necessarily overlap entirely) when the two containers are bent at the bend part in a manner of closing them.

In the fourth aspect of the rice-ball making implement of this invention, the rice-ball making implement comprises two containers having opened tops and being connected to each other to be openable/closeable. Each of the containers comprises the base element, the standing walls with the necessary height projecting from the outer peripheral edges of one side of the base element. A containing part is formed between the base element and the standing walls to contain the foodstuff. The upper edges of the facing base-end standing walls of the containers are connected to each other by the bend part. The heights of the upper edges of the two side-part standing walls extending from both ends of the base-end standing wall toward the front-side of the container are set to be substantially the same as that of the upper edge of the base-end standing wall near the base end but the heights gradually increase toward the front end. The heights of the front ends of the upper edges of the two side-part standing walls are set to be substantially the same. The front ends of the two side-part standing walls are connected to each other. One of the containers is made to be slightly larger than the other container so that the side-part standing walls of the latter container may overlap with the insides of the side-part standing walls of the former container (but not necessarily overlap entirely) when the two containers are bent at the bend part in a manner of closing them.

In each of the above-mentioned rice-ball making implements, the heights of the upper edges of the base-end standing walls of the two containers are set to be substantially the same, and the heights of the upper edges of the side-part standing walls gradually increase from the base end toward the front end. In the rice-ball making implement, the front ends of the upper edges of the side-part standing walls are preferably set to be twice as tall as the base-end standing wall.

In the fifth aspect of the rice-ball making implement of this invention, the rice-ball making implement comprises two containers having opened tops and being connected to each other to be openable/closeable. Each of the containers comprises a half-circular-arc-shaped base element bent to form the half-circular arc shape, side elements for closing two end-opening parts on both sides of the base element, respectively, so that the containing part for containing the foodstuff may be formed between the base element and the side elements. The bend part connects the base ends of the base elements to each other. The height of the upper edges of the side elements of the two containers gradually increases from the base end toward the front end. One of the containers is made to be slightly larger than the other so that the front-side part of the base element and the two side elements of the latter container may overlap the insides of the front-side part and the two side elements of the former container (but not necessarily overlap entirely) when the two containers are bent at the bend part in a manner of closing them.

In the sixth aspect of the rice-ball making implement of this invention, the rice-ball making implement comprises two containers having opened tops and being connected to each other to be openable/closeable. Each of the containers comprises the half-circular-arc-shaped base element bent to form the half-circular arc shape, and the side elements for closing the two end-opening parts on both sides of the base element, respectively, so that the containing part for containing the foodstuff may be formed between the base elements and the side elements. The bend part connects the base ends of the base elements to each other. The height of the upper edges of the side elements of one of the containers gradually increases from the base end toward the front end. The container is made to be slightly larger than the other so that the front-side part and the two side elements of the latter container may overlap the insides of the front-side part and the two side elements of the former container (but not necessarily overlap entirely) when the two containers are bent at the bend part in a manner of closing them.

In each of the first to fourth aspects, a slit is preferably formed in a connecting part of the base element and the standing wall. In each of the fifth and sixth aspects, a slit is preferably formed in a connecting part of the base element and the side element.

This invention offers the following advantages.

(1) In the rice-ball making implement of this invention, the heights of the upper edges of the side-part standing walls of one or both of the two containers connected to each other by the bend part at the upper edges of the facing base-end standing walls are formed to gradually increase from the base end to the front end. Each of the containers has a compression containing part which constitutes the upper part higher than the upper edge of the base end of the side part standing walls. Alternatively, the heights of the upper edges of the side elements of one or both of the containers, being connected to each other by the bend part at the base-end edges of the half-circular-arc-shaped base elements, to close both end opening of the base elements gradually increase from the base end to the front end. Each of the containers has a compression containing part which constitutes the upper part higher than the base end of the side part standing walls.

Consequently, according to the rice-ball making implement of this invention, the foodstuff like the rice contained in the two containers is compacted in a state of being bound by the box-like containing body formed by the two containers, as one of the containers enters into the other container. The compressed foodstuff contained in the compression containing part generates the pressurization force when the foodstuff is compacted. The foodstuff is compacted at the front-side part of the box-like containing body by the pressurization force. As the density of the foodstuff at the front-side part becomes higher, the foodstuff moves from the front-side part to the base-end side in the box-like containing body, whereby the rice ball which is compacted properly can be made.

(2) Since the container has a compression containing part for increasing the pressure inside the box-like containing body, as mentioned above, the rice ball can be compacted surely and without difficulties only by placing the foodstuff like the rice in the containers to the level of the upper edge of the containing recesses.

Such compaction can be carried out because the entire upper faces of the rice in the two containing recesses come into contact with each other and the upper edges of the facing side-part standing walls are closed when the rice-ball making implement is bent at the bend part in a manner of closing the two containers after the foodstuff is placed to the level of the upper edges of the containers. As one of the containers enters into the other container in this state, the facing side-part standing walls gradually overlap each other over the entire length, whereby the compressed rice hardly comes out and is compacted properly in a state of being firmly bound by the two containers.

The conventional rice-ball making implement has the difficulty in compacting the rice ball that attention should be paid so that the rice contained in the two containers may not come out of the joint part of the facing side-part standing walls. However, the problem is solved by this invention.

(3) In the rice-ball making implement of this invention, each of the containers has a compression containing part which constitutes the upper part higher than the upper edge of the base end of the side part standing walls, or the compression containing part constituting the upper part higher than the base ends of the side elements. Therefore, the state of proper compaction of the entire rice ball can be obtained only by placing the foodstuff to the level of the upper edges of the containing recess, whereby the problem in the conventional rice-ball making implement, that the rice have to heaped up in the container by visual estimation and the properly-compacted rice ball is difficult to make without fail, can be solved.

(4) The heights of the upper edges of the side-part standing walls of the container gradually increase from the base end toward the front end. By closing the two containers until the upper edge of the front-end standing wall or the upper end of the joint part of the front ends of the two side-part standing walls of the container abuts on the bottom face of the other container, the rice ball, which is always compacted into a substantially invariable shape with a substantially invariable hardness, can be made. In addition, when the compaction is stopped before the upper edge or the upper end abuts on the bottom face of the other container, a softer rice ball can be made according to preference.

FIRST EMBODIMENT

The rice-ball making implement 1 shown in FIGS. 1 to 4 is made of a material like plastic or paper having the stiffness and flexibility sufficient for pressing and compacting the rice from the outside to make a rice ball. In this embodiment, the implement 1 is formed by means of integral plastic molding. Two containers 3, 3 with their upper ends 2 open viewed in the opened-up state are connected in an openable/closeable manner by a bend part 5, and the two containers 3, 3 are formed to present a substantially axisymmetric arrangement in the opened-up state. The rice-ball making implement made by the paper is disposable, and the plastic implement can be reused repeatedly.

Figure 1:
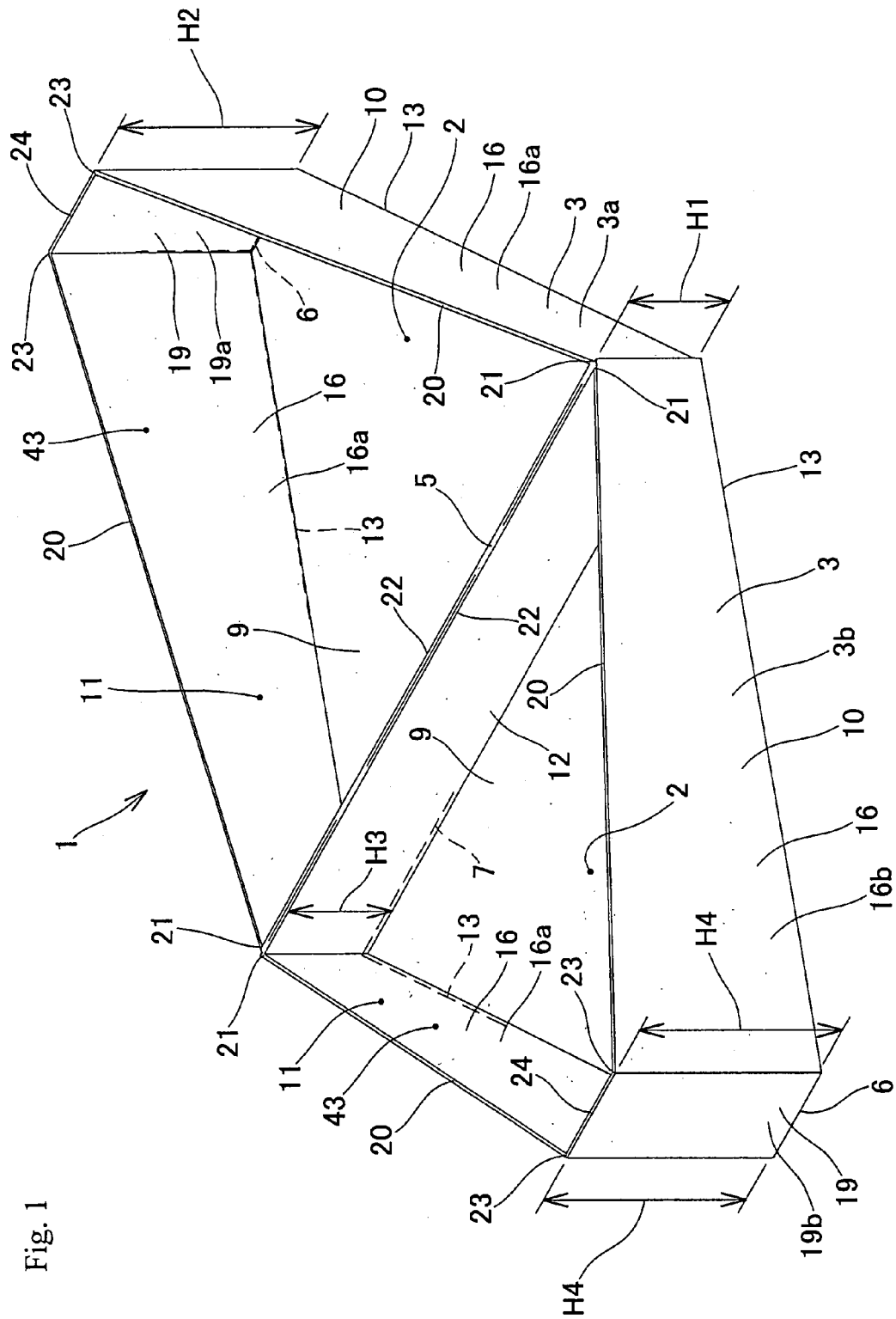
FIG. 1 is a perspective view showing the rice-ball making implement related to the invention.
Figure 2:
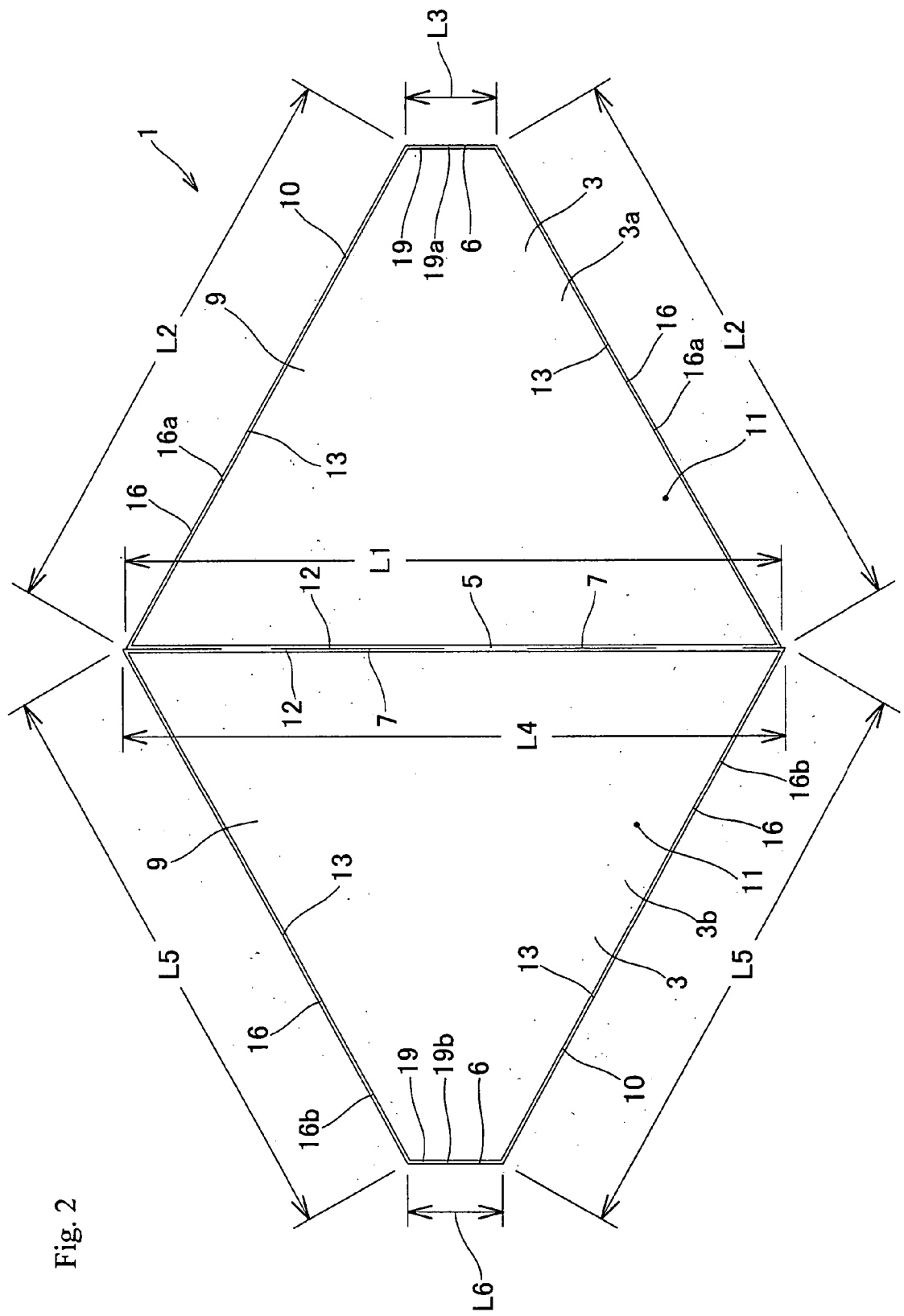
FIG. 2 is a plan view showing both of the containers in the expanded state.
Figure 3:
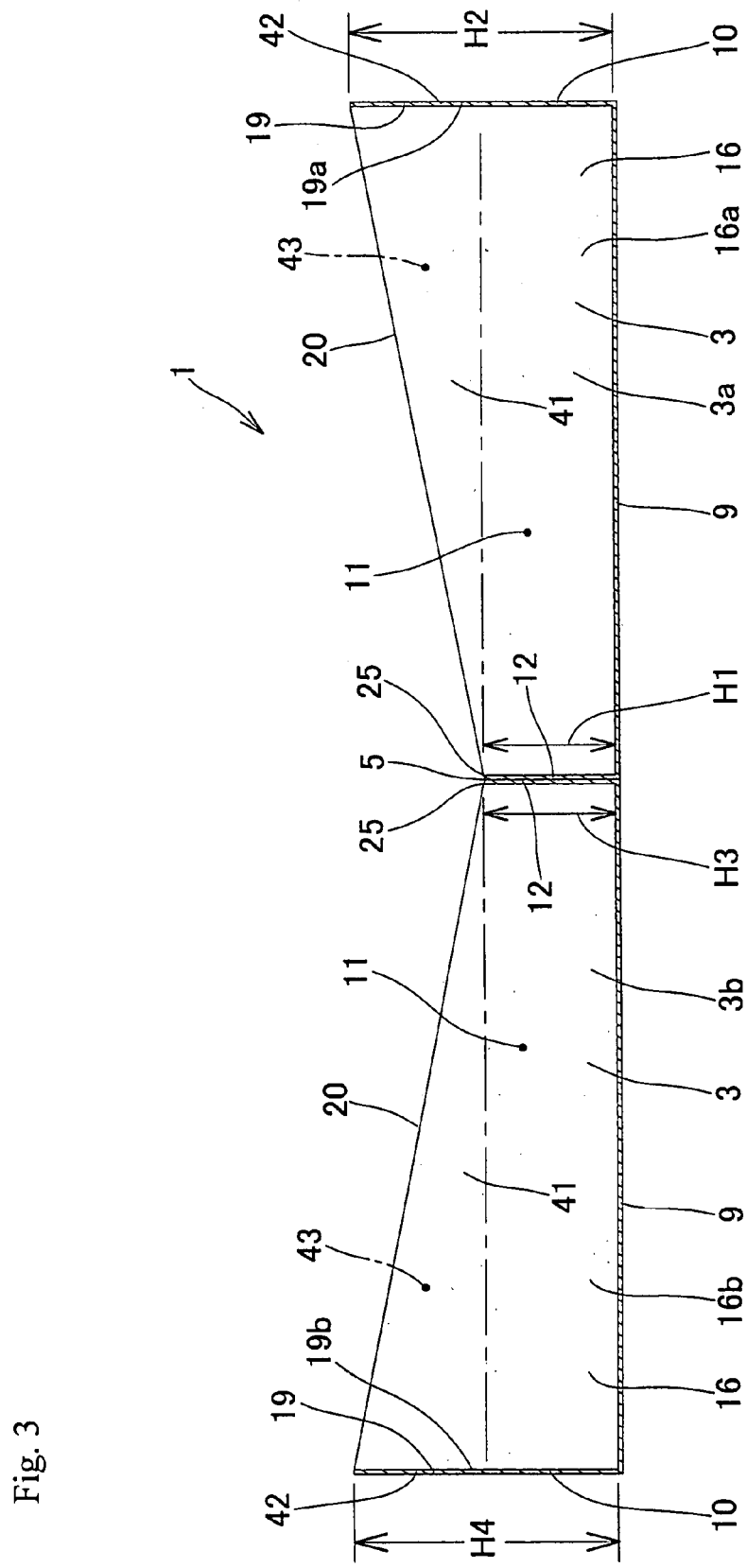
FIG. 3 is a cross sectional view of the containers.
Figure 4:
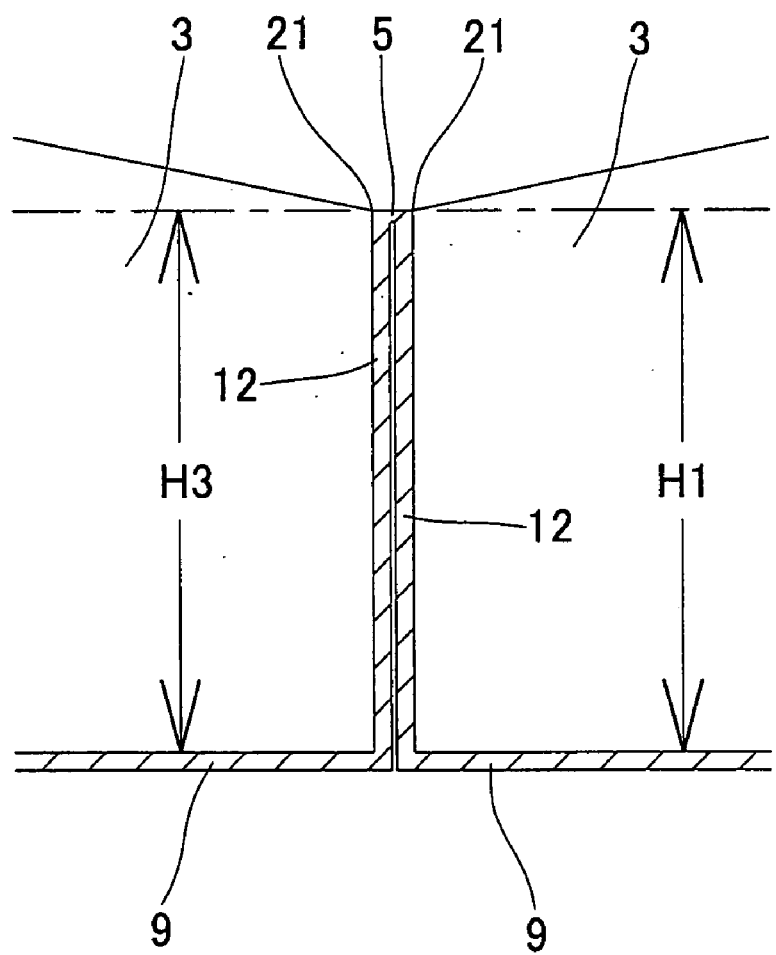
FIG. 4 is a partly enlarged view of the containers.

In this embodiment, the container 3 is triangular-shaped in plan view as shown in FIG. 2. A base element 9 is a substantially regular triangle in which a short front-end side 6 is in parallel with a long base-end side 7. A standing wall 10 is provided in a protruding manner around the entire outer periphery on one side of the base element 9. As shown in FIGS. 1 to 3, a containing part 11 for containing a foodstuff like rice is formed between the base element 9 and the standing wall 10.

The standing wall 10 comprises, as shown in FIGS. 1 to 3, a base-end standing wall 12 standing on the base-end side 7 of the base element 9, side-part standing walls 16, 16 standing on two sides 13, 13 of the base element 9 in a manner of extending from both ends of the base-end standing wall 12 to the front side, and a front-end standing wall 19 standing on the front-end side 6 of the base element 9 in a manner of connecting front ends of the side-part standing walls 16, 16.

A height of the base-end standing wall 12 is a half of that of the rice ball to be made. A height of upper edges of the two side-part standing walls 16, 16 is the same as an upper edge 22 of the base-end standing wall 12 at their base ends 21, 21, and gradually become higher toward the front ends 23, 23. The front ends 23, 23 are substantially twice as high as the base end 21 of the upper edge 20, and has substantially the same height as that of the upper edge 24 of the front-end standing wall 19.

Figure 5:
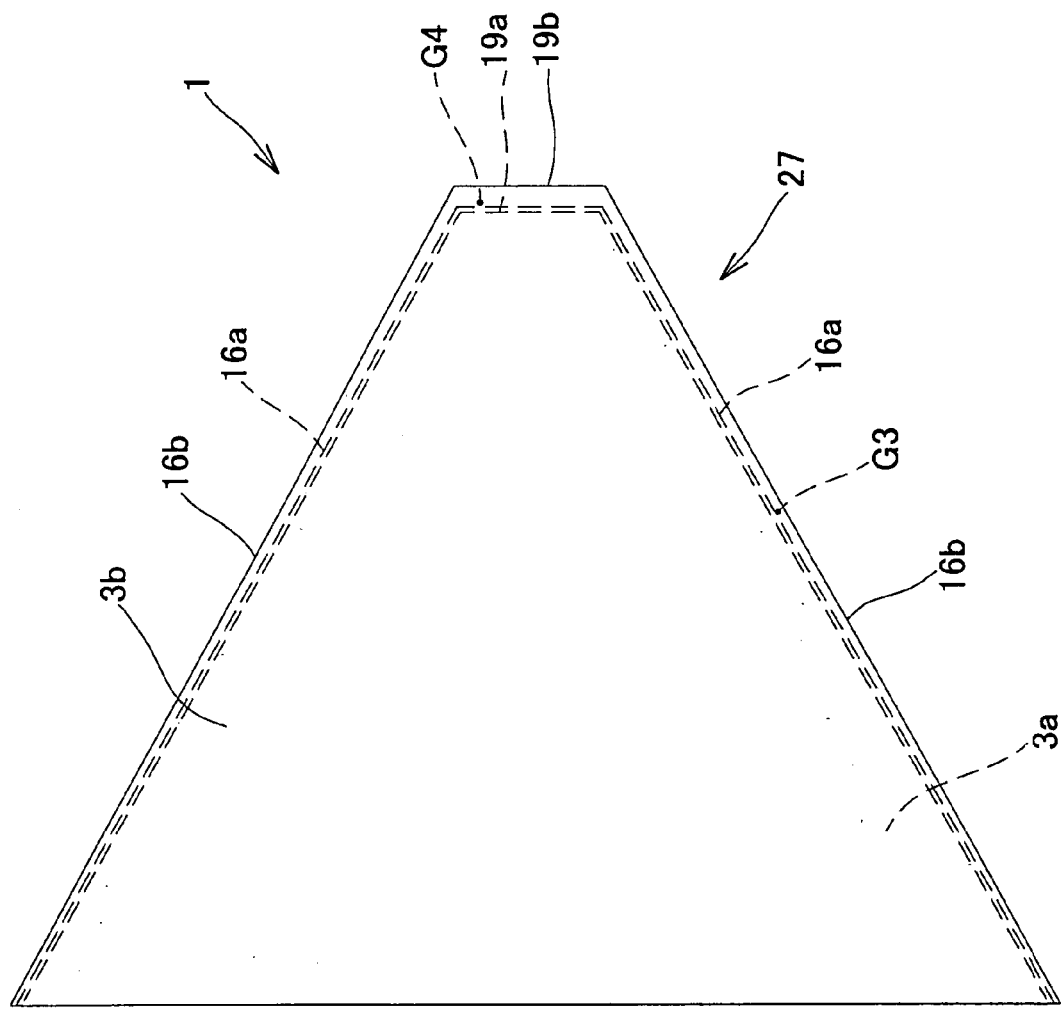
FIG. 5 is a plan view of the containers in the closed state.

In the two containers 3, 3 structured as mentioned above, the upper edges 22, 22 of the base-end standing walls 12, 12 are connected to each other by the bend part 5. The size of the container 3b is made to be slightly larger than the other container 3a so that the side-part standing walls 16a, 16a and the front-end standing wall 19a may overlap the insides of the side-part standing walls 16b, 16b and the front-end standing wall 19b of the container 3b when the containers 3, 3 are bent at the bend part 5 in a manner of closing them, as shown in FIG. 5.

To exemplify the dimension of each part of the rice-ball making implement 1 having the structure as mentioned above, the length L1 of the base-end side 7 of the base element 9 of the container (also referred to as the "inner container" hereinafter) 3a is set to be 90 mm, the lengths L2, L2 of the two sides 13, 13 are set to be 78.4 mm, respectively, and the length L3 of the front-end side 6 is set to be 12.5 mm. The height H1 of the upper edge 22 of the base-end standing wall 12 is set to be 13.5 mm. The heights of the front ends 23, 23 of the upper edges 20, 20 of the side part standing walls 16, 16, and the height H2 of the upper edge 24 of the front-end standing wall 19 are set to have the same height of 27.0 mm. As for the other container (also referred to as the "outer container" hereinafter) 3b, the length L4 of the base-end side 7 of the base element 9 is set to be 91.0 mm, and the lengths L5, L5 of the two sides 13, 13 are set to be 80.1 mm, respectively. The length L6 of the front-end side 6 is set to be 13.1 mm. The height H3 of the upper edge 22 of the base-end standing wall 12 is set to be 13.5 mm, and the height of the side part standing walls 16, 16, the heights of the front ends 23, 23 of the upper edges 20, 20 and the height H4 of the upper edge 24 of the front-end standing wall 19 are set to have the same height of 27.0 mm.

Figure 6:
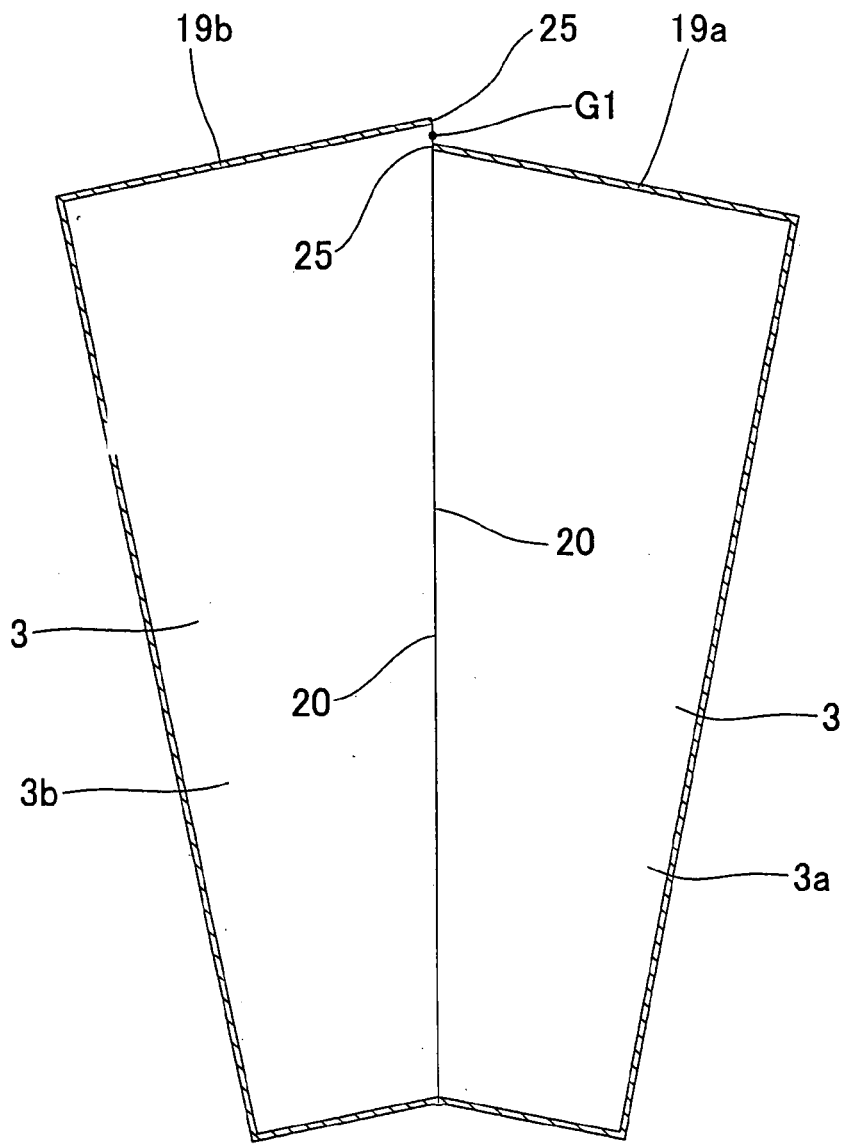
FIG. 6 is a cross sectional view of the containers which are bent to have the state that opened tops of the containers meet.
Figure 6:
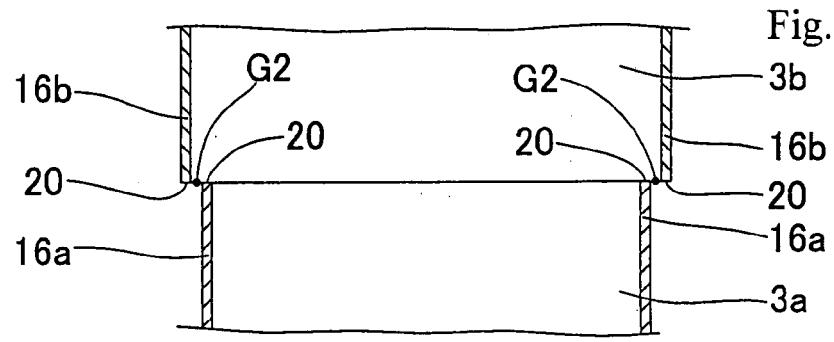
Figure 7:
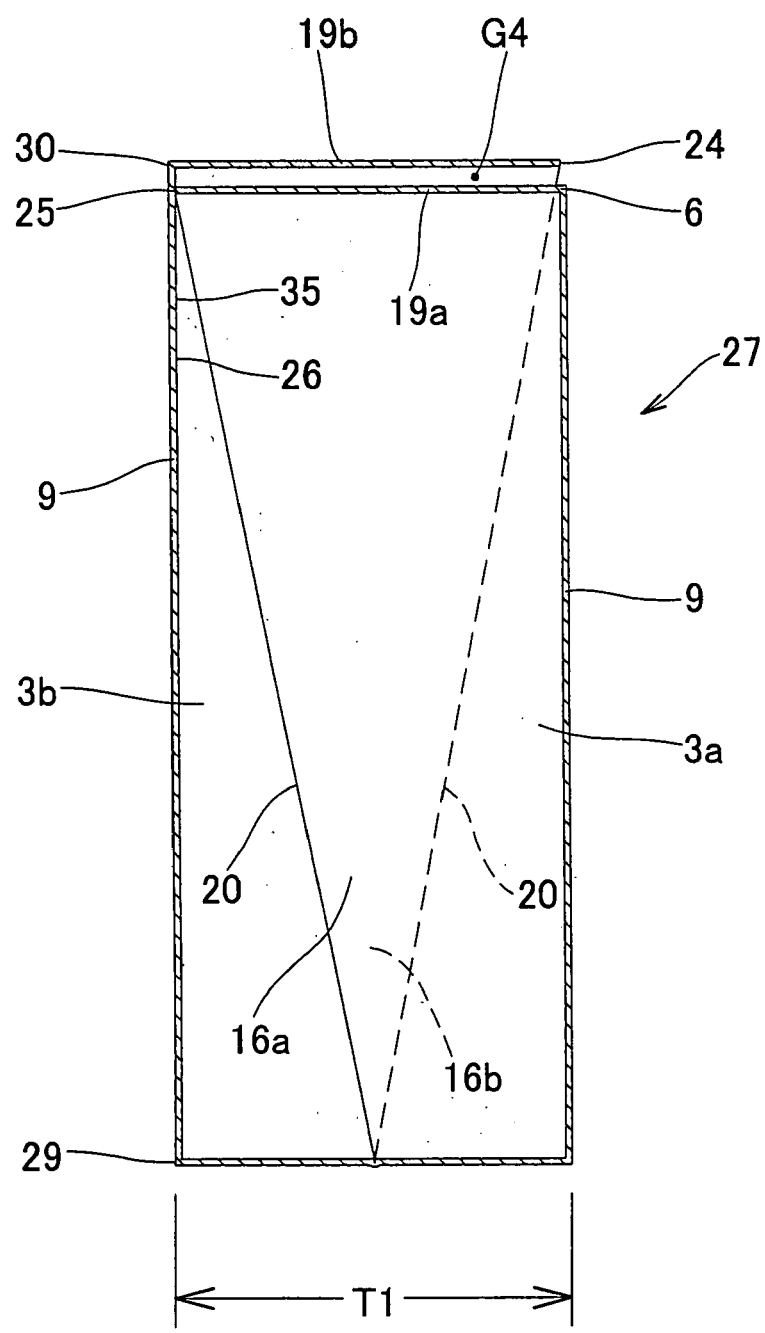
FIG. 7 is a cross sectional view showing the containers in the closed state.

When the containers 3, 3 are bend at the bend part 5 in a manner of closing them, and when the upper edges 25, 25 of the front-end standing walls 19a, 19b of the containers 3a, 3b become substantially the same height leaving a small gap G1 between them, as shown in FIG. 6(A), the facing upper edges 20, 20, 20, 20 of the side-part standing walls 16a, 16b become substantially the same height leaving a small gap G2, as shown in FIG. 6(B). As the area of overlapping of the front-end standing wall 19a of the inner container 3a and the front-end standing wall 19b of the outer container 3b becomes larger, the side part standing walls 16a, 16a, 16b, 16b, facing each other, respectively, of the containers 3a, 3b gradually overlap over their entire lengths. Eventually, the side part standing walls 16a, 16a of the inner container 3a overlap the insides of the side part standing walls 16b, 16b of the outer container 3b leaving a gap G3 of 0.1 mm (the base-end side) to 0.6 mm (the front-end side), and the front-end standing wall 19a of the inner container 3a overlaps the inside of the front-end standing wall 19b of the outer container 3b leaving a gap G4 of around 1.3 mm, as shown in FIGS. 5 and 7. Since the upper edges 20, 20 of the two side-part standing walls 16, 16 become higher toward the front ends 23, 23 as shown in FIG. 1, the front-end side of the side-part standing walls has larger area of overlapping, as shown in FIG. 7.

Since the height H2 of the front ends 23, 23 of the upper edges 20, 20 of the side-part standing walls 16, 16 is set to be twice as large as the height H1 of the base ends 21, 21 of the upper edges 20, 20, the front-end side 6 of the base element 9 of the inner container 3a and the upper edge 25 of the front-end standing wall 19b of the outer container 3b have almost the same height leaving the gap G3 in a state that the upper edge 25 of the front-end standing wall 19a of the inner container 3a is in contact with the front end side (the front end side of the bottom face 26 of the container 3b) of the inner surface of the base element 9 of the outer container 3b, as shown in FIG. 7. Thus, a box-like containing body 27 is formed. A thickness T1 of the side face of the box-like containing body 27 completely folded to have a rectangular shape is even from the base end 29 to the front end 30, being around 28.0 mm.

Figure 8:
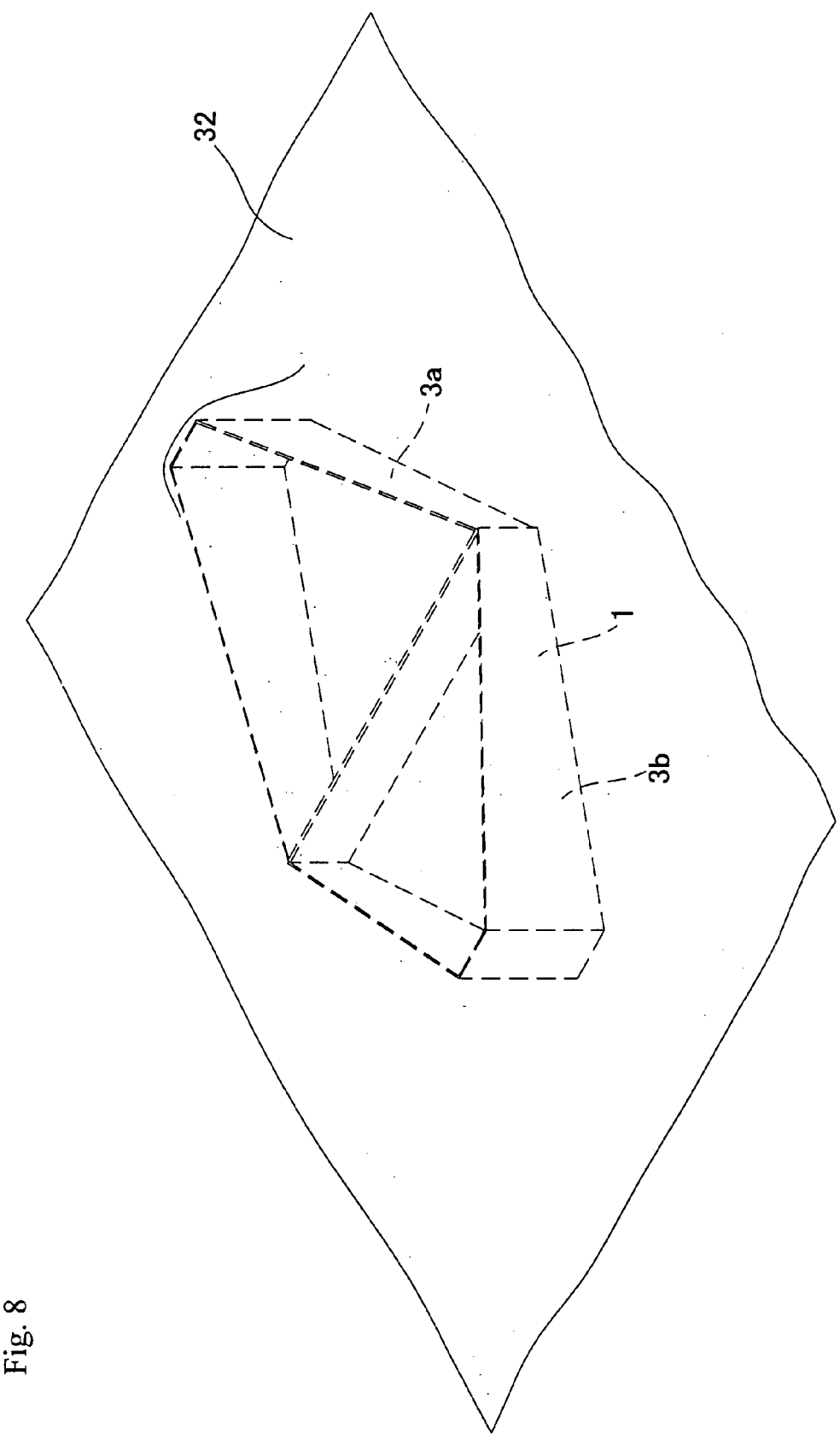
FIG. 8 is a perspective view showing the containers in the opened-up state over which a film-like object is spread.
Figure 9:
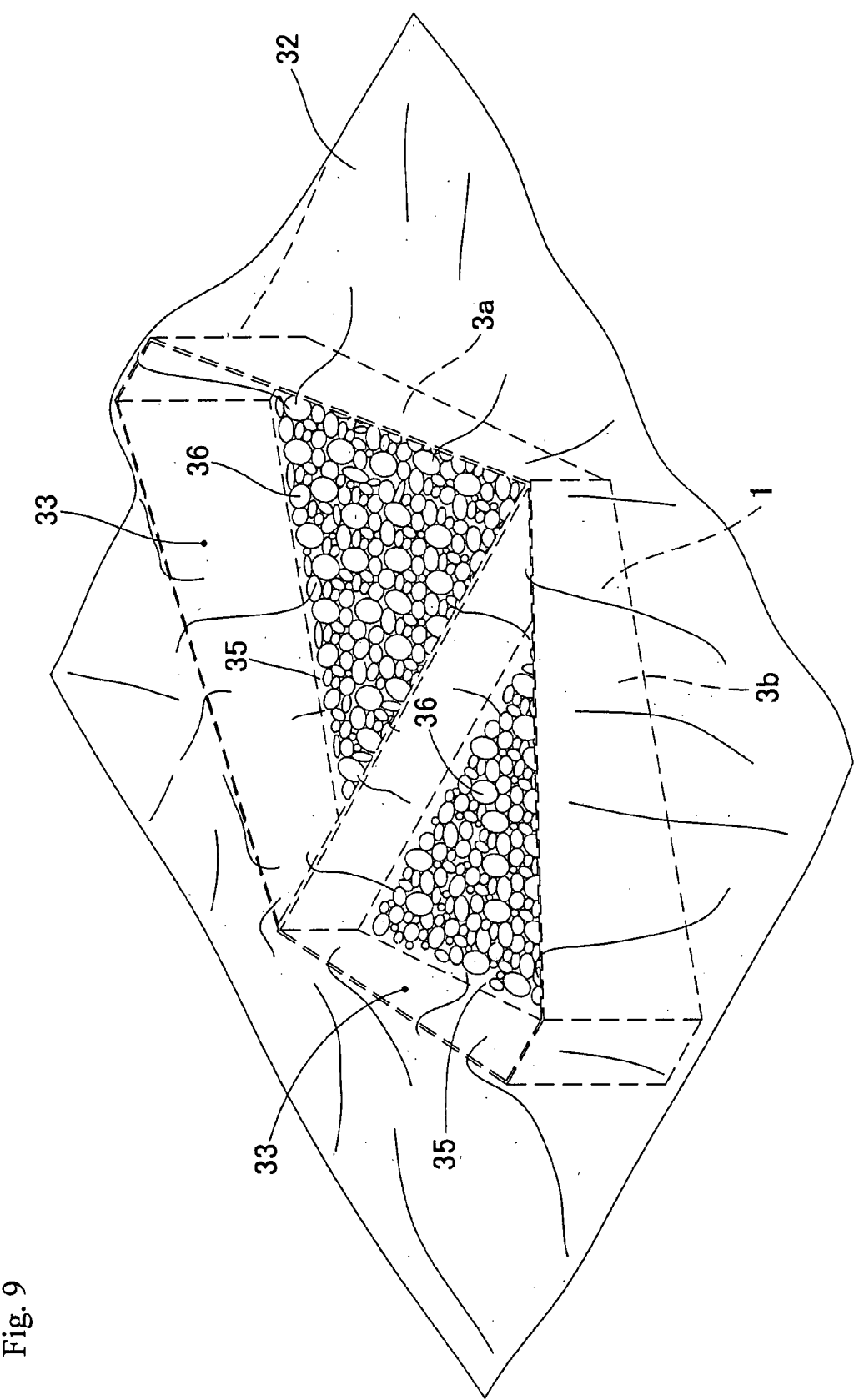
FIG. 9 is a perspective view showing the state that containing recesses are formed by pressing the film-like object into the containers, and the filling is placed on the bottom faces of the containing recesses.
Figure 10:
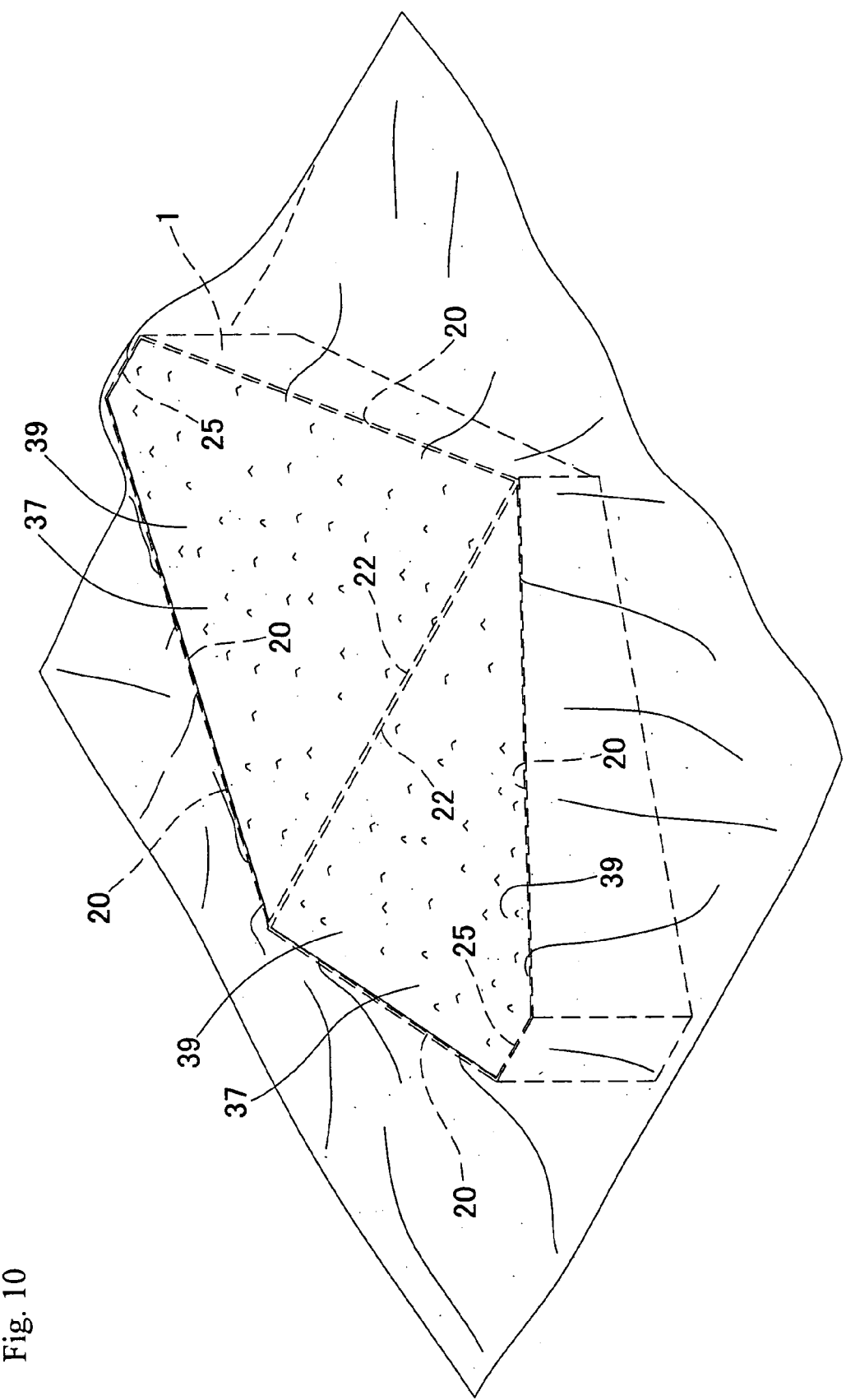
FIG. 10 is a perspective view showing the state that the rice is placed in the containing recesses.
Figure 11:
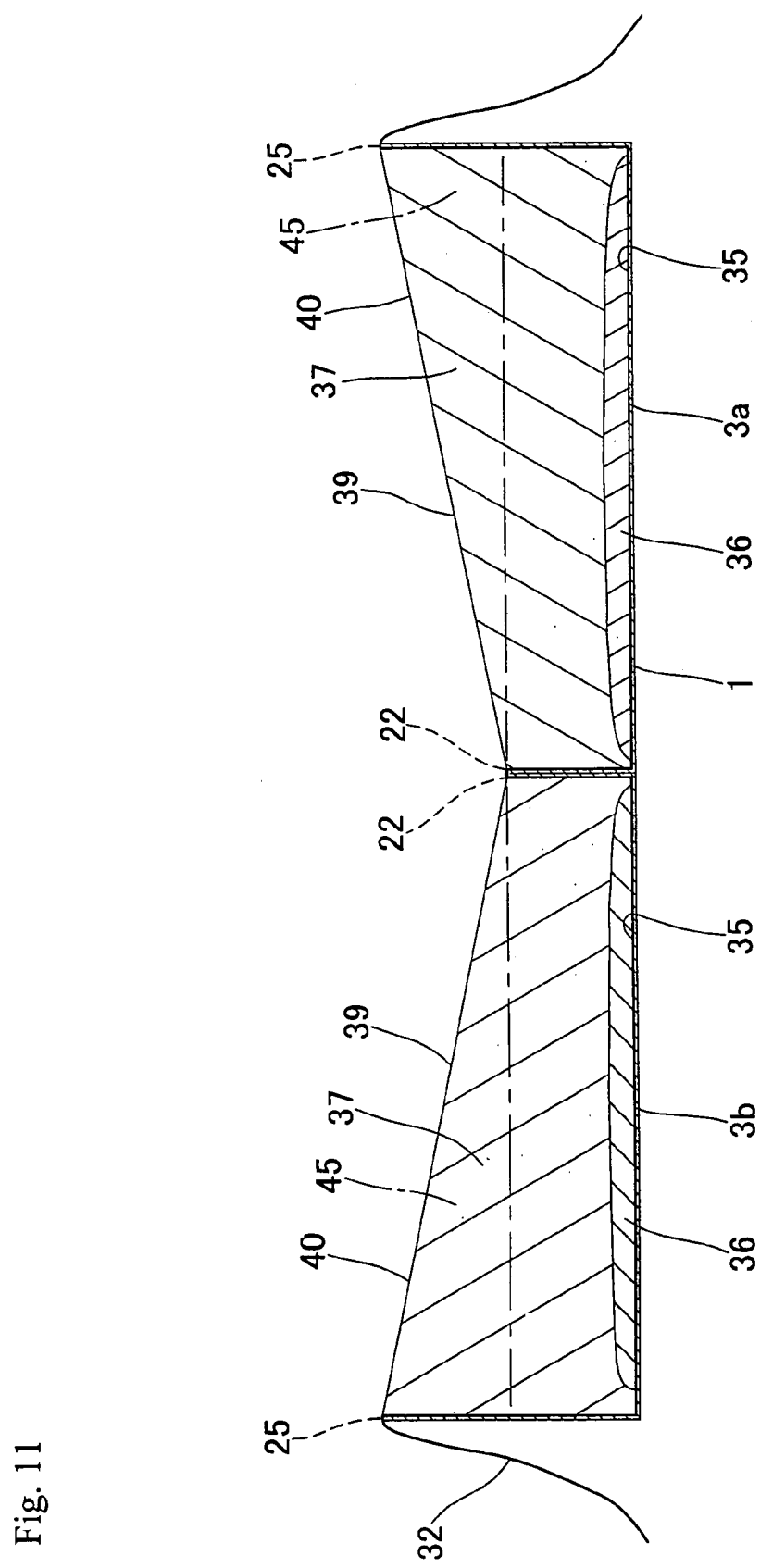
FIG. 11 is a cross sectional view of the containers shown in FIG. 10.
Figure 17:
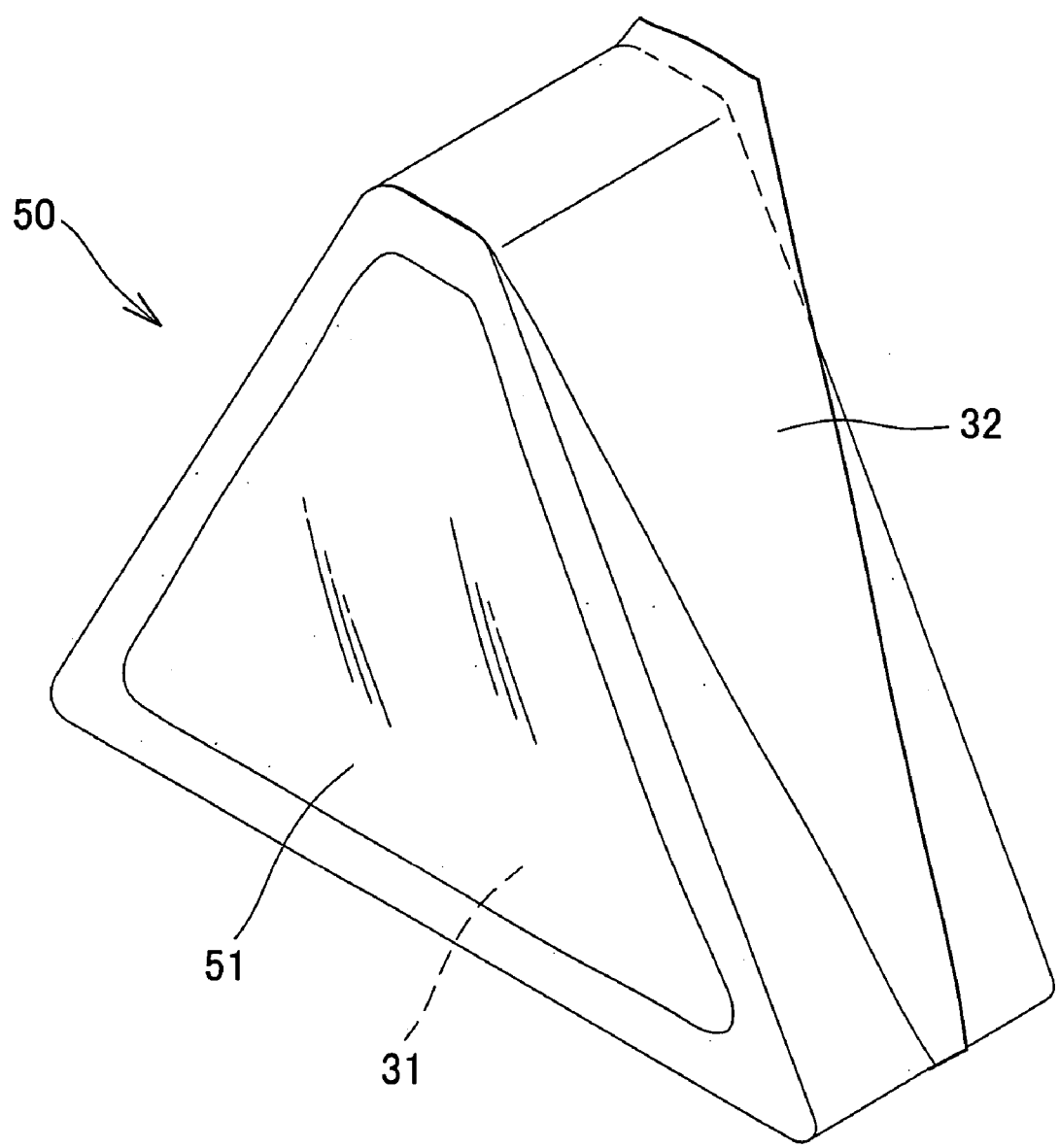
FIG. 17 is a perspective view showing the rice ball covered with the film-like object.

A method for making the rice ball 31 having a shape of a triangular prism as shown in FIG. 17 by using the rice-ball making implement 1 having the structure as mentioned above is as follows. First, as shown in FIG. 8, the two containers 3a, 3b is opened up and a film-like object 32 (a piece of plastic film, for example) having a necessary size is spread over the containers 3a, 3b. Then, as shown in FIG. 9, the film-like object 32 is pressed into the containing parts 11, 11 of the containers 3a, 3b to form containing recesses 33, 33. After that, as shown in FIG. 9, a proper ingredient 36 is placed on bottom faces 35, 35 (FIGS. 9 and 11) of the containing recesses 33, 33 over the entire bottom faces, for example. As the ingredient 36, a various kinds of food like a sheet of layer, a seasoned dried food topping, a slice of cheese, a pickled Japanese apricot, seafood, etc, which are generally used for a conventional rice ball may be used. Next, as shown in FIGS. 10 and 11, the foodstuff like a lump of rice 37, for example, is placed in the containing recess 33. An upper surface 39 of the lump of rice 37 is leveled so that it may be flush with the upper face 40 of the containing recess 33, of which the upper face 40 is formed by the upper edge 22 of the base-end standing wall 12, the upper edges 20, 20 of the side part standing walls 16, 16 and the upper edge 25 of the front-end standing wall 19.

Figure 12:
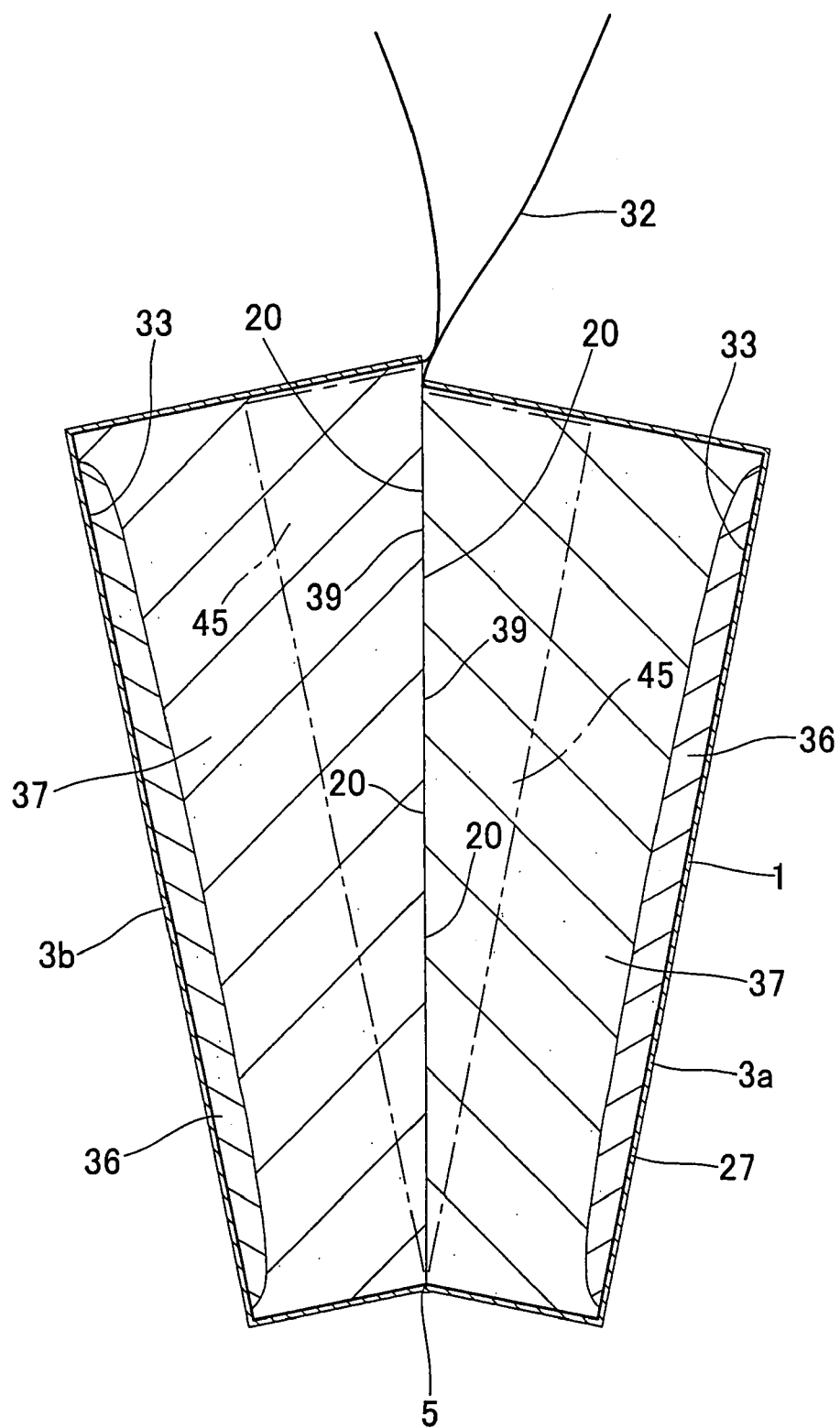
FIG. 12 is a cross sectional view showing the state that the rice contained in each of the containers abuts on each other.
Figure 13:
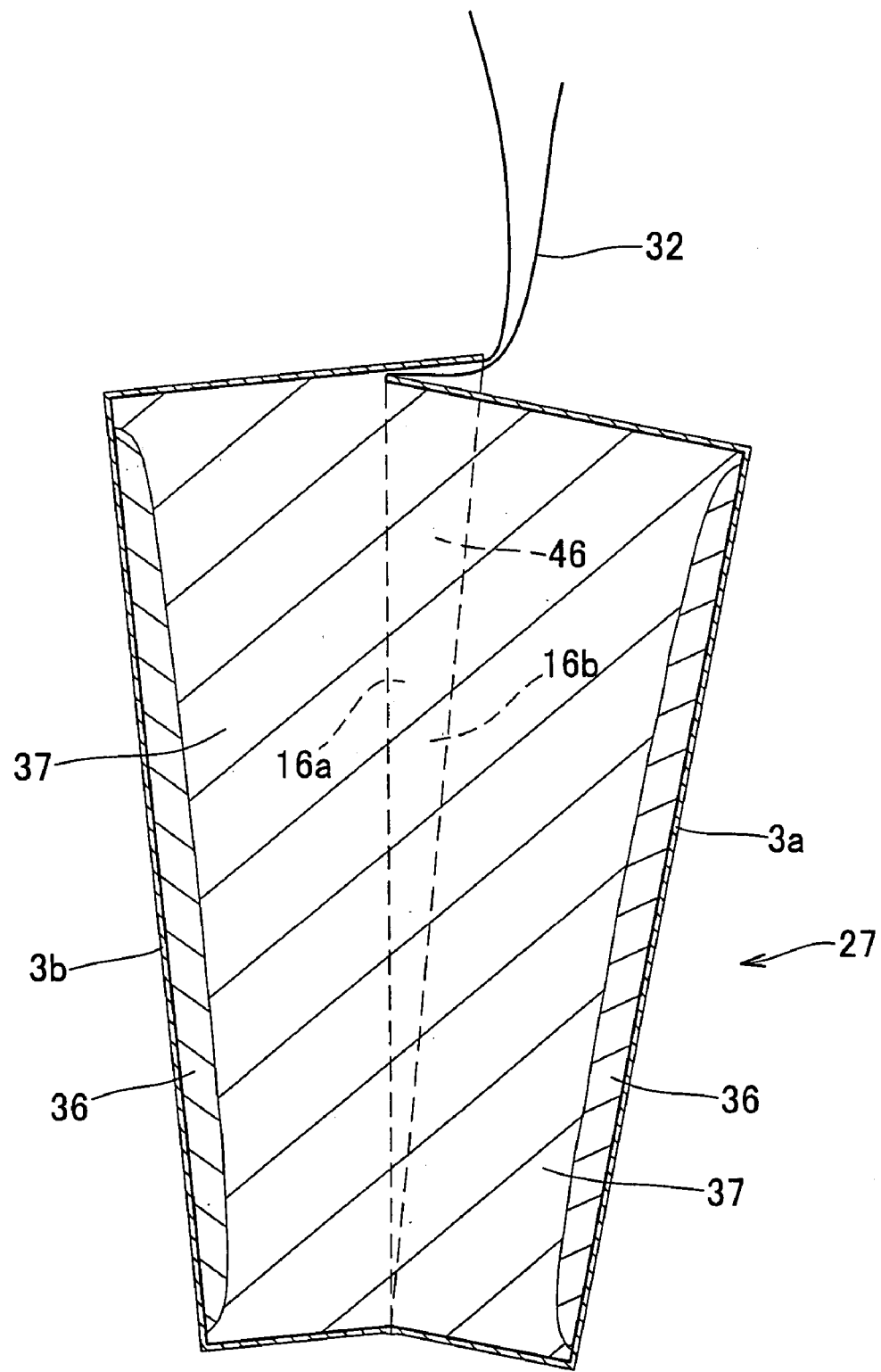
FIG. 13 is a cross sectional view showing the state that the containers are bent a little further from the state shown in FIG. 12.
Figure 14:
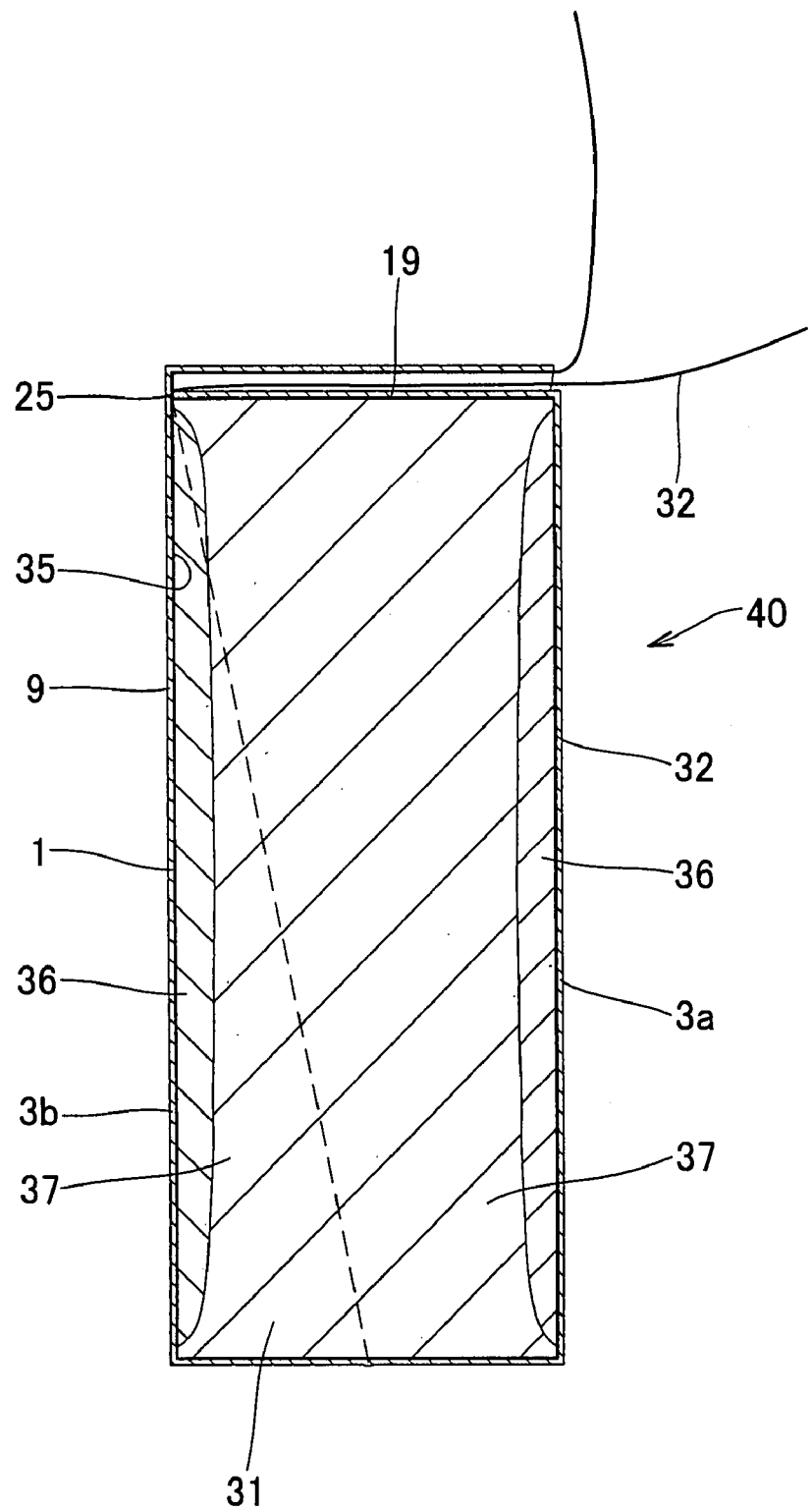
FIG. 14 is a cross sectional view showing the packed rice ball packed in the rice-ball making implement.
Figure 15:
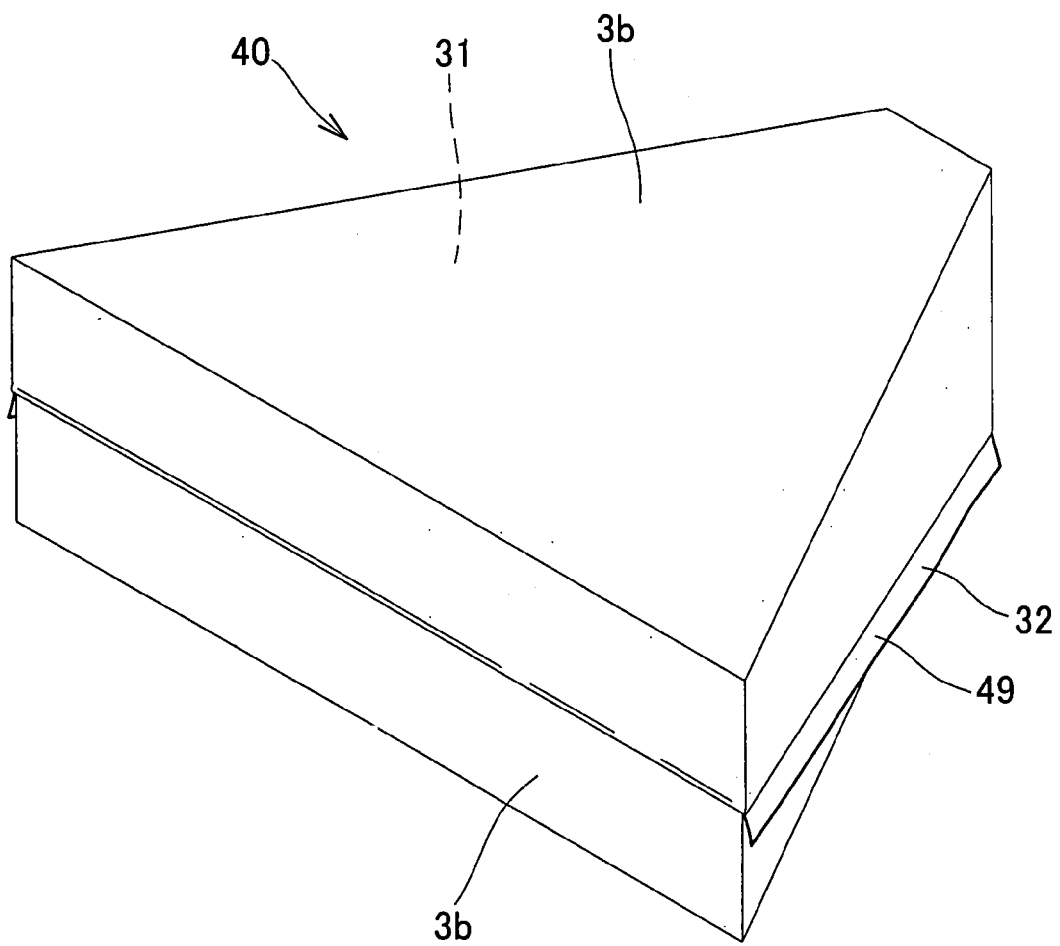
FIG. 15 is a perspective view of what is shown in FIG. 14.

Then, as shown in FIG. 12, the rice-ball making implement 1 is bent at the bend part 5 in a manner of closing the containers 3a, 3b. By this bending operation, the upper surfaces 39, 39 of the lumps of rice 37, 37 in the containing recesses 33, 33 come into contact with each other over the entire surfaces. When the containers 3a, 3b are bent further at the bend part 5, the inner container 3a enters into the outer container 3b, as shown in FIG. 13. By this entering operation, the lumps of rice 37, 37 contained in the containers 3a, 3b is compacted in a state of being bound by the box-like containing body 27 formed by the containers 3a, 3b, whereby a packed rice ball 40 in the shape of the triangular prism as shown in FIGS. 14 and 15 can be made. When the packed rice ball 40 is made like this, the upper edges 20, 20 of the facing side-part standing walls 16a, 16b are substantially closed in a state that the upper surfaces 39, 39 of the lumps of rice 37, 37 contained in the containers 3a, 3b are in contact with each other. As the inner container 3a enters into the outer container 3b, the overlapping area of the facing side-part standing walls 16a, 16b, 16a, 16b gradually becomes larger over the entire length, and the compressed lump of rice 37 hardly comes out of the containers and is surely bound by the containers 3a, 3b to be compacted as required.

The compacting operation is effectively carried out as follows. Namely, as shown in FIG. 3, each of the containers 3a, 3b has a compression containing part 43 constituting the upper part higher than the height H1 of the upper edge 25 (shown in FIG. 3) of the base-end standing wall 12. The compression containing part 43 is formed by a triangular side-part standing wall part 41 and a front-end standing wall part 42 which are formed above the height H1 (shown in FIG. 3) of the upper edge 25 of the base-end standing wall 12. Therefore, as the inner container 3a enters into the outer container 3b, as shown in FIG. 13, the compressed foodstuff (compressed rice) 45, shown in FIG. 12, which is contained in the compression containing part 43 generates the pressurization force when the rice contained in the containers 3a, 3b is compacted. The rice is compacted in a front-side part 46 of the box-like containing body 27 by the pressurization force. As the density of the rice in the front-side part 46 becomes higher, part of the rice in the front-side part moves toward to base-end side in the box-like containing body, and the density of the rice in the intermediate part or the base-end side part becomes higher by which a properly compacted rice ball can be obtained.

Figure 16:
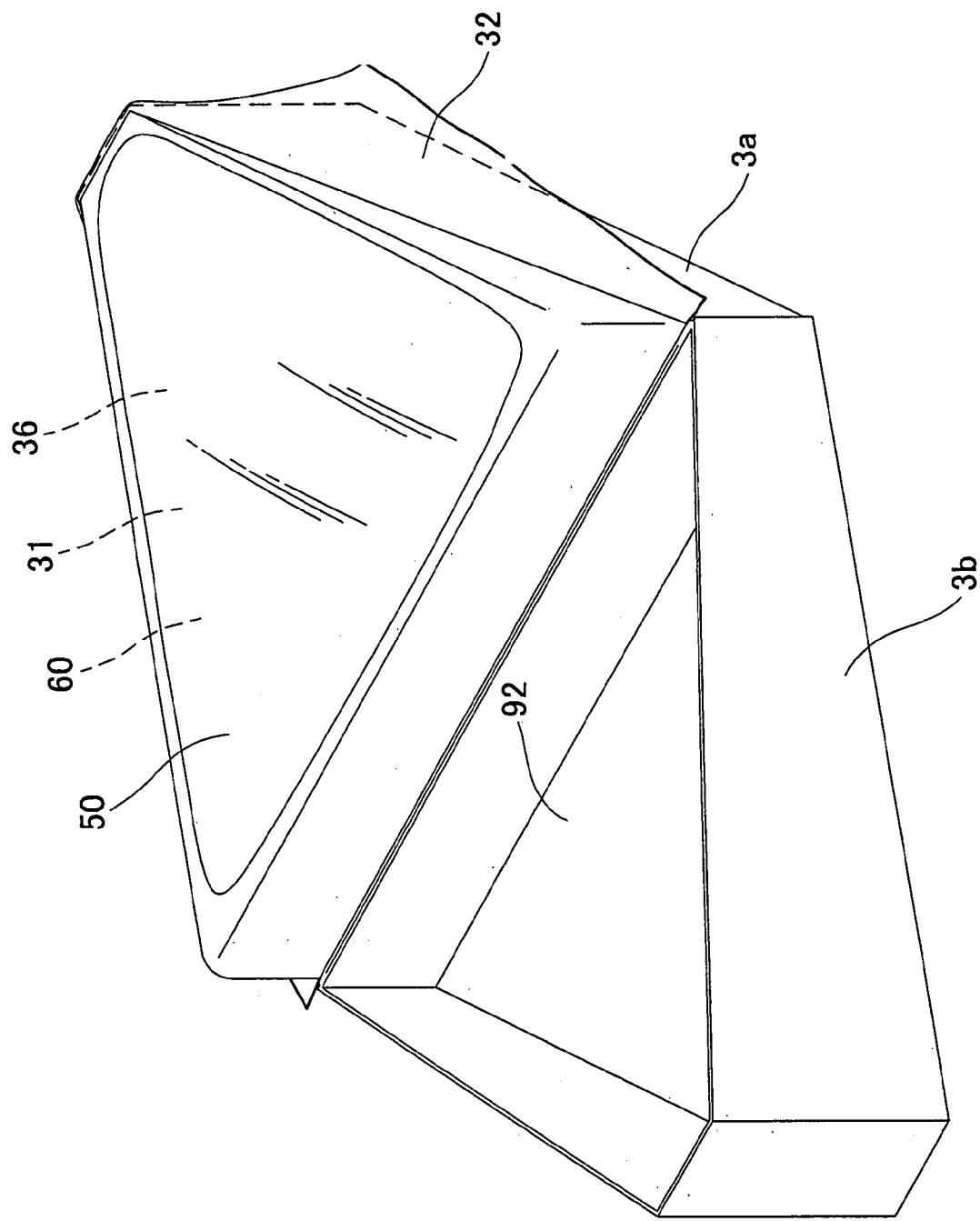
FIG. 16 is a perspective view showing the state that the outer container is opened.

Thus, the packed rice ball 40 having a triangular prism shape packed in the rice-ball making implement 1 by the intermediary of the film-like object 32 is obtained as shown in FIGS. 14 and 15. The rice ball 31 that is made like this can be carried hygienically without losing its shape. An edge part 49 of the film-like object 32 is preferably cut short along an outer periphery of the rice ball, as shown in FIG. 15, for better appearance of the packed rice ball 40. Since the film-like object 32 has an effect of keeping moisture, the rice ball is well tasted even after expiration of a predetermined period after making. When the rice ball is eaten, the inner container 3a is held to be horizontal, as shown in FIG. 16, for example, the outer container 3b larger than the inner container 3a is opened, and the covered rice ball 50 covered with the film-like object 32 is taken out. The covered rice ball 50 which is taken out is shown in FIG. 17. When the rice ball 31 is eaten after the film-like object 32 is removed, a side face 51 of the rice ball is held by a hand by the intermediary of the film-like object 32 and is eaten while the film-like object 32 is being removed from the front end. Accordingly, the rice ball is eaten hygienically without dirtying the hand.

Figure 18:
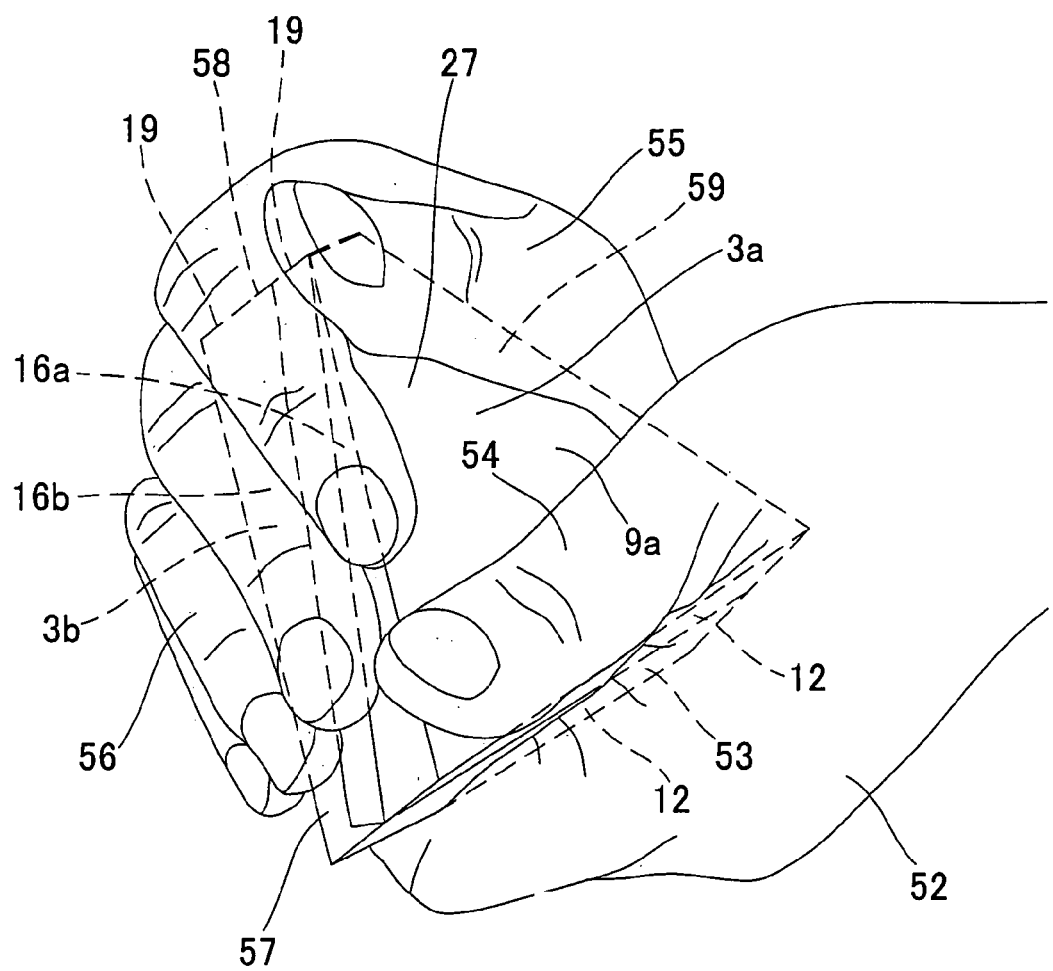
FIG. 18 is a perspective view explaining a process of compacting the rice ball.

To compact the rice ball, as shown in FIG. 18, for example, the two containers 3*a*, 3*b* are bent in a manner that the upper surfaces 39, 39 of the contained rice come in contact with each other. Then, a center part of a palm of a hand 52 is placed on the bottom face part 53 (comprising the base-end standing walls 12, 12 of the containers 3*a*, 3*b*) of the box-like containing body 27 in its folded state. A thumb 54 is placed on a base element 9*a* and four fingers are placed on the other base element 9*b*. A center part of the palm of the other hand 55 is placed on a top surface part (comprising the front-end standing walls 19, 19 of the containers 3*a*, 3*b*) 58 of the box-like containing body 27. The fingers 56 of the hand 55 is placed on a side face part (comprising the side-part standing walls 16*a*, 16*b* on one side of the containers 3*a*, 3*b*) 57, and the other side face part (comprising the side-part standing walls 16*a*, 16*b* on the other side of the containers 3*a*, 3*b*) 59 is placed on the palm. Then, the rice is compacted by the intermediary of the containers 3*a*, 3*b* in a manner that the inner container 3*a* enters into the outer container 3*b*. Finally, the compression is finished in a state that the upper edge 25 of the front-end standing wall 19 of the inner container is in contact with the front-end side (the front-end side of the bottom face 35 of the container 3*b*) of the inner face of the base element 9 of the outer container 3*b*, as shown in FIG. 14.

Figure 19:
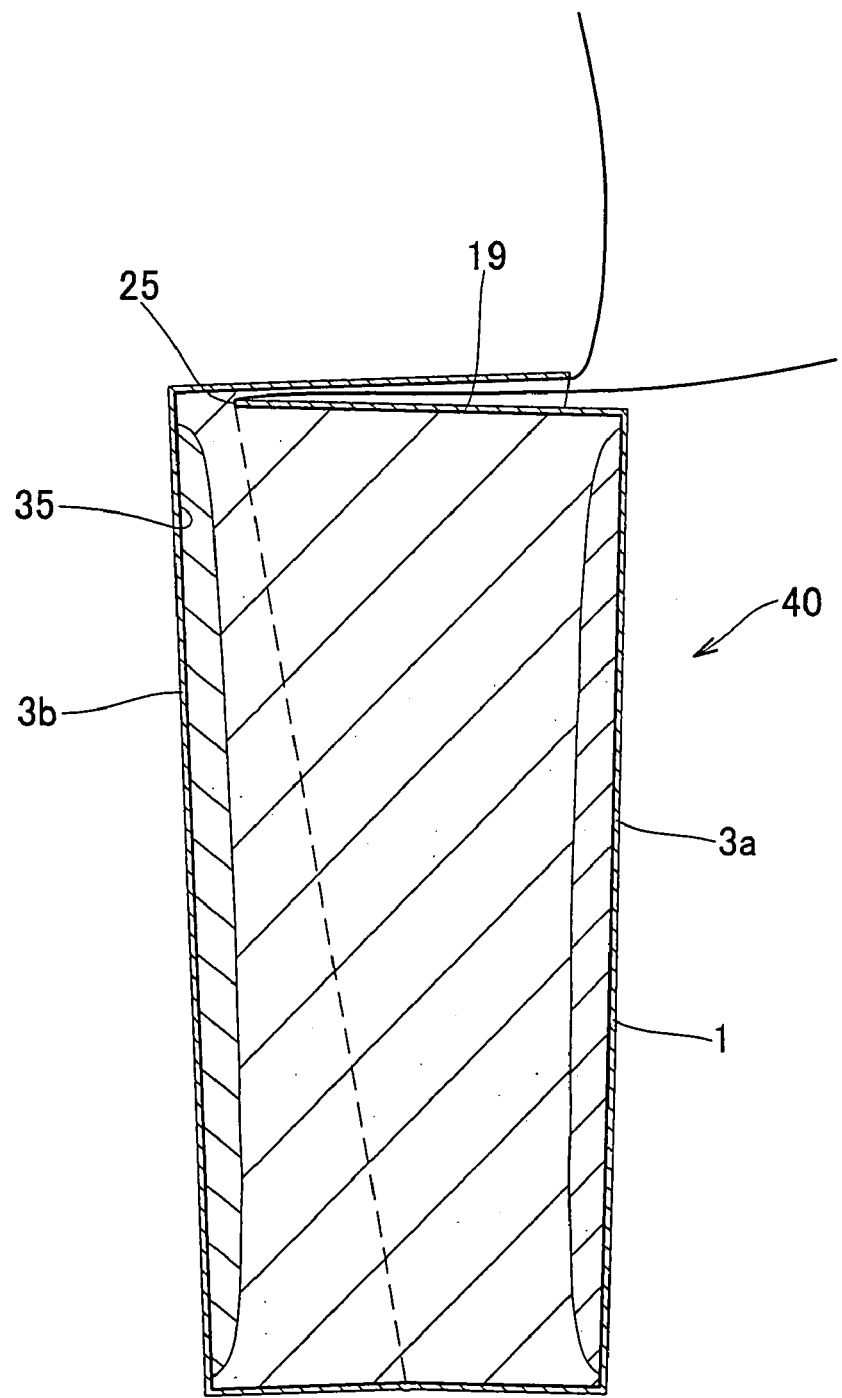
FIG. 19 is a cross sectional view of the packed rice ball which is softly compacted.

In the above-mentioned process, when the bending operation of the two containers 3*a*, 3*b* is stopped just before the upper edge 25 of the front-end standing wall 19 of the inner container 3*a* comes into contact with the bottom face 35 of the outer container 3*b*, as shown in FIG. 19, a softly compacted rice ball is made, if preferred. When the packed rice ball 40 is sold in a state that the upper edge 25 is not in contact with the bottom face 35, it may be compressed until the upper edge 25 comes into contact with the bottom face 35, as shown in FIG. 14, after purchasing the rice ball, if a rice ball compacted a little harder is wanted. Thus, there is an advantage that a rice ball of a favorite hardness can be obtained.

When the covered rice ball 50 covered with the film-like object 32 is taken out, it is considered to be usual that the outer container 3*b*, which is larger, is opened first. Therefore, when the ingredient 36 is arranged only on a side face 60 of the rice ball 31 and the ingredient 36 is arranged on the bottom face side of the outer container 3*b*, the ingredient 36 appears on the upper surface (the side face 60 of the rice ball 31) of the covered rice ball 50 if the outer container 3*b* is opened first, as shown in FIG. 16, and what the ingredient 36 is can be recognized immediately, which is another advantage.

Figure 20:
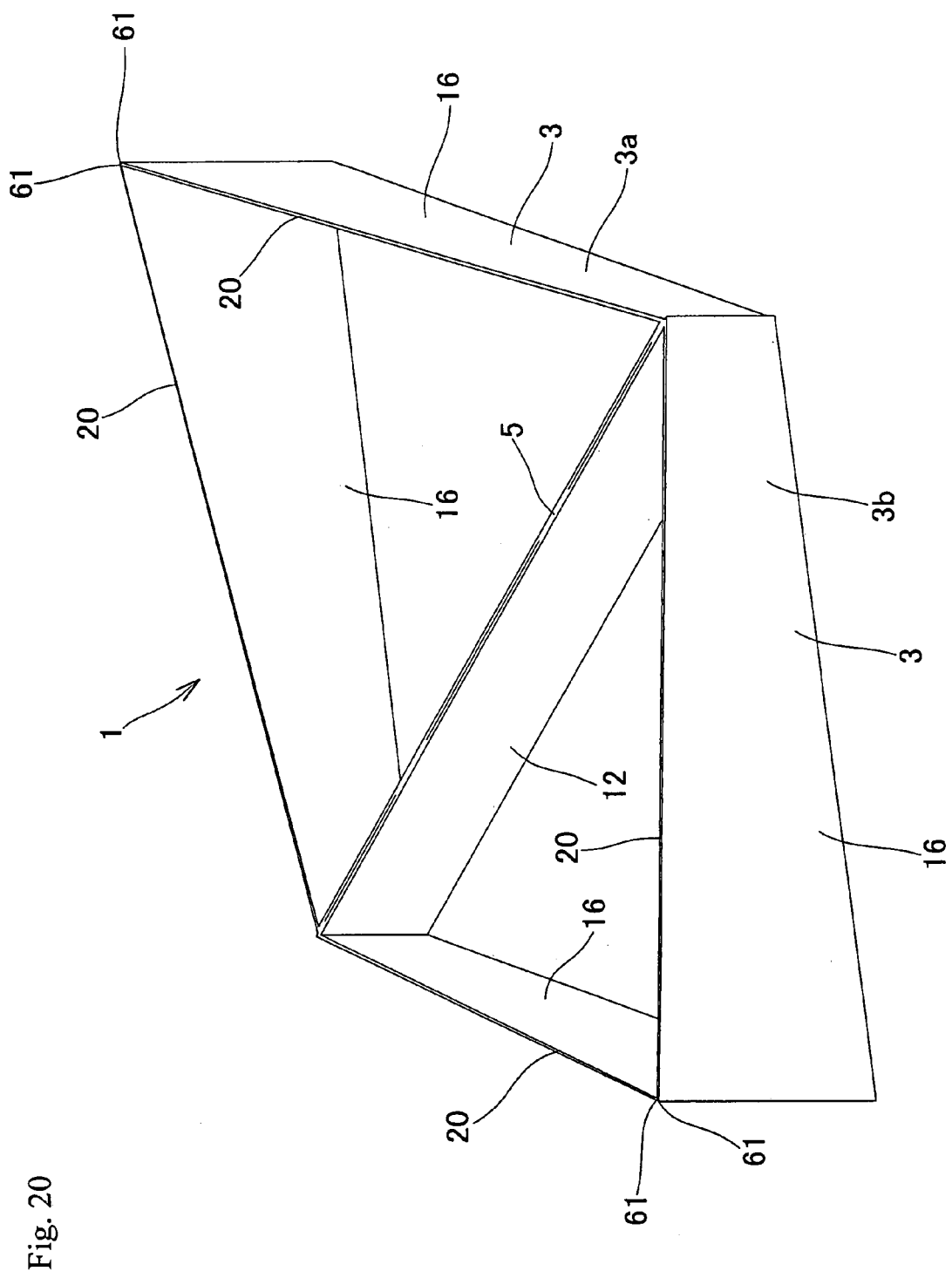
FIG. 20 is a perspective view showing another embodiment of the rice-ball making implement.
Figure 21:
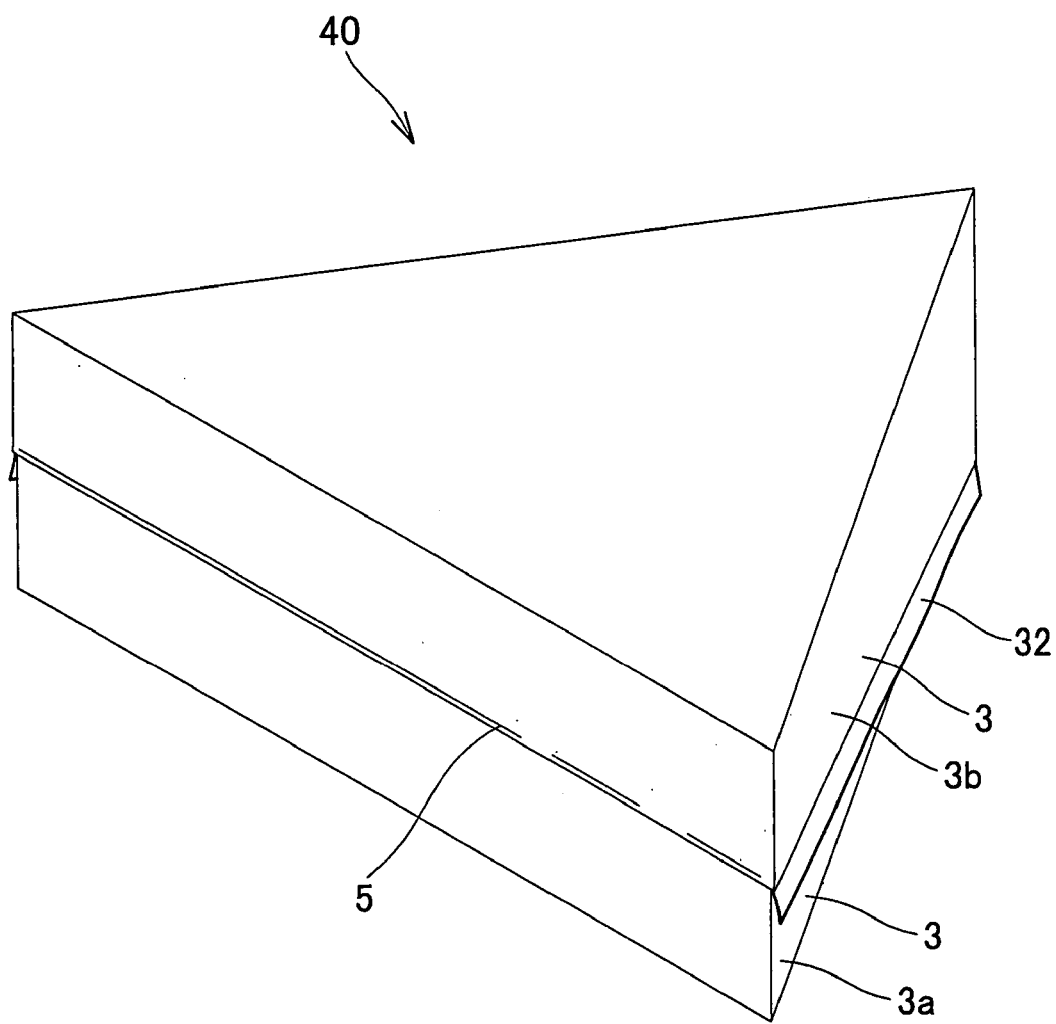
FIG. 21 is a perspective view of the packed rice ball made by the rice-ball making implement shown in FIG. 20.

FIG. 20 shows another embodiment of the rice-ball making implement 1 of this invention, in which front ends 61, 61 of the upper edges 20, 20 of the two side-part standing walls 16, 16 are directly connected to each other. Otherwise, the structure is the same as the above-mentioned embodiment. A method for making the rice ball using the rice-ball making implement 1 which is thus structured is also the same as the above-mentioned embodiment. FIG. 21 shows the packed rice ball 40 having a shape of a triangular prism.

Figure 22:
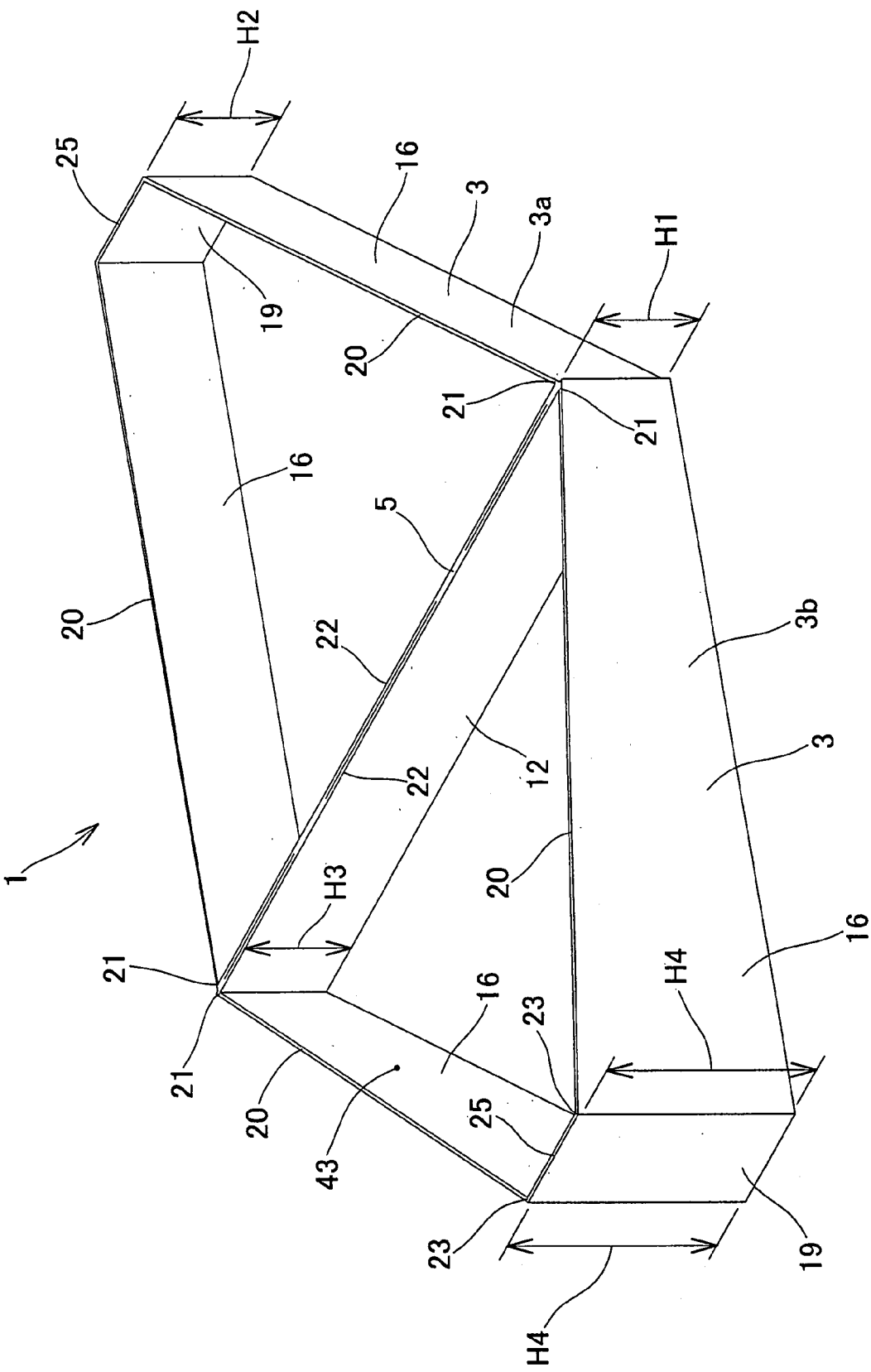
FIG. 22 is a perspective view showing another embodiment of the rice-ball making implement.
Figure 23:
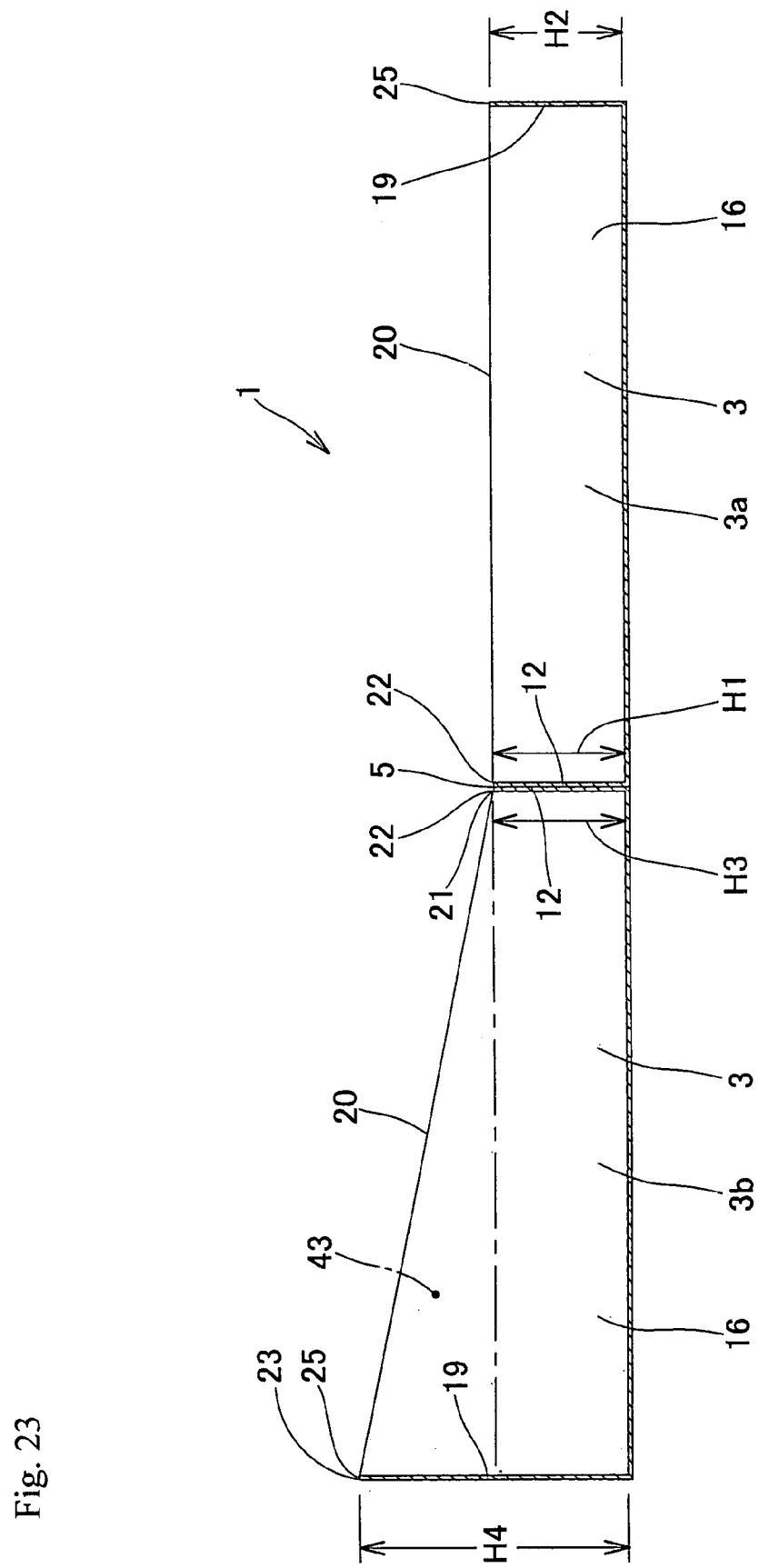
FIG. 23 is a cross sectional view of the rice-ball making implement shown in FIG. 22 in its opened-up state.

FIGS. 22 and 23 shows another embodiment of the rice-ball making implement 1, in which the container 3*b* of the two containers 3, 3 connected to each other by the bend part 5 has the two side-part standing walls 16, 16. The height of the upper edges 20, 20 of the side-part standing walls 16, 16 is set to be substantially the same as the height H3 of the upper edge 22 of the base-end standing wall 12 at the base end 21, and to be gradually taller toward the front end. On the other hand, in the other container 3*a*, the height of the upper edges 20, 20 of the side-part standing walls 16, 16 and the height H2 of the upper edge 25 of the front-end standing wall 19 are set to be the same as the height H1 of the upper edge 22 of the base-end standing wall 12. In the container 3*b*, the heights H4 of the front end 23, 23 of the upper edges 20, 20 of the side-part standing walls 16, 16 are set to be substantially the same, being twice as tall as the height H3 of the upper edge 22 of the base-end standing wall 12, for example. The front ends of the side-part standing walls 16, 16 are connected to each other by a front-end standing wall 19. The height of the upper edge 25 of the front-end standing wall 19 is set to be the same as the height H4 of the front end 23 of the upper edge 20, whereby the compression containing part 43 similar to the one mentioned earlier is formed only in the container 3*b*.

Figure 24:
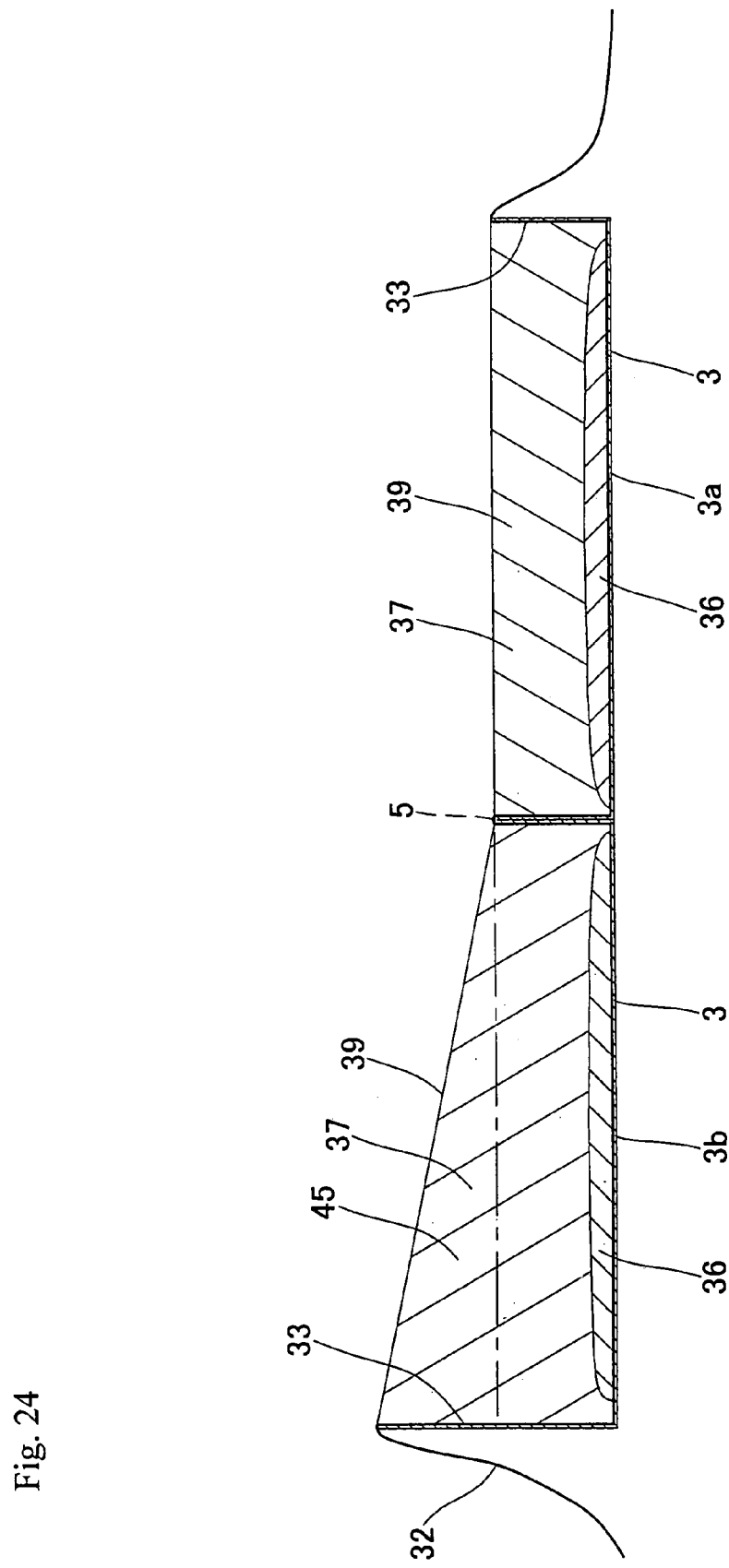
FIG. 24 is a cross sectional view showing the state that the rice is contained in each of the containing recesses of the rice-ball making implement shown in FIG. 22.
Figure 25:
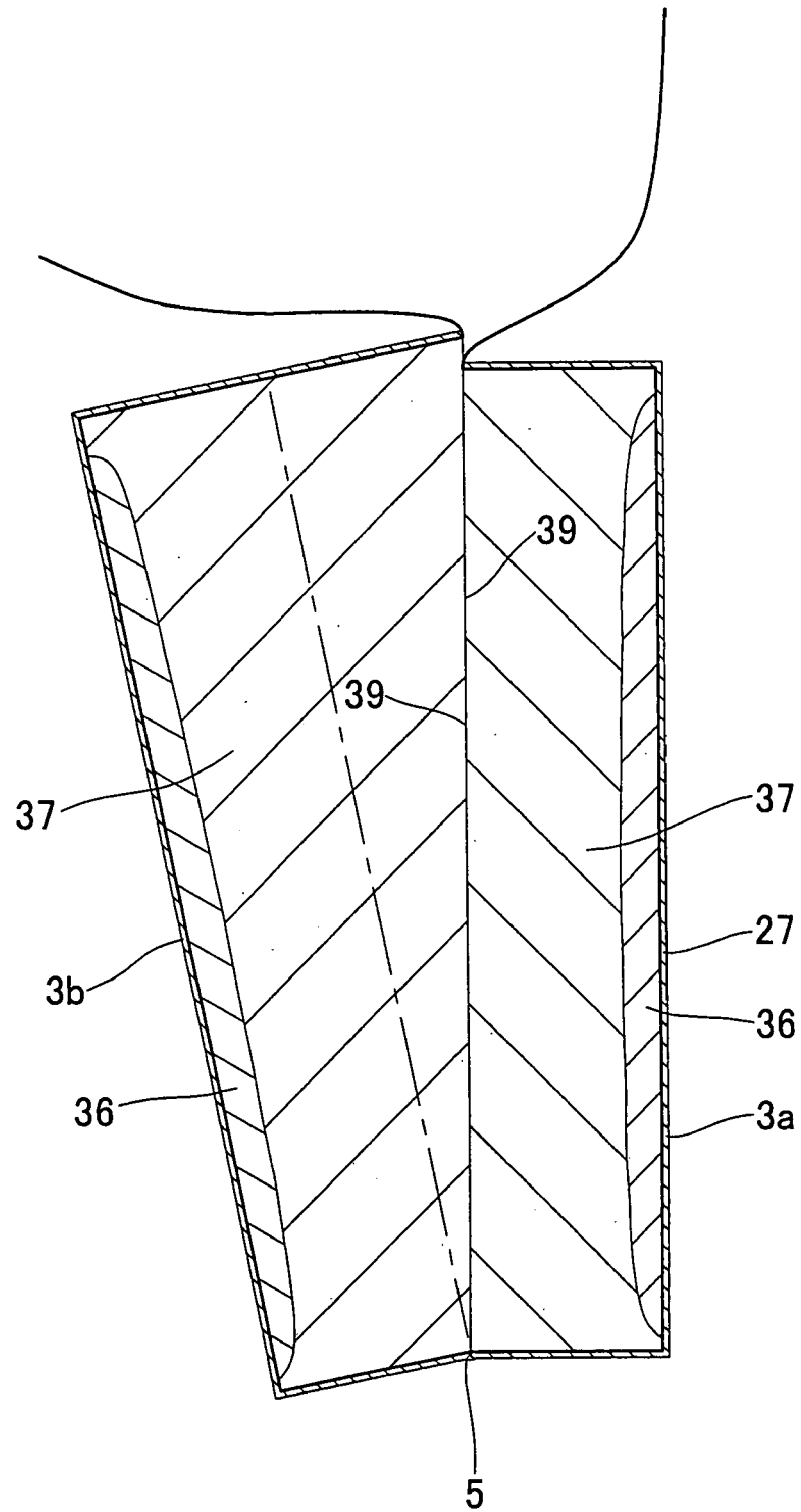
FIG. 25 is a cross sectional view showing the state that each of the upper faces of the rice contained in the containers abuts on the other.
Figure 26:
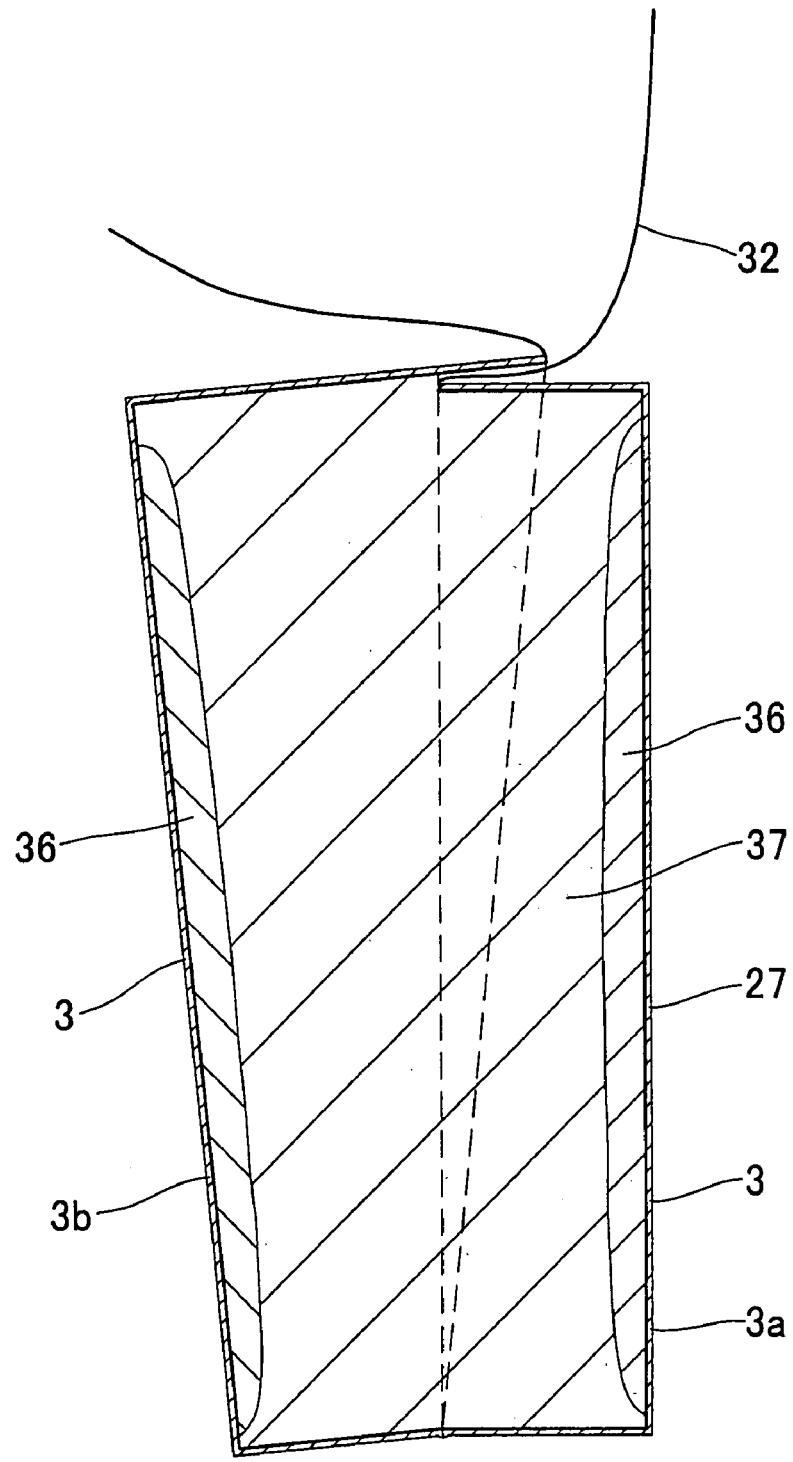
FIG. 26 is a cross sectional view of the containers which are bent a little.
Figure 27:
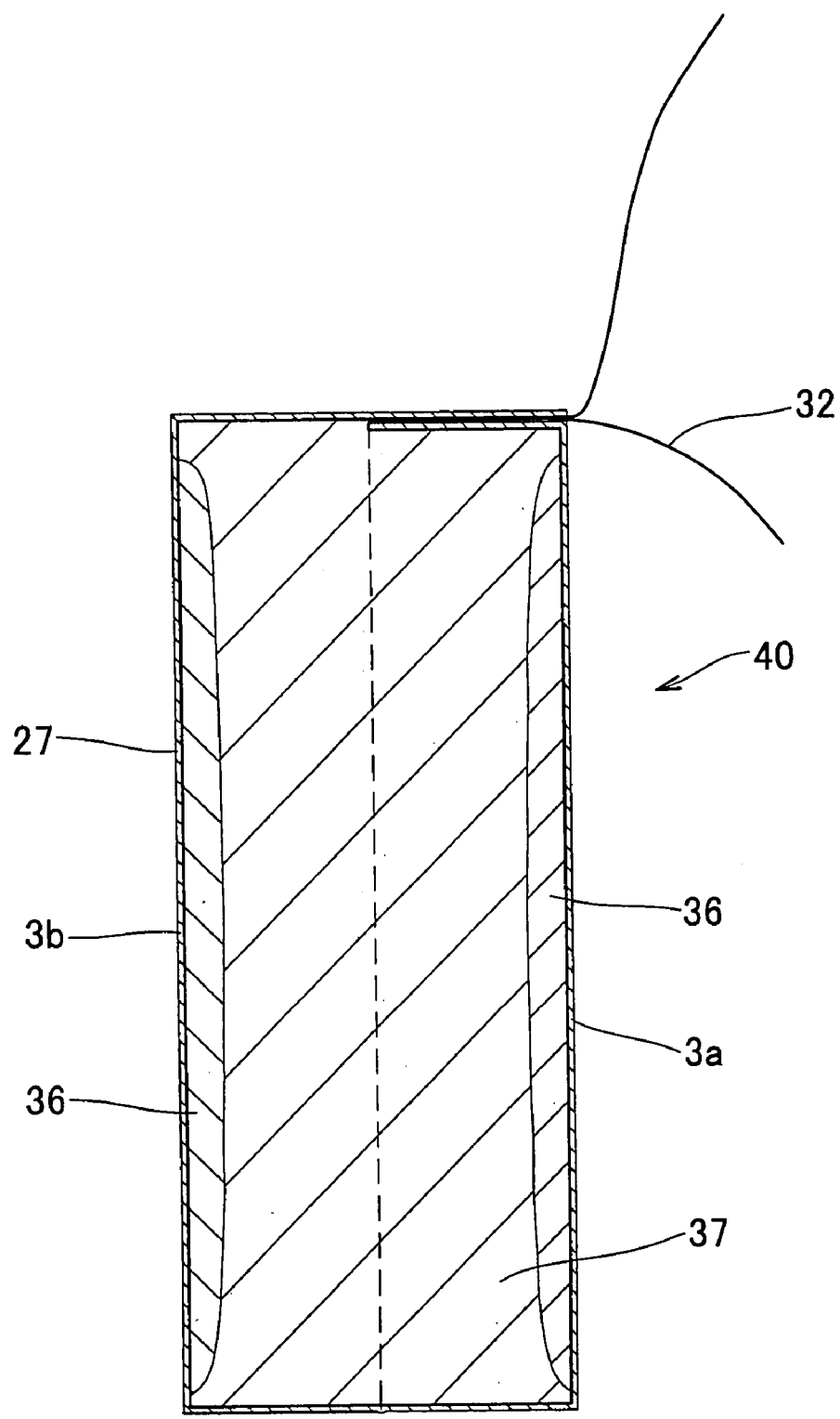
FIG. 27 is a cross sectional view showing the packed rice ball made by closing the two containers.

The method for making the rice ball using the rice-ball making implement 1 having the above-mentioned structure is similar to the above. First, as shown in FIG. 24, the rice 37 is placed in the formed containing recesses 33, 33 formed by the intermediary of the film-like object 32 in a manner that the surface level of the rice becomes flush with the upper edges of the containing recesses 33, 33, as shown in FIG. 24. Then, as shown in FIG. 25, the two containers 3*a*, 3*b* are bent at the bend part 5 in a manner of closing them. By this bending operation, the entire upper surfaces 39, 39 of the rice 37 contained in the containing recesses 33, 33 come into contact with each other. When the two containers 3*a*, 3*b* are bent further at the bend part 5, the inner container 3*a* enters into the outer container 3*b*, as shown in FIG. 26, by which the rice contained in the containers 3*a*, 3*b* is compacted in a state of being bound by the box-like containing body 27 formed by the two containers, and the packed rice ball 40 as shown in FIG. 27 can be made.

FIGS. 28 to 30 and 31 show another embodiment of the rice-ball making implement 1 of this invention, wherein two containers 3, 3 connected by the bend part 5 are formed to have a quadrangular-shape in plan view. Each of the two containers 3, 3 is provided with the standing wall 10 in a protruding manner around the entire outer peripheral edge on one side of the quadrangular-shaped base element 9. The base element 9 and the standing wall 10 form a containing part 11 for containing the foodstuff like the rice.

The standing wall 10 comprises a base-end standing wall 12 provided to stand on the base-end side 7 of the base element 9, side-part standing walls 16, 16 provided to stand on the two sides 13, 13 of the base element 9 in a manner of extending from both ends of the base-end standing wall 12 to the front side, and a front-side standing wall 19 provided to stand on the front-end side 6 of the base element 9 in a manner of connecting the front ends of the side-part standing walls 16, 16 to each other.

A height of the base-end standing wall 12 is a half of a thickness of the rice ball to be made. The height of each of the upper edges 20, 20 of the side-part standing walls 16, 16 is set to be the same as the height of the upper edge 22 of the base-end standing wall 12 at its base ends 21, 21, and to gradually become higher toward the front ends 23, 23. The front ends 23, 23 is set to be substantially twice as tall as the base end 21 of the upper edge 20, and to be substantially the same as the height of the upper edge 24 of the front-end standing wall 19.

Figure 32:
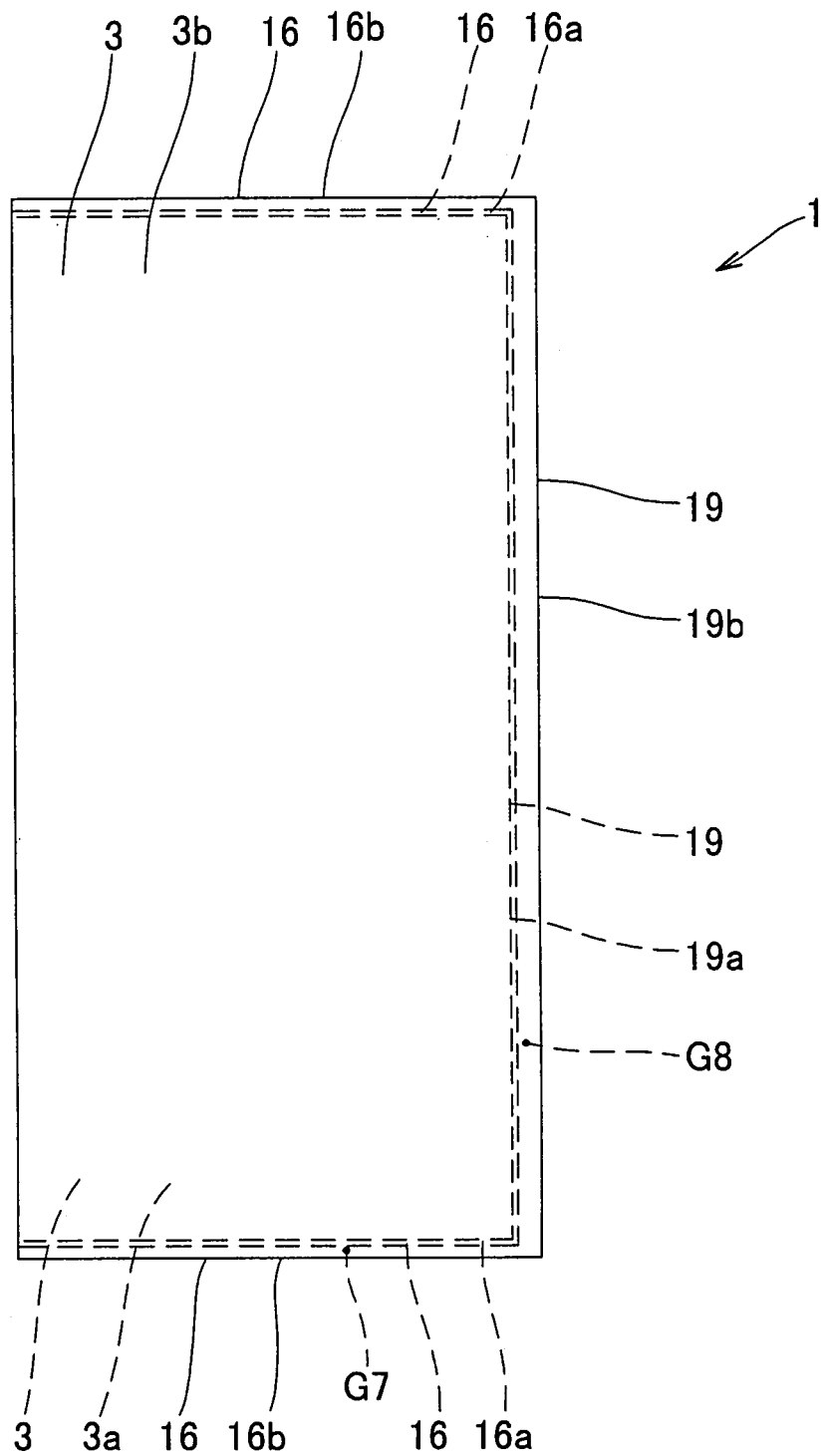
FIG. 32 is a plan view showing the containers in the closed state.

In the containers 3, 3 having the above-mentioned structure, the upper edges 22, 22 of the base-end standing walls 12, 12 are connected by the bend part 5. As shown in FIG. 32, the container 3*b* is made to be slightly larger than the other container 3*a* so that the side-part standing walls 16*a*, 16*a* and the front-end standing wall 19*a* of the container 3*a* may overlap the insides of the side-part standing walls 16*b*, 16*b* and the front-end standing wall 19*b* of the container 3*b* when the containers 3, 3 are bent at the bend part 5 in a manner of closing them.

Figure 28:
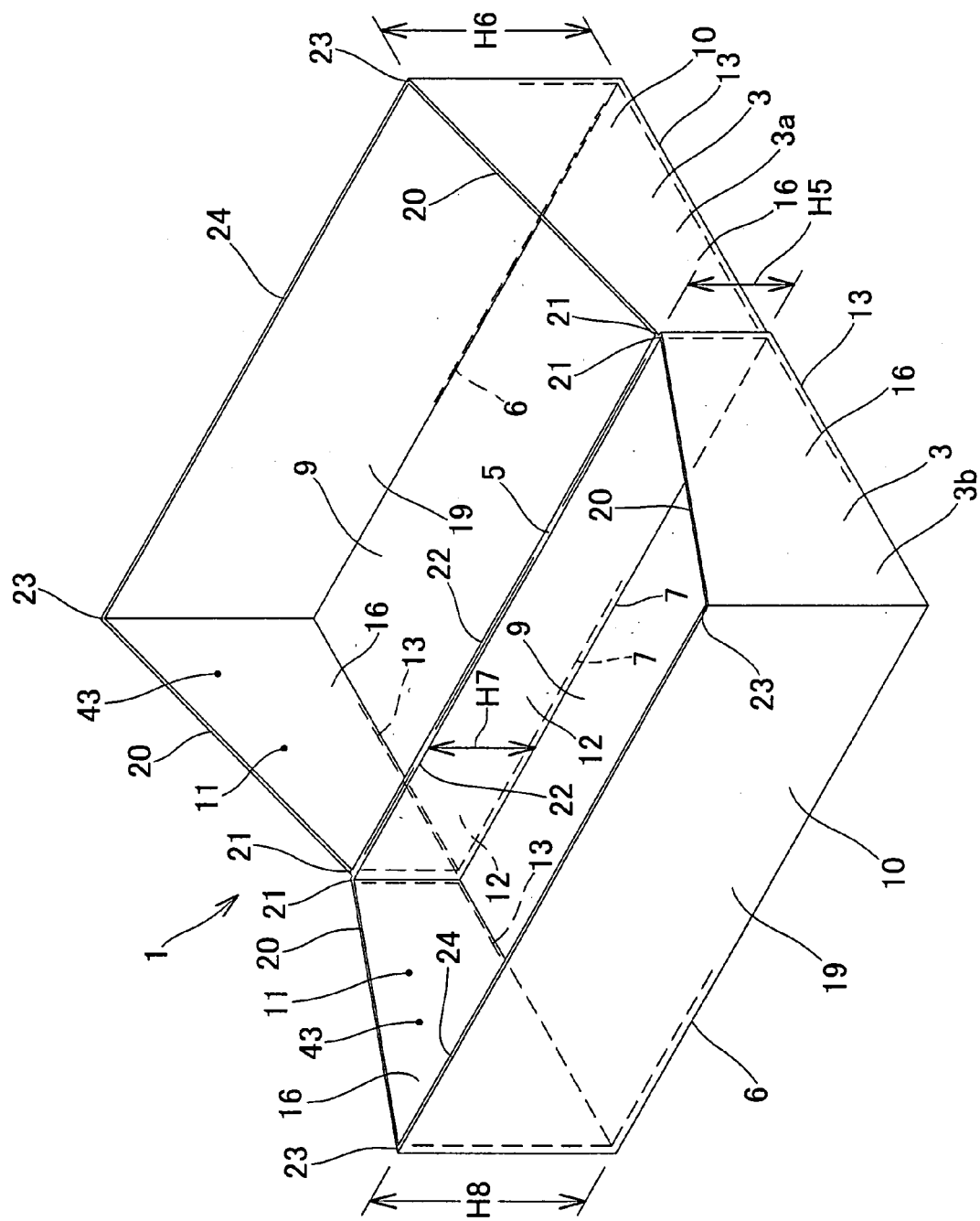
FIG. 28 is a perspective view showing another embodiment of the rice-ball making implement.

In the rice-ball making implement 1 shown in FIG. 28, the base-end standing wall 12 connected by the bend part 5 is provided to stand on a long side of the quadrangular base element 9. In the rice-ball making implement 1 shown in FIG. 31, the base-end standing wall 12 connected by the bend part 5 is provided to stand on a short side of the quadrangular base element 9.

Figure 29:
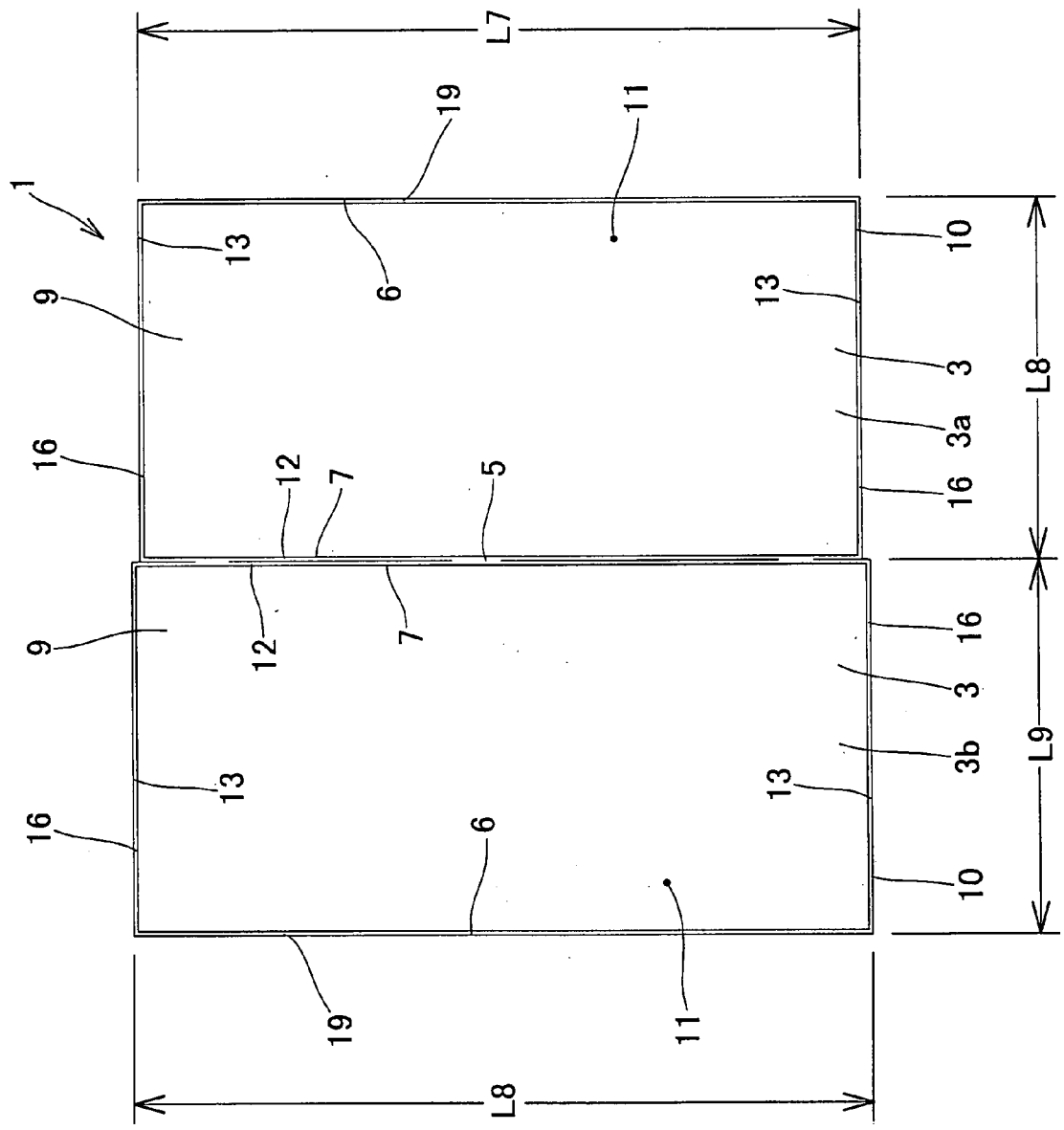
FIG. 29 is a plan view showing the containers in the opened-up state.

To exemplify the dimension of each part of the rice-ball making implement 1 having the above-mentioned structure as shown in FIGS. 28 and 29, the lengths L7 of the base-end side 7 and the front-end side 6 of the base element 9 of the container 3a (also referred to as the "inner container", hereinafter) are set to be the same, which is 78.2 mm. The length L8 of the two sides 13, 13 are set to be 38.5 mm. The height H5 of the upper edge 22 of the base-end standing wall 12 is set to be 13.5 mm. The height of the front ends 23, 23 of the upper edged 20, 20 of the side part standing walls 16, 16, and the height of the upper edge 24 of the front-end standing wall 19 referred to as H6 are set to be the same, which is 27.0 mm. As for the other container (also referred to as the "outer container", hereinafter) 3b, the lengths L8 of the base-end side 7 and the front-end side 6 of the base element 9 are both set to be 80.0 mm, and the length L9 of the two sides 13, 13 are set to be 40.0 mm. The height H7 of the upper edge 22 of the base-end standing wall 12 is set to be 13.5 mm, and the heights of the front-ends 23, 23 of the upper edges 20, 20 of the two side part standing walls 16, 16 and the height H8 of the upper edge 24 of the front-end standing wall 19 are set to be the same, which is 27.0 mm.

Figure 33:
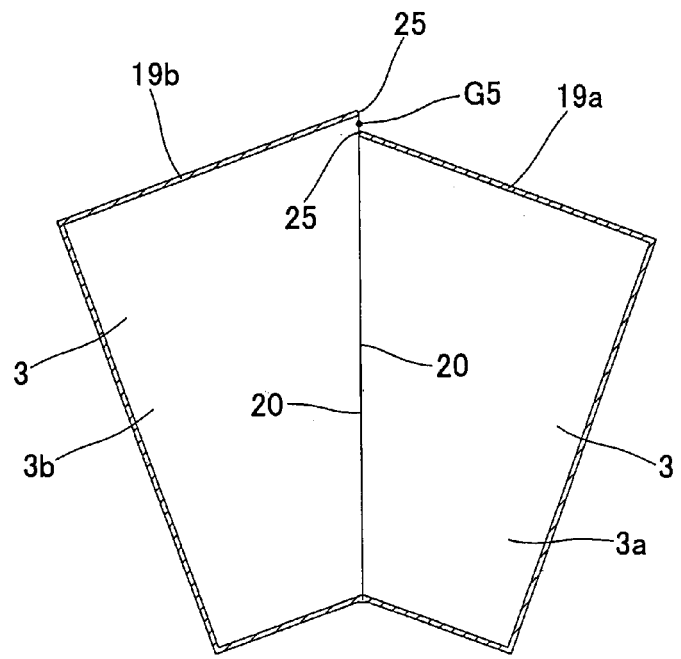
FIG. 33 is a cross sectional view showing the containers with the opened tops abutting on each other.
Figure 33:
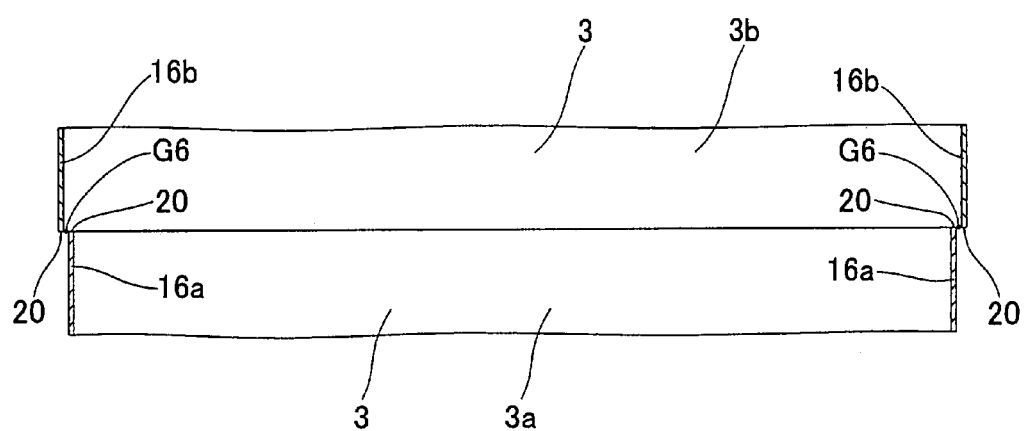
Figure 34:
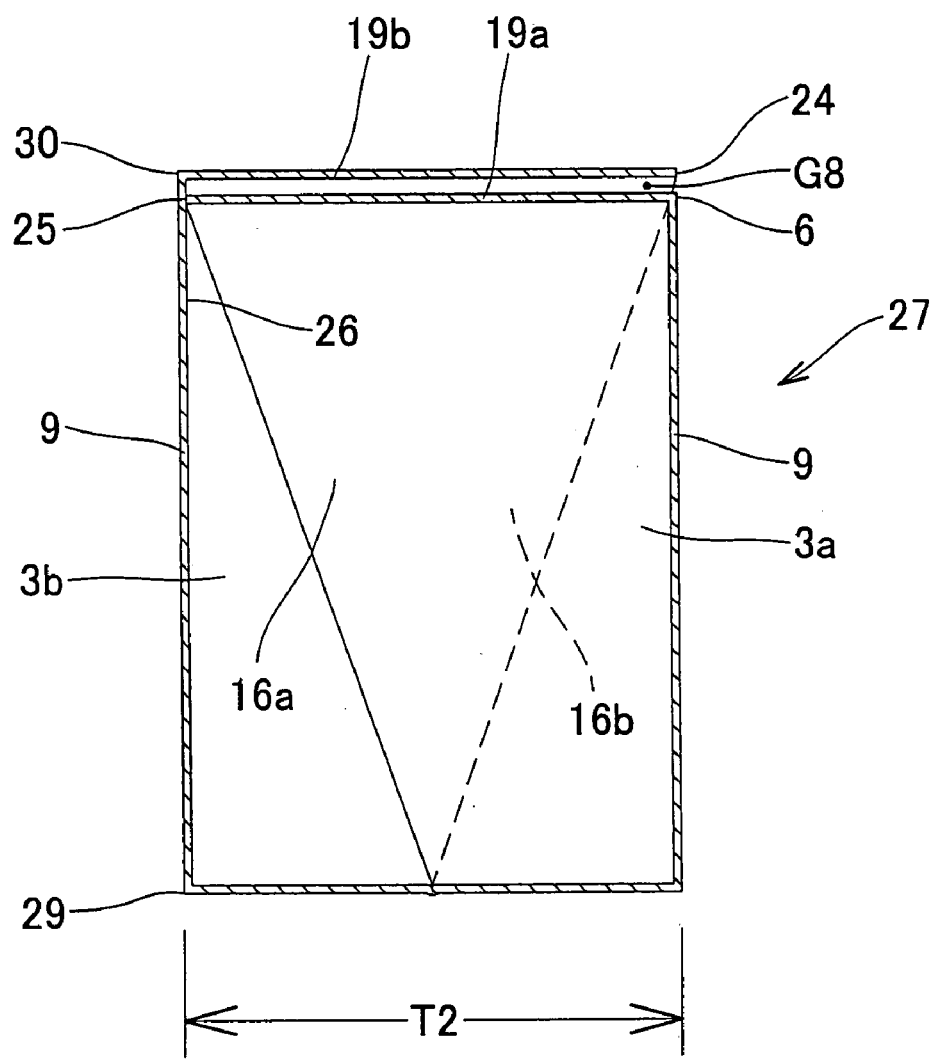
FIG. 34 is a cross sectional view showing the containers in the closed position.

When the containers 3, 3 are bent at the bend part 5 in a manner of closing them, and the upper edges 25, 25 of the front-end standing walls 19a, 19b of the containers 3a, 3b reach the substantially same height leaving a small gap G5, as shown in FIG. 33 (A), the facing upper edges 20, 20, 20, 20 of the side-part standing walls 16a, 16b reach the substantially same height leaving the small gap G6, as shown in FIG. 33(B). As the overlapping area of the front-end standing wall 19a of the inner container 3a and the front-end standing wall 19b of the outer container 3b becomes larger, an overlapping area of the facing side-part standing walls 16a, 16b, 16a, 16b of the containers 3a, 3b gradually becomes larger over the entire length. eventually, as shown in FIGS. 34 and 32, the side-part standing walls 16a, 16a of the inner container 3a overlap the insides of the side-part standing walls 16b, 16b of the outer container 3b leaving a gap G7 of about 0.4 mm, and the front-end standing wall 19a of the inner container 3a overlaps the inside of the front-end standing wall 19b of the outer container 3b leaving a gap G8 of about 1.3 mm. The upper edges 20, 20 of the two side-part standing walls 16, 16 become higher gradually toward the front ends 23, 23, as shown in FIG. 28. Therefore, as shown in FIG. 34, the overlapping area becomes larger toward the front-end side of the side-part standing walls. The heights H6, H8 of the front ends 23, 23 of the upper edges 20, 20 of the side-part standing walls 16, 16 are set to be twice as large as the heights H5, H7 of the base-ends 21, 21 of the upper edges 20, 20. Therefore, as shown in FIG. 34, in the state that the upper edge 25 of the front-end standing wall 19a of the inner container 3a is in contact with the front-end side of the inner face of the base element 9 of the outer container 3b (the front-end side of the bottom face 26 of the container 3b), the front-end side 6 of the base element 9 of the inner container 3a and the upper edge 24 of the front-end standing wall 19b of the outer container 3b reach the substantially same height leaving a gap G8 so that a box-like containing body 27 may be formed. Thus, the side face thickness T2 of the quadrangular box-like containing body 27 which is completely folded is made to have the even thickness of bout 28 mm from the base end 29 to the front end 30.

Figure 35:
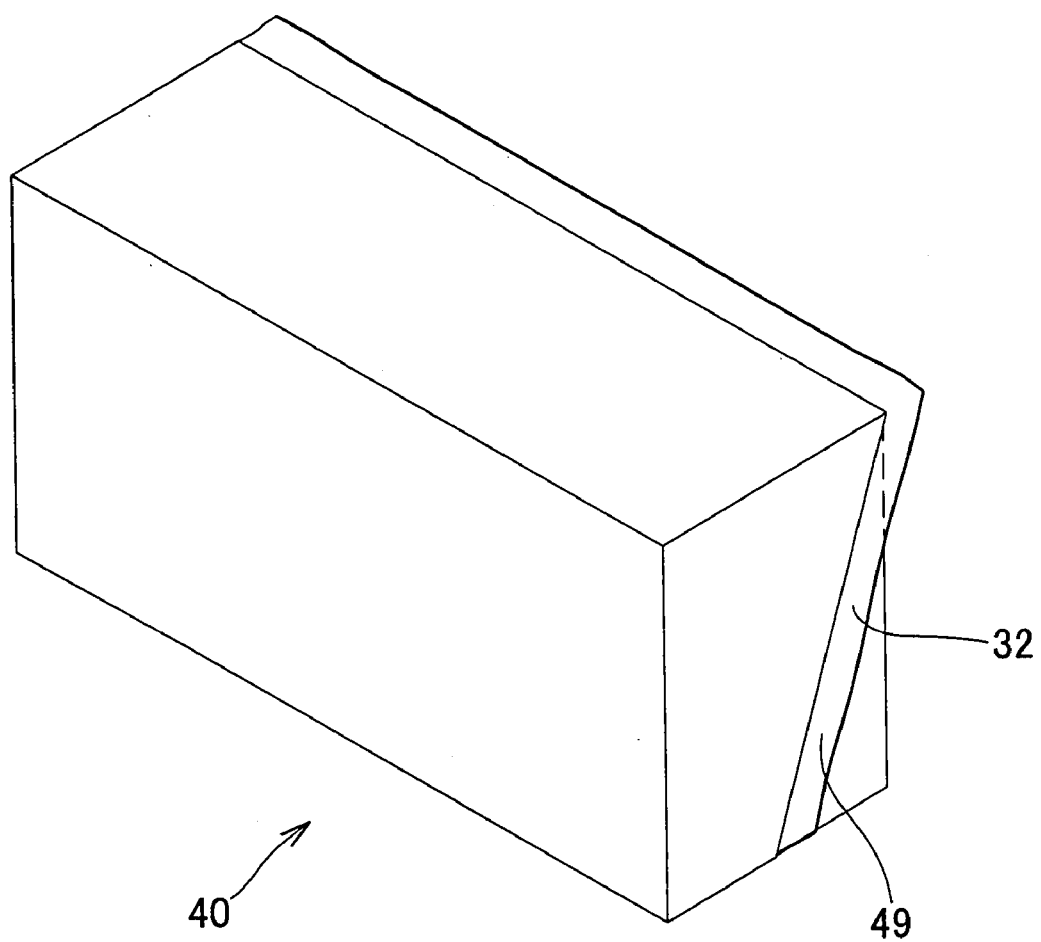
FIG. 35 is a perspective view of the packed rice ball which is made by using the rice-ball making implement.
Figure 36:
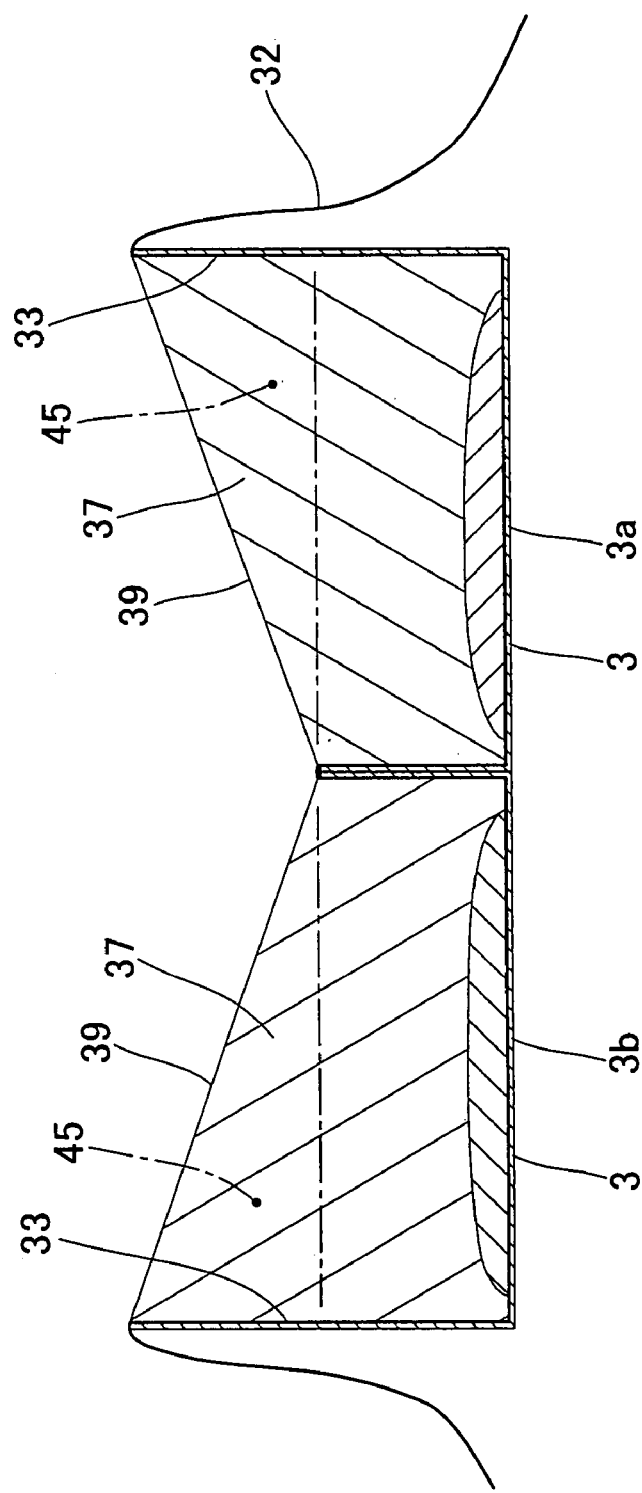
FIG. 36 is a cross sectional view showing the state that rice is contained in the containing recesses of the containers.
Figure 37:
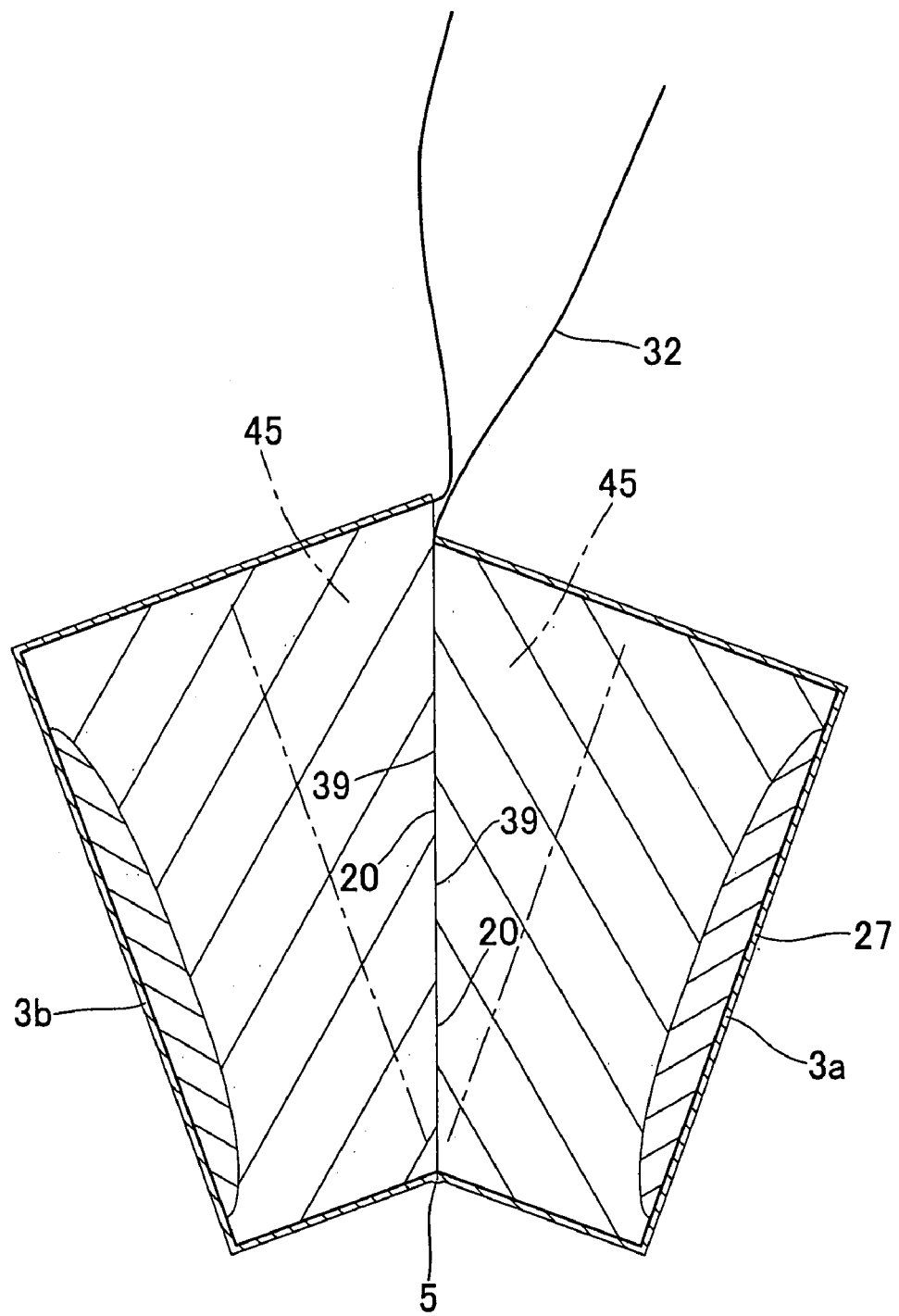
FIG. 37 is a cross sectional view of the containers in the state that the upper surface of the rice contained in each of the containers abuts on the other.
Figure 38:
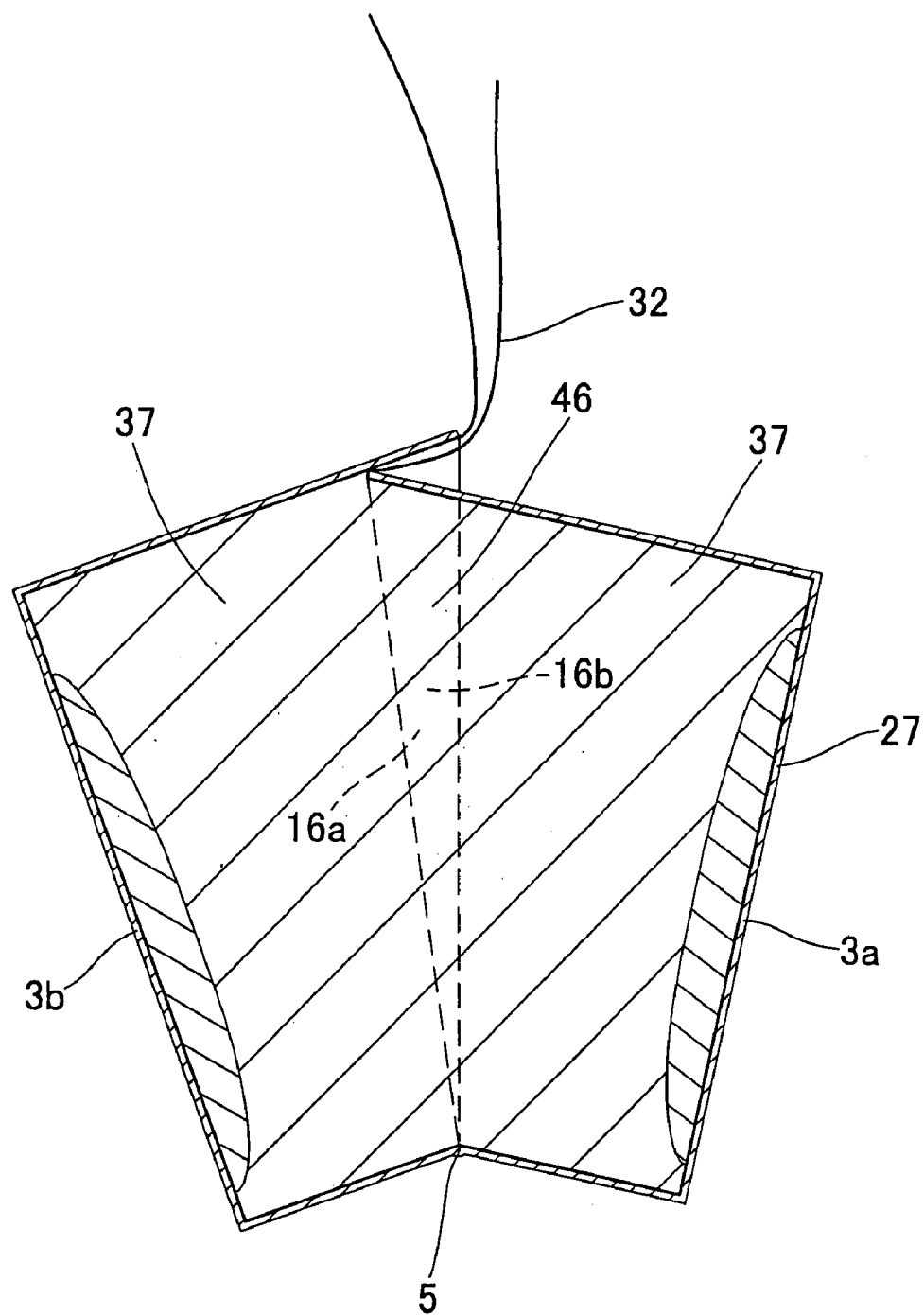
FIG. 38 is a cross sectional view showing the state that the containers are bent a little from the state shown in FIG. 37.
Figure 39:
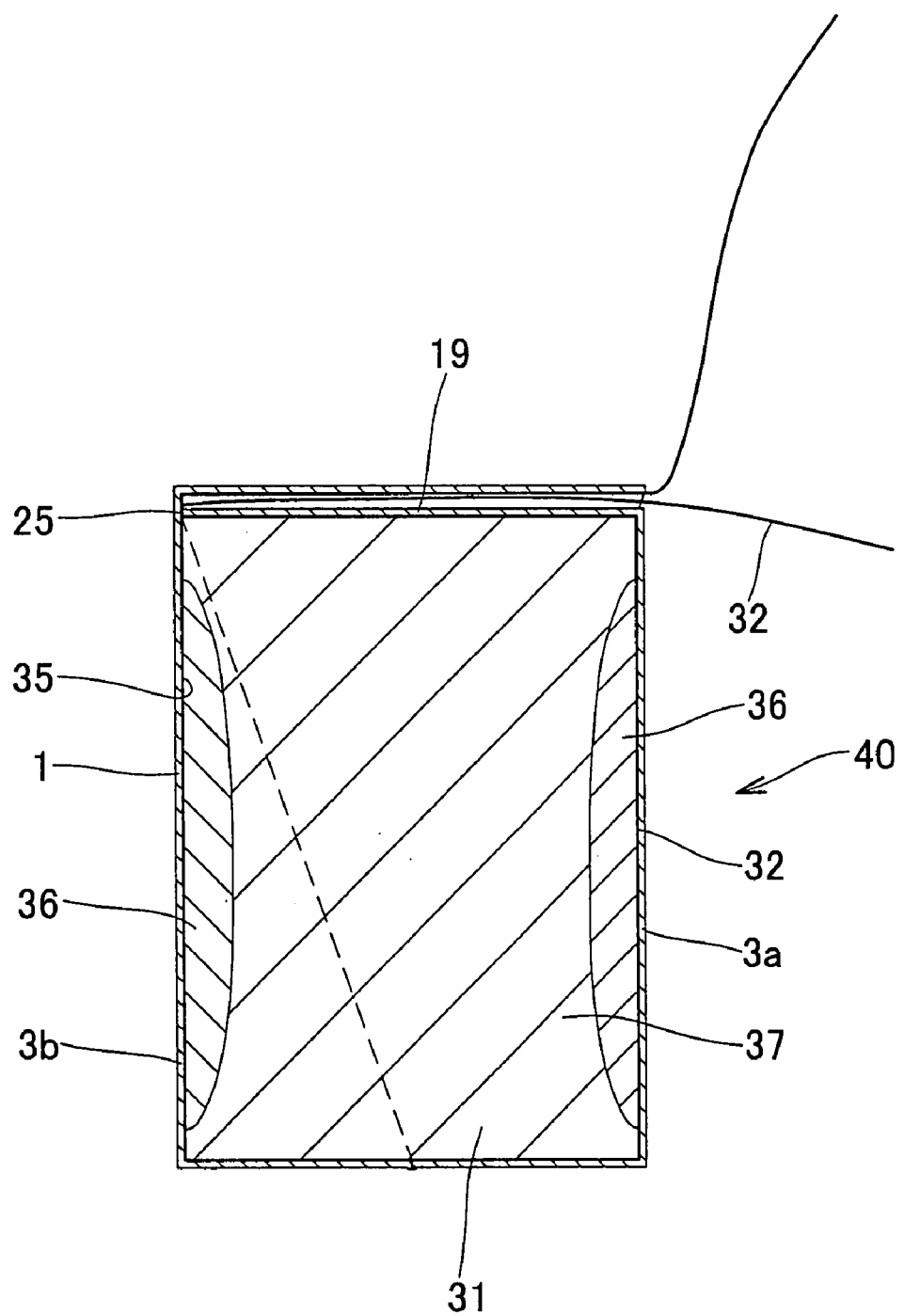
FIG. 39 is a cross sectional view of the packed rice ball which is made by closing the two containers.

The method for making the packed rice ball 40 of a quadrangular prism shape, as shown in FIG. 35, by using the rice-ball making implement 1 which is thus structured is explained below taking the implement 1 shown in FIG. 28 as an example. The rice ball can be made in a similar manner as explained in the Embodiment 1. Namely, as shown in FIG. 36, the rice 37 is placed in the containing recesses 33, 33 formed by the intermediary of the film-like object 32 in a manner that the upper surface of the rice has the same level as the upper edges of the containing recesses 33, 33. Then, as shown in FIG. 37, the right and left containers 3a, 3b are bent at the bend part 5 in a direction of closing them so that the entire upper surfaces 39, 39 of the rice in the containing recesses 33, 33 come into contact with each other. After that, as shown in FIG. 38, when the two containers 3a, 3b are bent further at the bend part 5, the inner container 3a enters into the outer container 3b, by which the rice 37 contained in the two containers 3a, 3b are compacted in a state of being bound by the box-like containing body 27 formed by the two containers so that the packed rice ball 40 as shown in FIGS. 39, 35 may be made. As the upper edges 20, 20 of the facing side part standing walls 16a, 16b are closed, and the inner container 3a enters into the outer container 3b in a state that the upper surfaces of the rice 37, 37 contained in the two containers 3a, 3b, respectively, are in contact with each other as shown in FIG. 37, the overlapping area of the facing side part standing walls 16a, 16b, 16a, 16b gradually becomes larger over the entire length, as shown in FIG. 38. Consequently, the compressed rice hardly comes out and surely bound by the containers 3a, 3b so that the rice may be compacted properly.

Figure 30:
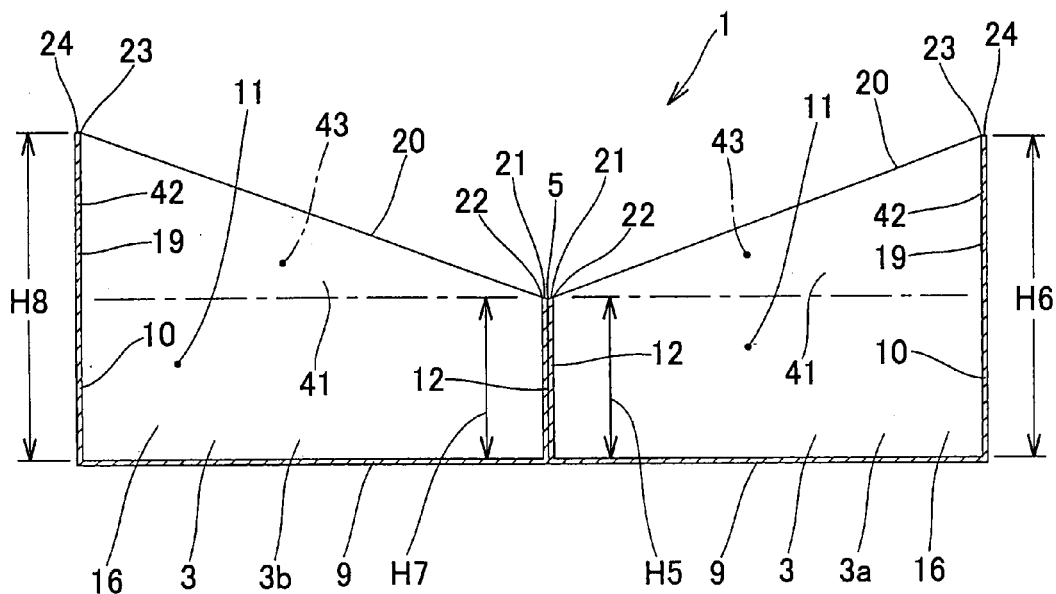
FIG. 30 is a cross sectional view showing the containers in the opened-up state.
Figure 30:
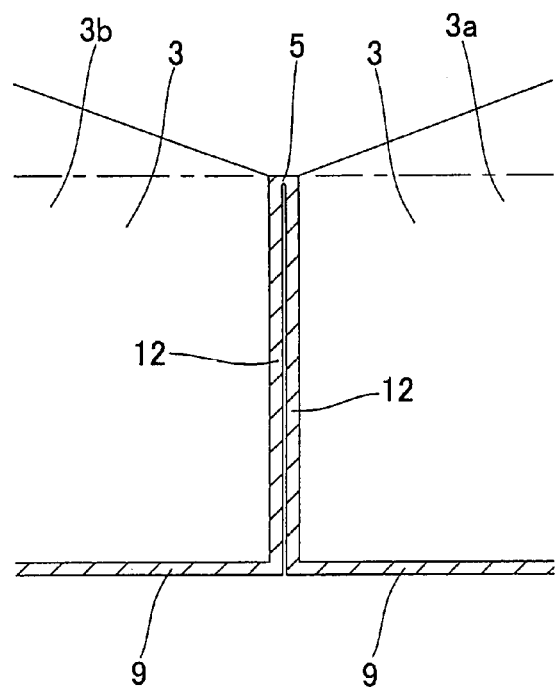

The compacting operation is effectively carried out in a similar manner as mentioned earlier. Namely, each of the containers 3a, 3b has the compression containing part 43 formed by a triangular side-part standing wall part 41 constituting the upper part higher than the upper edge 22 of the base-end standing wall 12 having the heights H5, H7, as shown in FIG. 30, and by the front-end standing wall part 42. Consequently, as the inner container 3a enters into the outer container 3b, as shown in FIG. 38, the compressed foodstuff (the compressed rice) 45 contained in the compression containing part 43 shown in FIG. 37 generates the pressurization force when the rice contained in the two containers 3a, 3b is compacted. The rice is compacted at the front-side part 46 of the box-like containing rice at the front-side part 46 becomes higher, part of the rice at the front-side part moves toward the base-end side in the box-like containing body, and the density of the rice in the middle part and the base-end part of the box-like containing body becomes higher, whereby the rice ball properly compacted all over may be obtained.

Thus, the packed rice ball 40 in a shape of a quadrangular prism, which is made by the rice-ball making implement 1 by the intermediary of the film-like object 32, as shown in FIGS. 39 and 35, can be obtained. The rice ball 31 which is thus made can be carried hygienically without losing its shape. Preferably, the edge part 49 of the film-like object 32 of the packed rice ball 40 is cut short along the outer periphery of the rice ball, as shown in FIG. 35, for the better appearance. Since the film-like object 32 has an effect of keeping moisture, the rice ball is well tasted even after expiration of a predetermined period after making without dirtying the hand in a similar manner as mentioned earlier.

SECOND EMBODIMENT

Figure 40:
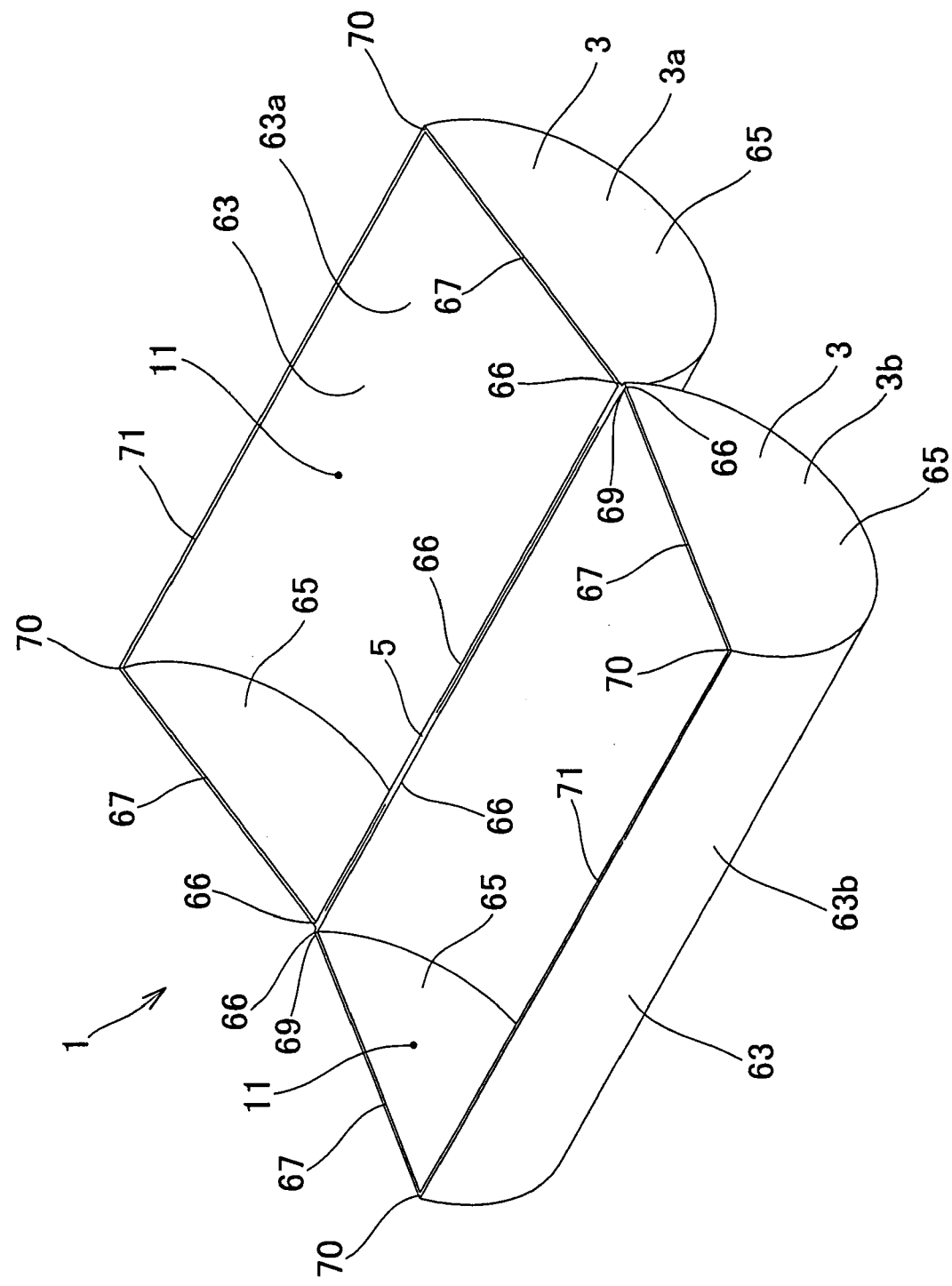
FIG. 40 is a perspective view showing another embodiment of the rice-ball making implement of this invention.
Figure 41:
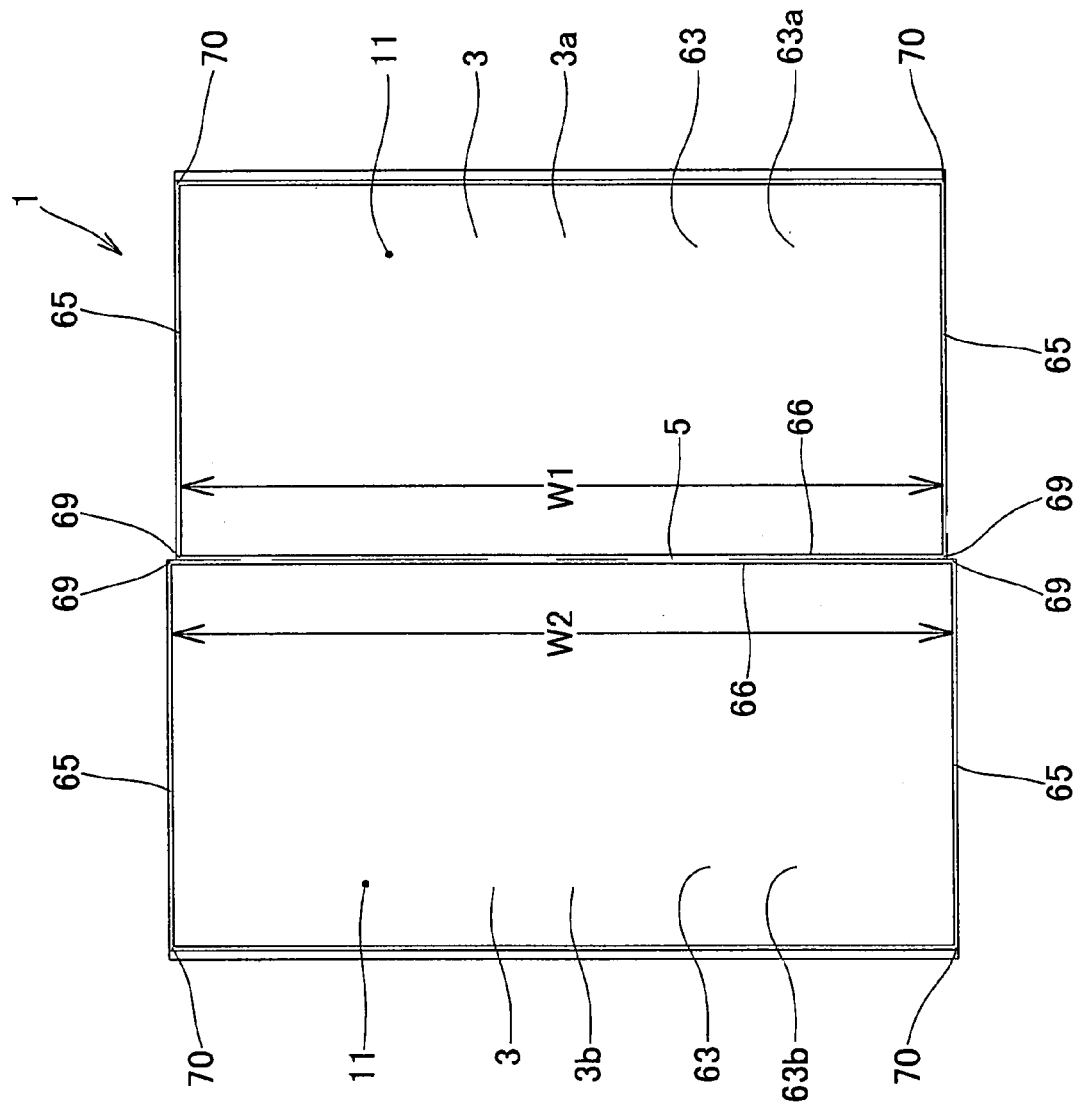
FIG. 41 is a plan view showing the containers in the opened-up state.
Figure 42:
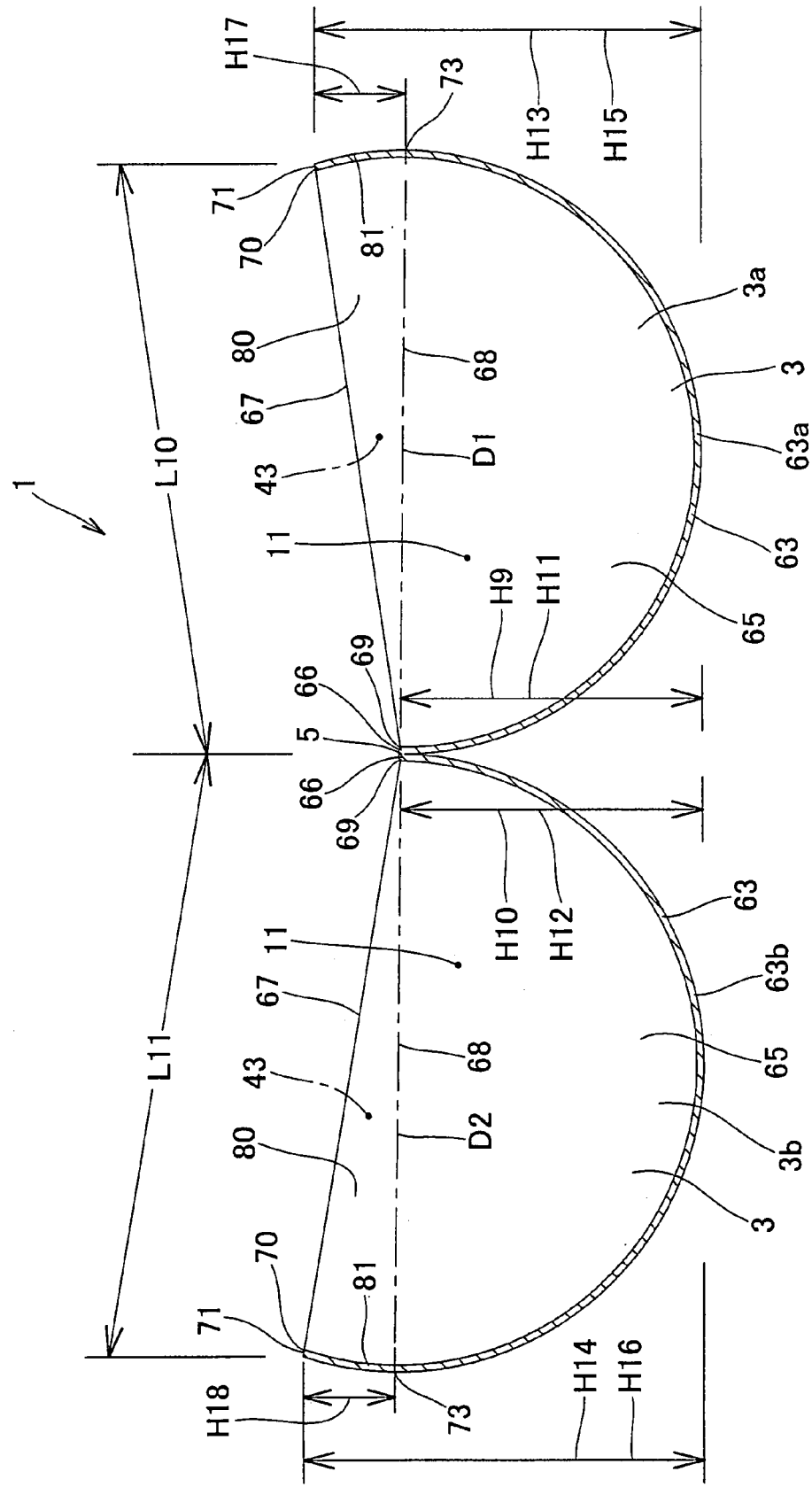
FIG. 42 is a cross sectional view showing the containers in the opened-up state.
Figure 43:
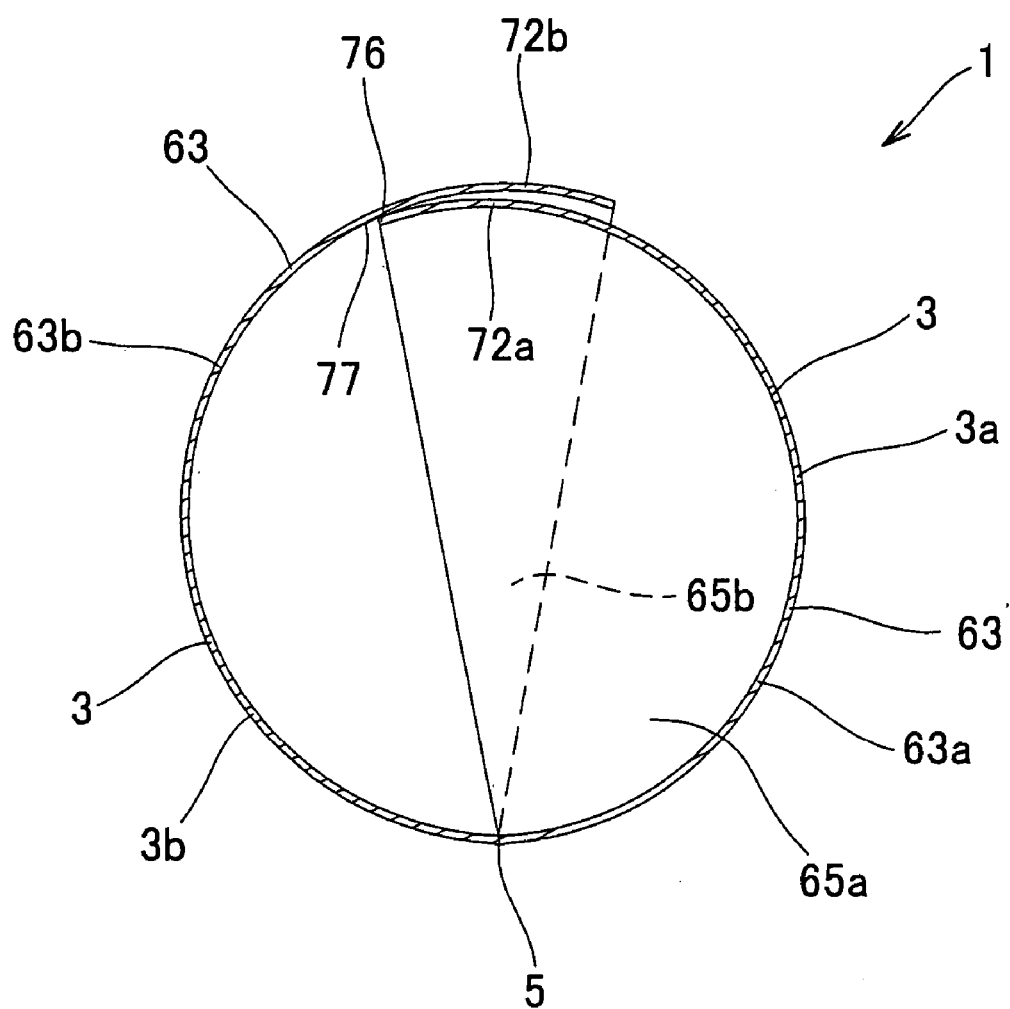
FIG. 43 is a cross sectional view showing the containers in a state of being convoluted a little.

FIGS. 40 to 42 show another embodiment of the rice-ball making implement 1, in which the two containers 3, 3 connected by the bend part 5 are respectively formed to have a half-cut cylindrical shape with their both ends closed. To be more specific, the container 3 comprises a base element 63 bent to form a half-circular arc, and half-round side elements 65, 65 for closing two end-opening parts on both sides of the base element 63. The containing part 11 for containing the foodstuff is formed by the base elements 63, 63 and the two side elements 65, 65. Base ends 66, 66 of the base elements 63, 63 are connected to each other by the bend part 5. The two containers, 3, 3 are formed in a manner that a height of an upper edge 67 of the two side elements 65, 65 gradually becomes larger from a base end 69 toward a front end 70. The heights H9, H10 of the base end 69 of the upper edge 67 of the two side elements 65, 65 are set to be the same as the heights H11, H12 of the base end 66 of the base element 63. The heights H13, H14 of the front end 70 of the upper edge 67 are set to be the same as the heights H15, H16 of the front end 71 of the base element 63. The container 3b is made to be slightly larger than the other container 3a so that a front end part 72a and the two side elements 65a, 65a of the base element 63a of the container 3a may overlap the insides of a front side part 72b and the two side elements 65b, 65b of the base element 63b of the container 3b when the two containers 3, 3 are folded at the bend part 5 in a manner of closing them, as shown in FIG. 43.

To exemplify the dimension of each part of the rice-ball making implement 1 which is structured as mentioned above, the width W1 of the half-circular arc-shaped base element 63a of the container (also referred to as the inner container, hereinafter) 3a is set to be 77.2 mm. The distance (outer diameter) D1 between the base end 66 of the base element 63a and an intersection 73 of a horizontal line 68 passing the base end 66 and the front-end side of the base element 63a is set to be 39.0 mm. The height H17 of the front end 71 of the base element 63a measured from the intersection 73 is set to be 6.0 mm. As a whole, the base element 3a has the shape that part of a cylinder having the outer diameter of 39.0 mm is cut away. The length L10 between the base end 66 and the front end 71 of the base element 63a is set to be 38.5 mm.

The width W2 of the base element 63b of the other container (also referred to as the outer container) 3b is set to be 79.1 mm. The distance (outer diameter) D2 between the base end 66 of the base element 63b and the intersection 73 of the horizontal line 68 passing the base end 66 and the front-end side of the base element 63b is set to be 40.0 mm. The height H18 of the front end 71 of the base element 63b measured from the intersection 73 is set to be 6.0 mm. As a whole, the base element 3b has the shape that part of the cylinder having the outer diameter of 40.0 mm is cut away. The length L11 between the base end 66 and the front end 71 of the base element 63b is set to be 39.5 mm.

Accordingly, when the two containers are bent at the bend part 5 in a manner of closing them, the container 3a gradually enters into the other container 3b from the front end to form a convolute state. FIG. 43 shows the state that a front end 76 of the base element 63a of the container 3a is in contact with an inner surface 77 of the front-side part of the base element 63b of the other container 3b.

Figure 44:
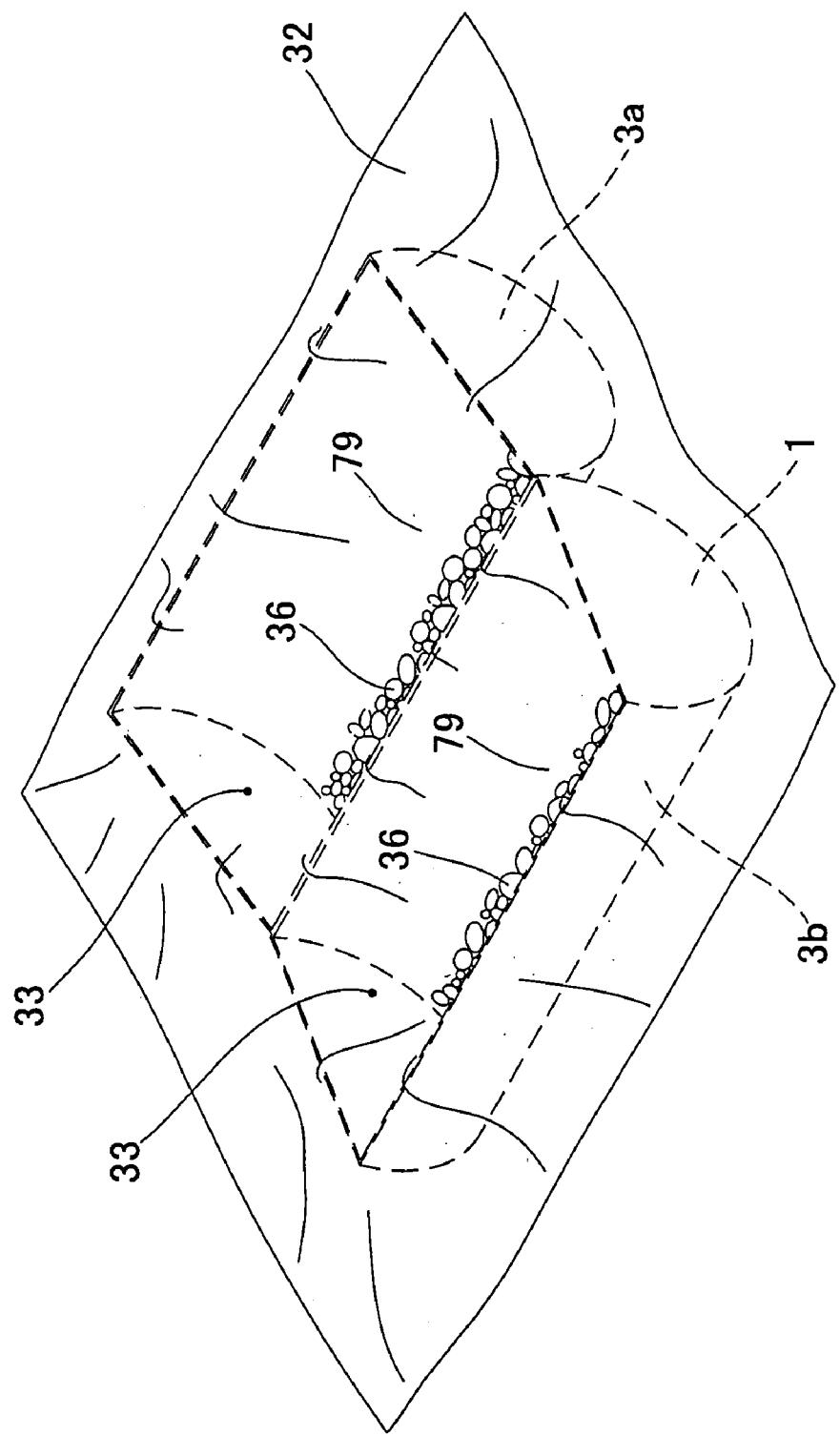
FIG. 44 is a perspective view showing the state that the filling is placed on the bottom parts of the containing recesses formed by the containers in the expanded state.
Figure 45:
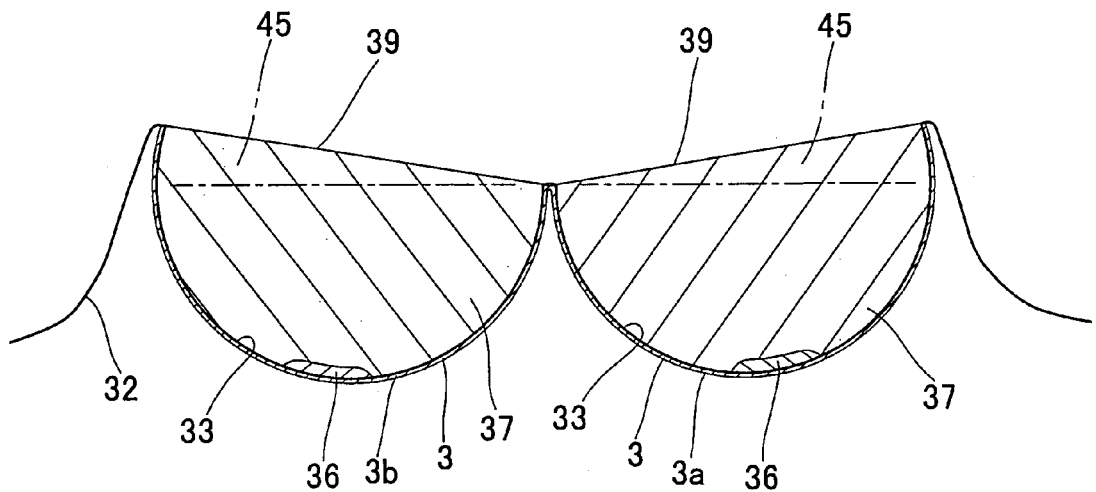
FIG. 45 is a cross sectional view showing the state that the rice is contained in the containing recesses of the containers.
Figure 45:
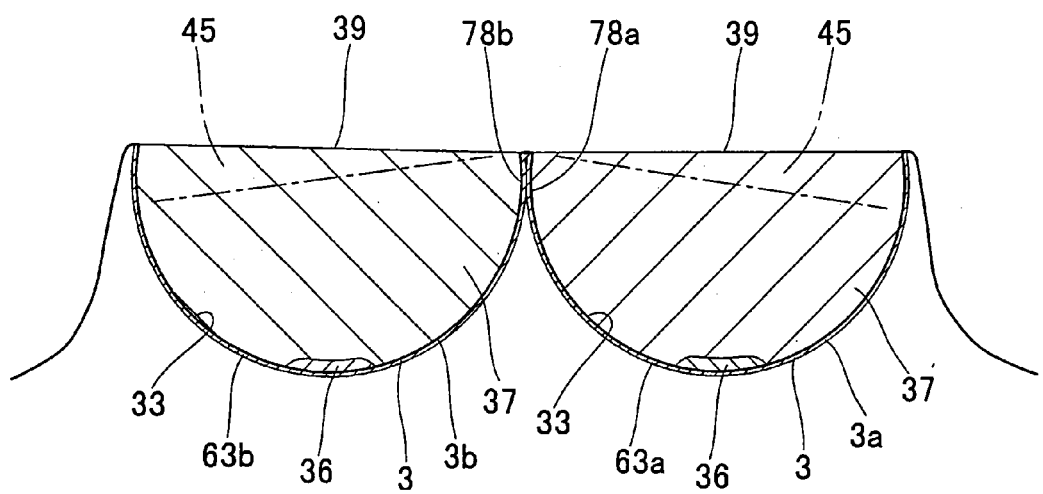
Figure 48:
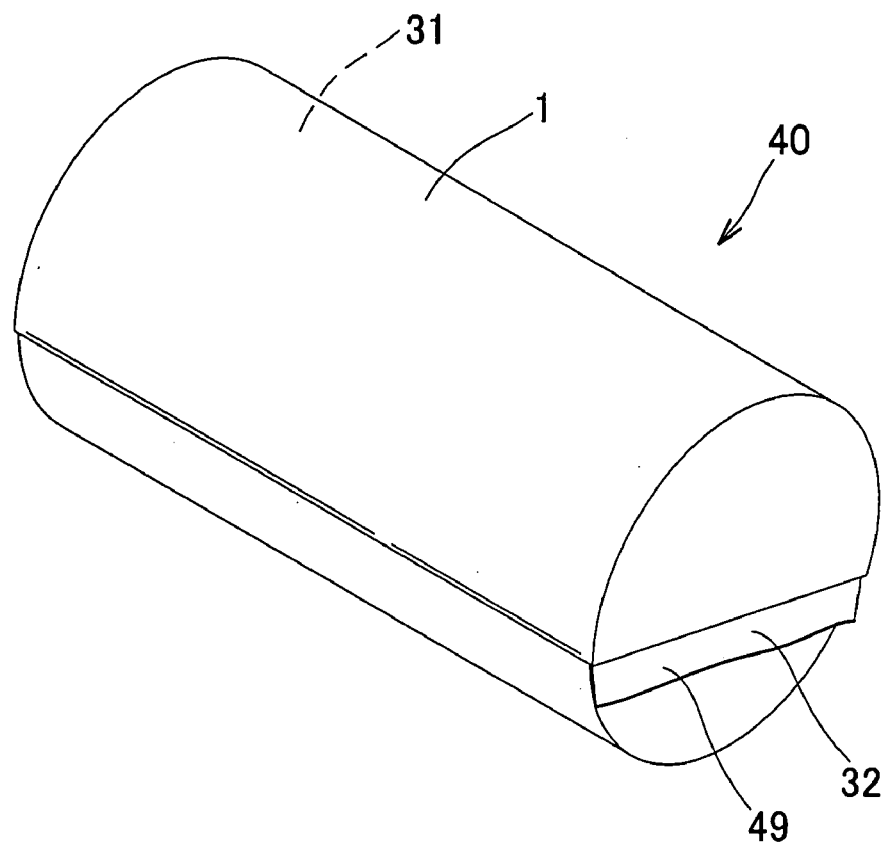
FIG. 48 is a perspective view showing the packed rice ball.

A method for making the packed rice ball 40 having a cylindrical shape as shown in FIG. 48 by using the rice-ball making implement 1 with the above-mentioned structure is as follows. First, as shown in FIG. 44, the two containers 3a, 3b are opened up and the film-like object (a wrapping film, for example) 32 having a needed size is spread over the containers 3a, 3b. The film-like object 32 is pressed into the containing parts 11, 11 of the containers 3a, 3b to form the containing recesses 33, 33. Next, as shown in FIG. 44, the ingredient 36 like the seasoned dried food topping as mentioned earlier is placed on bottom parts 79, 79 of the containing recesses 33, 33. Since the containing recesses 33, 33 have the shape of a half-circular arc, the placed ingredient 36 can form a straight line. Then, as shown in FIG. 45, the foodstuff like the rice 37 is placed in each containing recess 33 and is leveled so that the upper face 39 of the rice may be flush with the upper edge of the containing recess 33. In FIG. 45(A), the rice 37 is placed in a state that the upper end face of the containing recess 33 is inclined, while in FIG. 45(B), the rice is placed in a state that the upper end face of the containing recess 33 is horizontal. When the upper end face of the containing recess 33 is horizontal, since a base-end side part 78a of the base element 63a of the container 3a and a base-end side part 78b of the base element 63b of the container 3b are in contact with each other and the opened-up state of the two containers 3a, 3b is stable, as shown in FIG. 45(B), the rice can be placed in the two containers 3a, 3b in a stable state.

Figure 46:
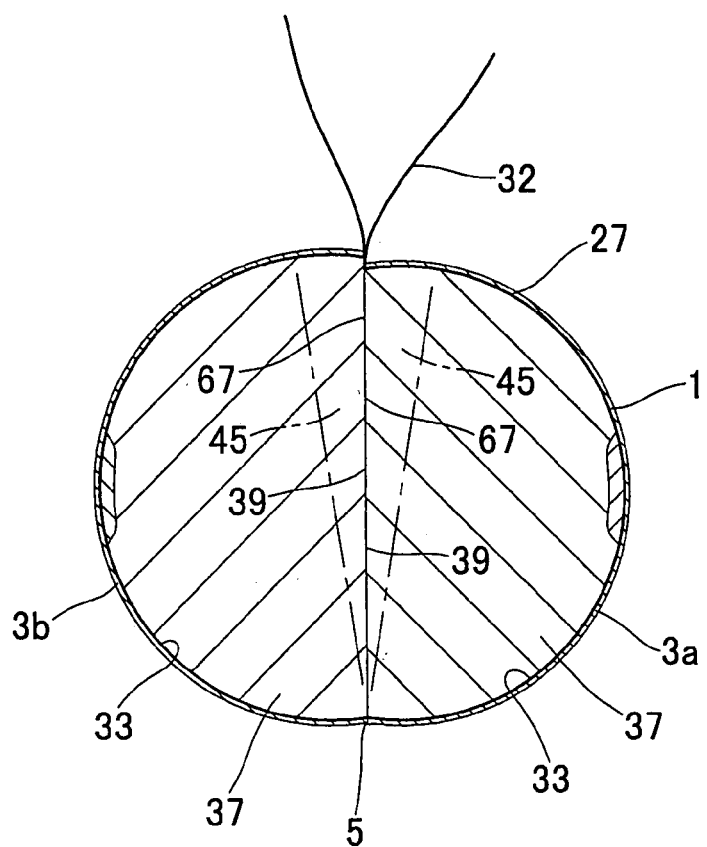
FIG. 46 is a cross sectional view showing the containers in the state that the surface of the rice contained in each of the containers abuts on the other.
Figure 47:
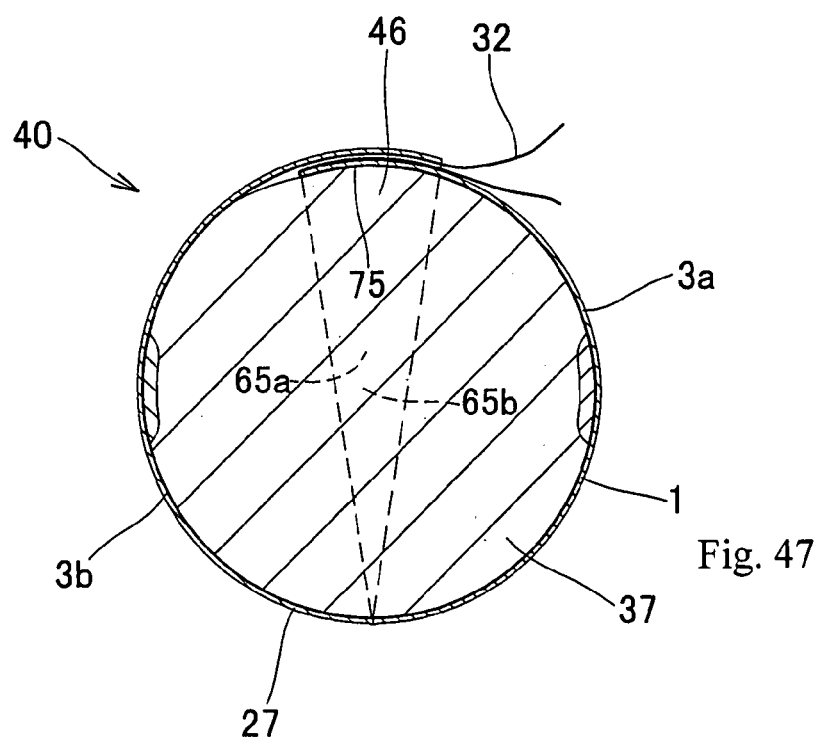
FIG. 47 is a cross sectional view of the packed rice ball which is made by convoluting the containers.

After that, as shown in FIG. 46, the rice-ball making implement 1 is bent at the bend part 5 in a manner of closing the two containers 3a, 3b. By this bending operation, the upper faces 39, 39 of the rice in the two containing recesses 33, 33 come into contact with each other and a box-like containing body 27 is formed. Next, in a state that the front-end side of the inner container 3a enters into the front side part of the outer container 3b, the two containers 3a, 3b are bent further. Then, the inner container 3a gradually come into the outer container 3b and a convolute state is formed. Along with this convolution, the rice 37 contained in the two containers 3a, 3b is compacted in a state of being bound by the box-like containing body 27 formed by the two containers so that the packed rice ball 40 of the cylindrical shape as shown in FIG. 47 can be made. In a state that the upper faces 39, 39 of the lumps of rice 37, 37 contained in the two containers 3a, 3b are in contact with each other as shown in FIG. 46, as the upper edges 67, 67 of the side elements 65a, 65b facing each other are closed, and the inner container 3a enters into the outer container 3b in a convolute state, the side elements 65a, 65b, 65a, 65b facing each other gradually overlap over the entire length. Therefore, the rice 37 which is compressed does not come out but is compacted properly in a state of being bound surely by the two containers 3a, 3b.

The compacting operation is effectively carried out in a similar manner as in the embodiment 1. Namely, since each of the containers 3a, 3b has a compression containing part 43 constituting the upper part higher than the base end 66 of the base element 63 and being formed by two triangular side element parts 80, 80 and a front-side part 81 of the base element 63, as shown in FIG. 42, as the inner container 3a enters into the outer container 3b to have the convolute state, the compressed foodstuff (the compressed rice) 45 (FIGS. 45 and 46) contained in the compression containing part 43 generates the pressurization force upon compacting the rice 37 contained in the two containers 3a, 3b. The rice is compacted by the pressurization force in the front-side part 46 of the box-like containing body 27. As the density of the rice in the front-side part 46 becomes higher, part of the rice in the front-side part moves toward the base-end side in the box-like containing body 27, and the density of the rice in the intermediate part and the base-end side part in the box-like containing body 27 becomes higher, by which the rice ball properly compacted over all can be obtained. In the meantime, depending on the degree of the convolution, the rice ball may be compacted comparatively hard or softly, whereby the degree of compacting may be changed according to the preference.

Figure 49:
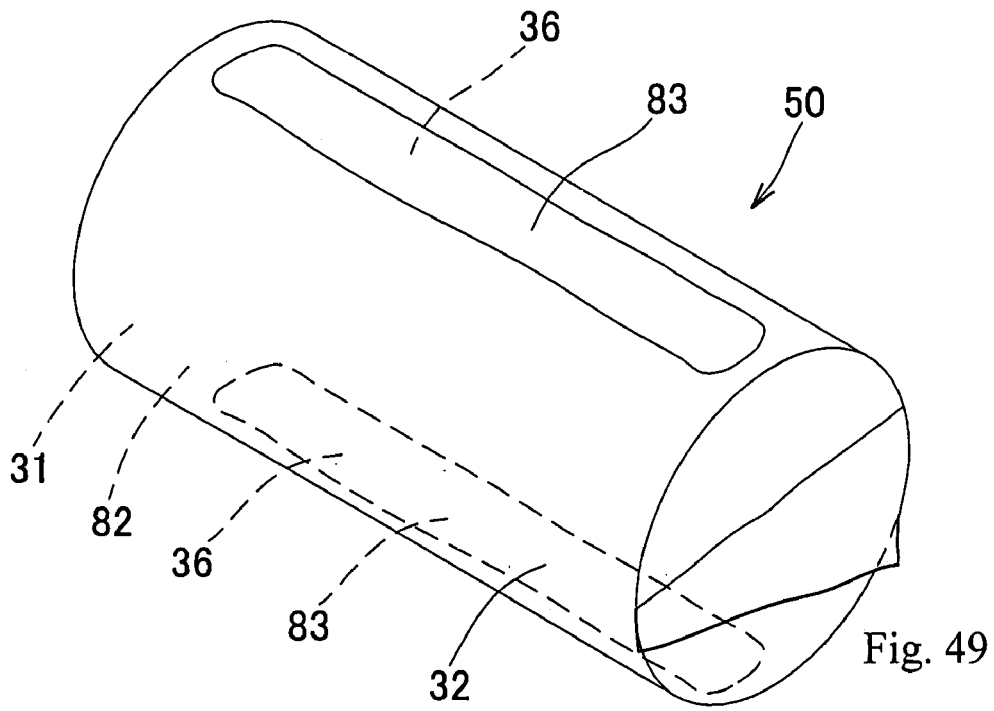
FIG. 49 is a perspective view showing the rice ball wrapped in the film-like object.

Thus, the packed rice ball 40 of the cylindrical shape as shown in FIG. 48 packed with the rice-ball making implement 1 by the intermediary of the film-like object 32 can be obtained. As shown in FIG. 49, two longitudinal lines 83, 83 comprising the ingredient 36 are formed on a surface 82 of the rice ball 31. The rice ball 31 that is thus made can be carried hygienically without losing its shape by carrying the packed rice ball 40 as it is. Preferably, the edge part 49 of the film-like object 32 of the packed rice ball 40 is cut short along the outer periphery of the rice ball, as shown in FIG. 48, for the better appearance. Since the film-like object 32 has an effect of keeping moisture, the rice ball is well tasted even after expiration of a predetermined period after making, without dirtying the hand.

When the rice ball is eaten, the covered rice ball 50 covered with the film-like object 32 is taken out by opening the two containers 3a, 3b, and the film-like object 32 is removed. In this occasion, the side face of the rice ball is held by the hand by the intermediary of the film-like object 32 and is eaten while the film-like object 32 is being removed from the front end. Accordingly, the rice ball is eaten hygienically without dirtying the hand.

Figure 50:
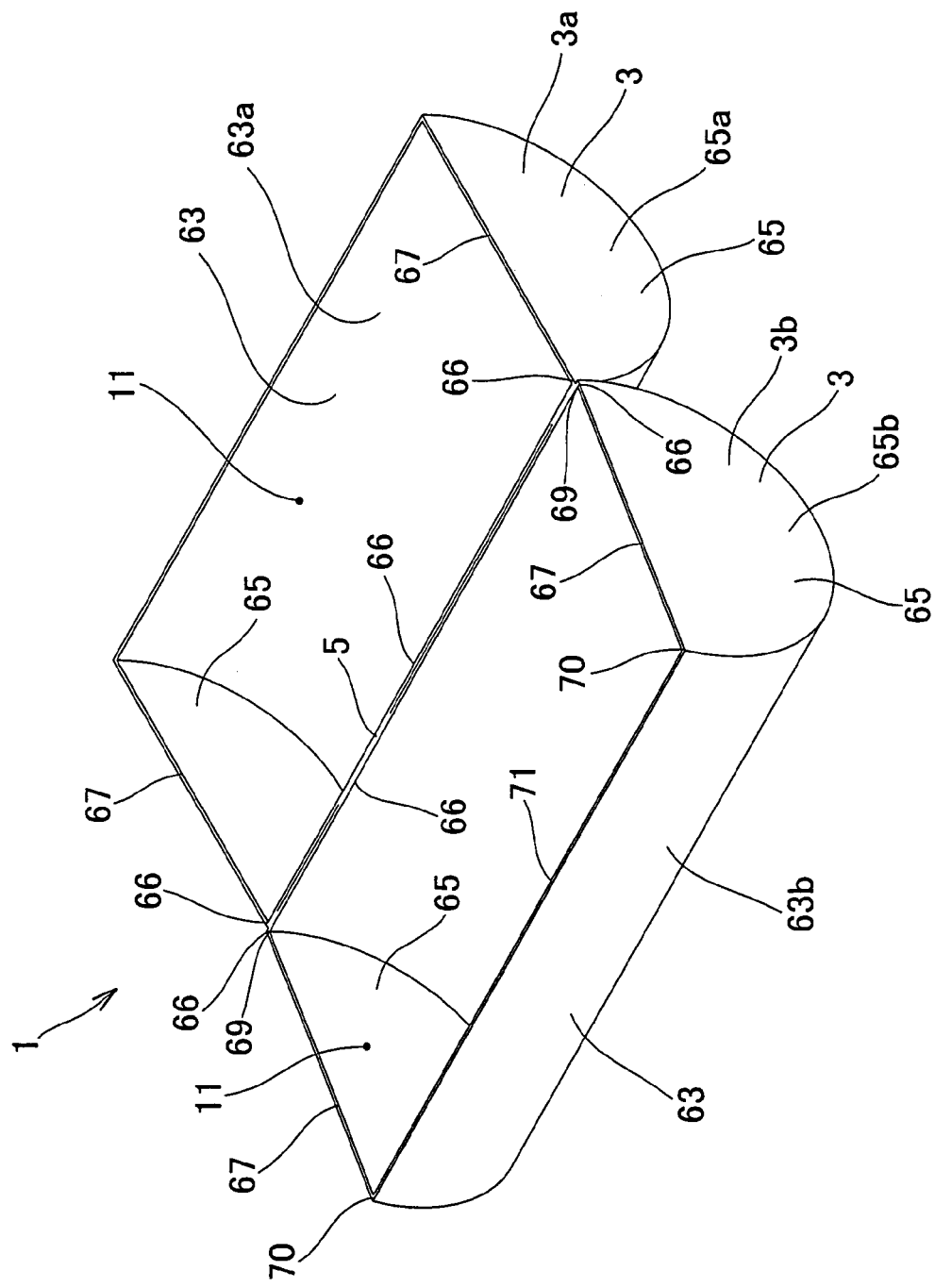
FIG. 50 is a perspective view showing another embodiment of the rice-ball making implement of this invention.
Figure 51:
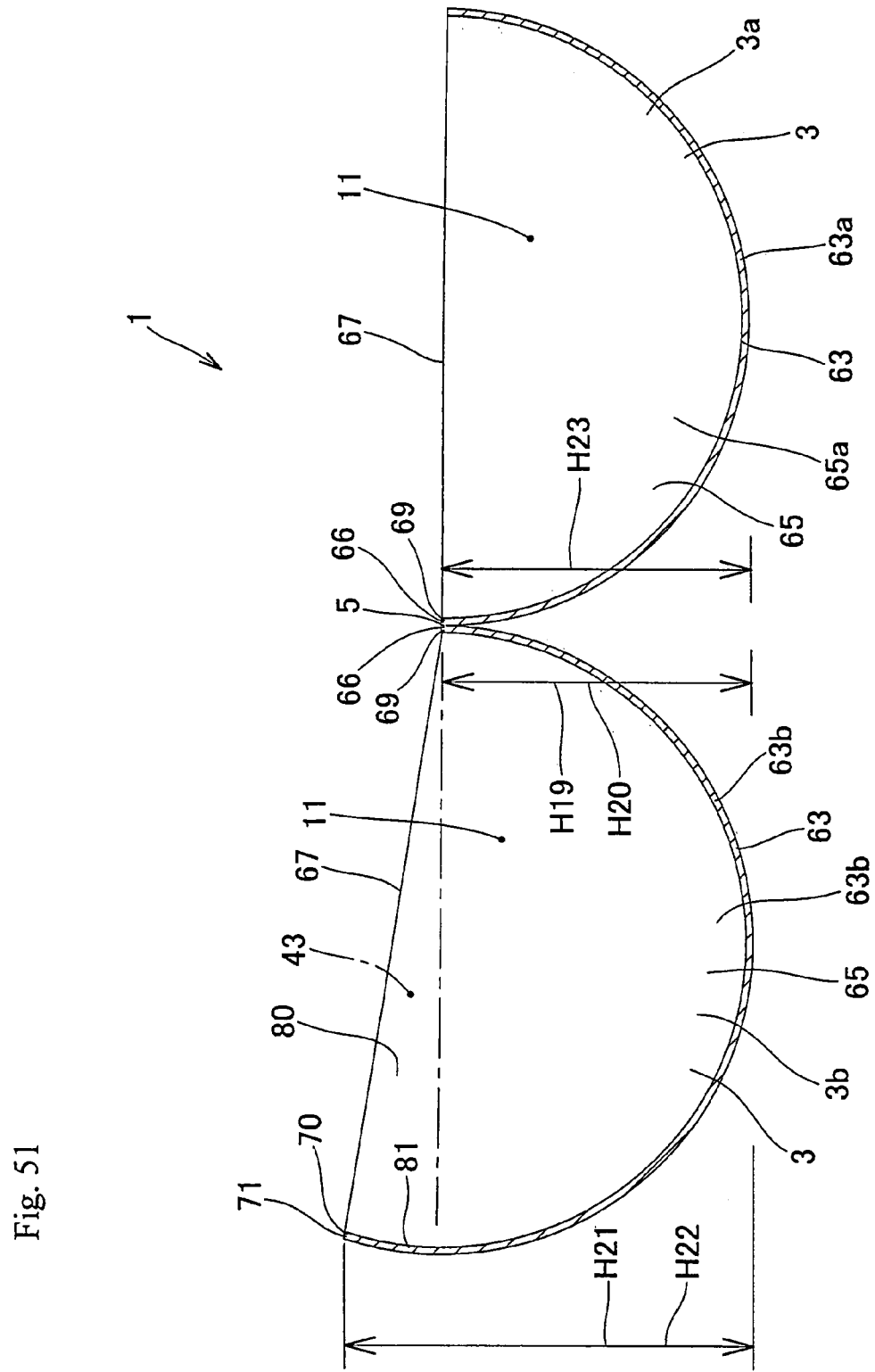
FIG. 51 is a plan view showing the containers in the opened-up state.
Figure 52:
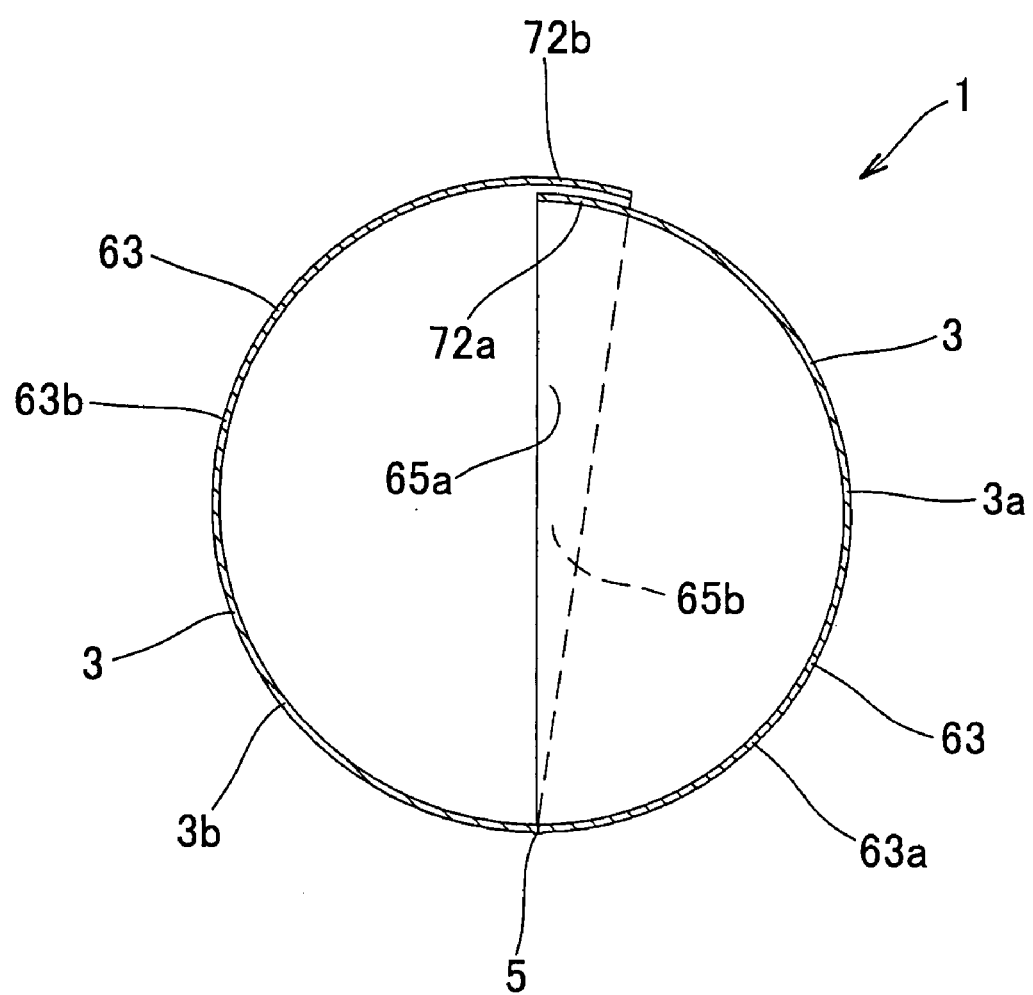
FIG. 52 is a cross sectional view showing the containers in the state of being convoluted a little.

FIGS. 50 and 51 show another embodiment of the rice-ball making implement 1. In this embodiment, the container 3b of the two containers 3, 3 connected by the bend part 5 has the half-round side elements 65, 65 closing the two end opening parts of the base element 63 which is bent to form a half-circular arc. The height of the upper edge 67 of the side elements 65, 65 gradually become higher from the base end 69 toward the front end 70. The height H19 of the base end 69 of the upper edge 67 of the two side elements 65, 65 is set to have the same height as the height H20 of the base end 66 of the base element 63. The height H21 of the front end 70 of the upper edge 67 is set to have the same height as the height H22 of the front end 71 of the base element 63. On the other hand, in the other container 3a, the heights 23 of the upper edges 67 of the half-circular-arc-shaped side elements 65, 65 closing the two end opening parts of the base element 63 bent to have a half-circular-arc-shape are set to be the same. The container 3b is made to be slightly larger than the other container 3a so that the front side part 72a and the side elements 65a, 65a of the base element 63a of the container 3a may overlap the insides of the front side part 72b and the side elements 65b, 65b of the base element 63b of the container 3b, as shown in FIG. 52, when the two containers 3, 3 are folded at the bend part 5 in a manner of closing them.

Figure 53:
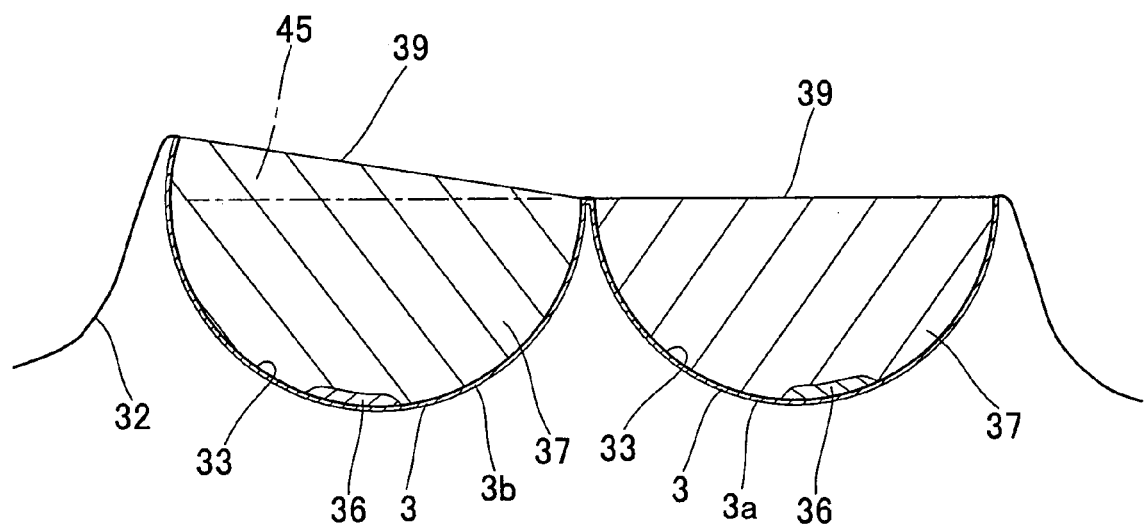
FIG. 53 is a cross sectional view showing the state that the rice is contained in the containing recesses of the containers.

A method for making the packed rice ball 40 of a cylindrical shape using the rice-ball making implement 1 having the structure as mentioned above is similar to the method mentioned earlier. First, as shown in FIG. 53, the two containers 3a, 3b are opened-up and the film-like object (a wrapping film, for example) 32 having a needed size is spread over the containers 3a, 3b. The film-like object 32 is pressed into the containing parts 11, 11 of the containers 3a, 3b to form the containing recesses 33, 33. Next, as shown in FIG. 53, the ingredient 36 like the seasoned dried food topping as mentioned earlier is placed on bottom parts of the containing recesses 33, 33. Next, as shown in FIG. 53, the foodstuff like the rice 37 is placed in the containing recess 33 and is leveled so that the upper surface 39 of the rice may be substantially flush with the upper end of the containing recess 33.

Figure 54:
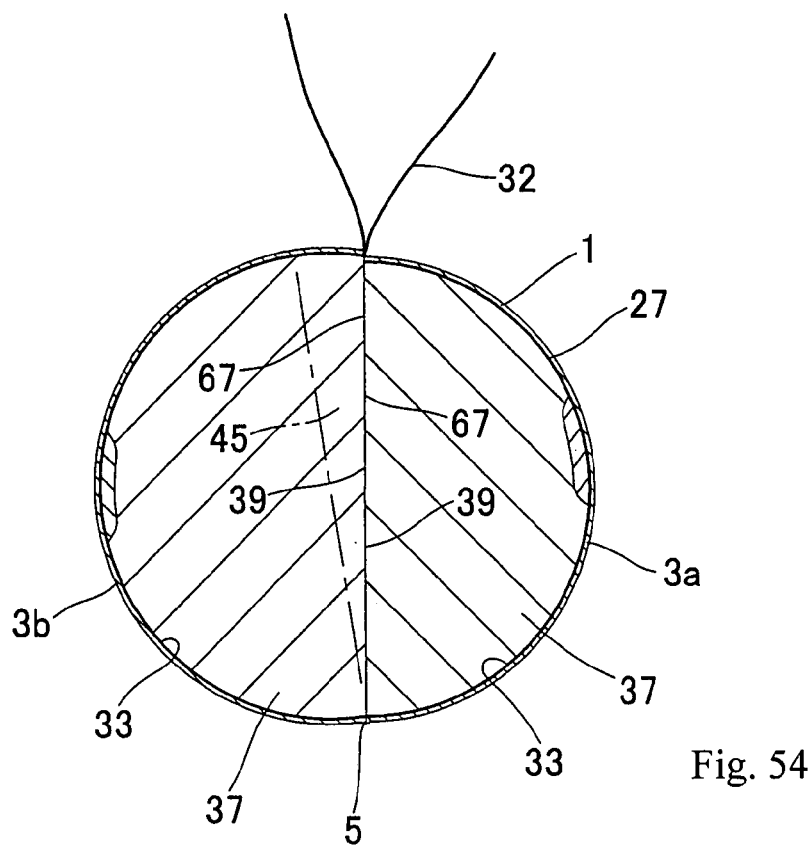
FIG. 54 is a cross sectional view showing the state that the upper surfaces of the rice contained in the containers abut on each other.
Figure 55:
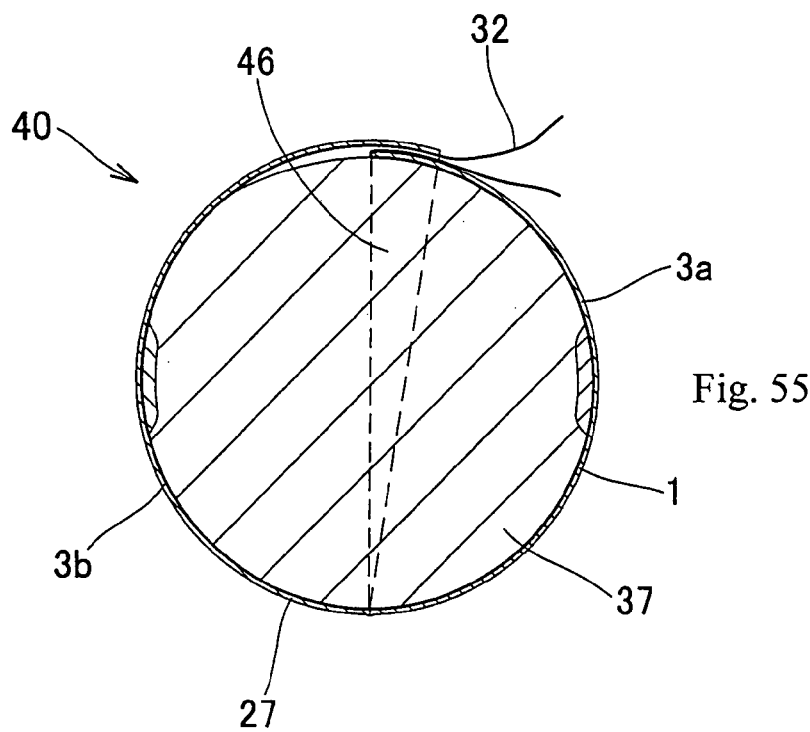
FIG. 55 is a cross sectional view showing the packed rice ball which is made by convoluting the containers.

After that, the rice-ball making implement 1 is bent at the bend part 5 in a manner of closing the two containers 3a, 3b, as shown in FIG. 54 By this bending operation, the upper surfaces 39, 39 of the rice in the containing recesses 33, 33 come into contact with each other and a box-like containing body 27 is formed. Then, in the state that the front-end side of the inner container 3a comes into the front side part of the outer container 3b, the containers 3a, 3b are bent further so that the inner container 3a may gradually enter into the outer container 3b to obtain the convolute state. With this convolution, the rice 37 contained in the containers 3a, 3b is compacted in a state of being bound by the box-like containing body 27 formed by the two containers so that the packed rice ball 40 of the cylindrical shape as shown in FIG. 55 can be made. In the state as shown in FIG. 54 in which the upper surfaces 39, 39 of the rice lumps 37, 37 contained in the containers 3a, 3b are in contact with each other, the upper edges 67, 67 of the side elements 65a, 65b facing each other are substantially closed. As the inner container 3a enters into the outer container 3b in a state of convolution, the side elements 65a, 65b, 65a, 65b facing each other gradually overlap over the entire length. Therefore, the compressed rice 37 does not come out but is compacted properly in a state of surely bound by the two containers 3a, 3b.

The compacting is effectively carried out in a similar manner as mentioned earlier. Namely, since the container 3b has the compression containing part 43 formed by two triangular side element parts 80, 80 constituting the part higher than the base end 66 of the base element 63, and the front-side part 81, as shown in FIG. 51, the compressed foodstuff (the compressed rice) 45 (FIGS. 53 and 54) contained in the compression containing part 43 generates the pressurization force when the rice 37 contained in the two containers 3a, 3b is compacted, as the inner container 3a enters into the outer container 3b in the state of convolution. The rice in the front-side part 46 of the box-like containing body 27 is compacted by the pressurization force. As the density of the rice in the front-side part 46 becomes higher, part of the rice in the front-side part moves to the base-end side in the box-like containing body 27 and the density of the rice in the intermediate part and the base-end side part in the box-like containing body 27 becomes high so that the properly compacted rice ball over all can be obtained.

THIRD EMBODIMENT

The invention is never limited to the embodiments described above. Needless to say, various changes in design within what are claimed in the claims are possible. An example is described as follows.

Figure 56:
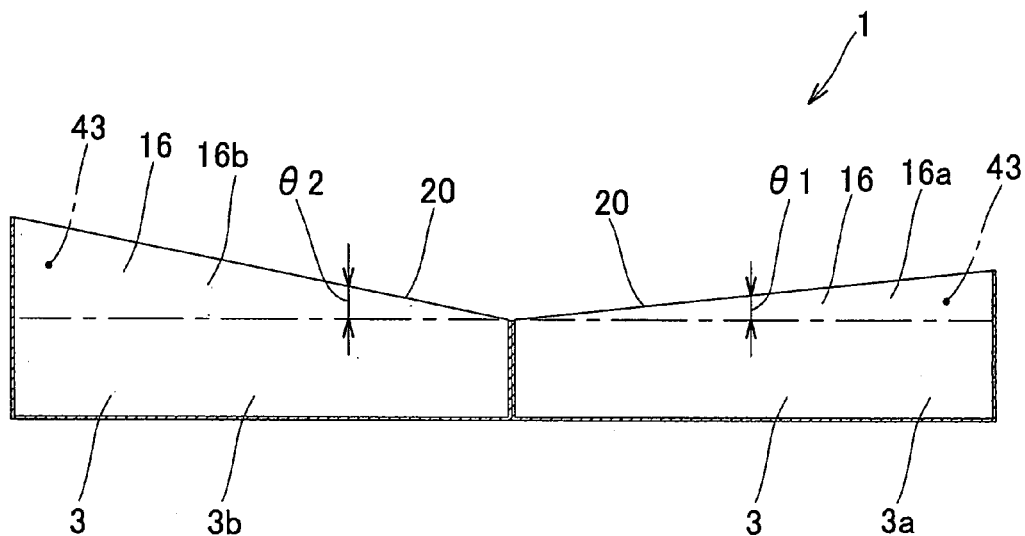
FIG. 56 is a cross sectional view showing another embodiment of the rice-ball making implement of this invention in a state that the containers are opened-up.
Figure 57:
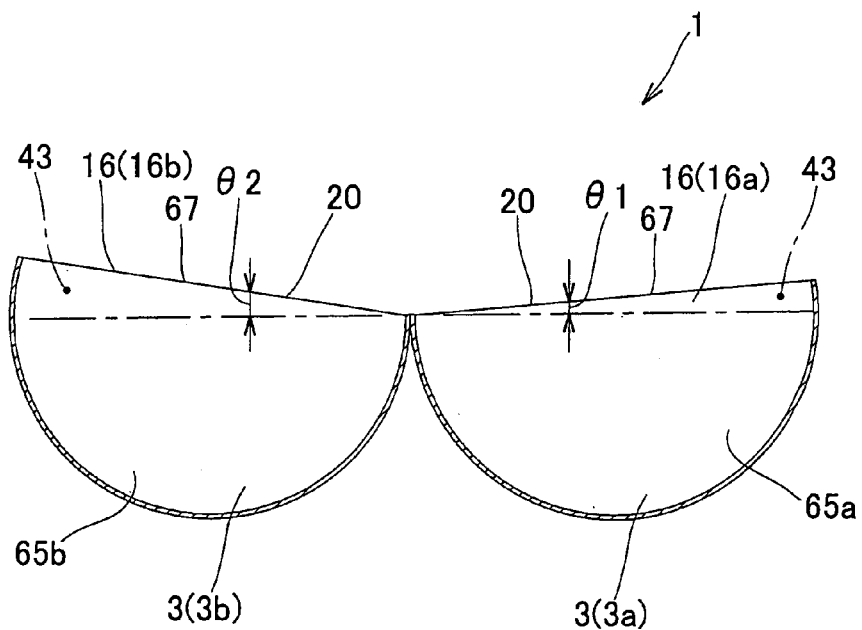
FIG. 57 is a cross sectional view showing another embodiment of this invention in a state that the containers are expanded.

(1) FIG. 56 shows the case where an angle of inclination θ1 of the upper edge 20 of the two side-part standing walls 16a, 16a of the container 3a and the angle of inclination 02 of the upper edge 20 of the two side-part standing walls 16b, 16b of the other container 3b are different from each other. FIG. 57 shows the case where the angle of inclination θ1 of the upper edge 67 of the side elements 65a, 65a of the container 3a and the angle of inclination θ2 of the upper edge 67 of the side elements 65b, 65b of the container 3b are different from each other.

In FIGS. 3, 42, 56 and 57, the angles of inclination of the upper edges 20, 67 are elements to determine a cubic capacity of the compression containing part 43. Therefore, depending on the intended degree of compacting the rice ball, the angles of inclination can be set as needed. The larger the angle of inclination is, the larger the cubic capacity of the compression containing part 43 is. Therefore, the rice ball compacted harder can be made.

(2) The material for making the two containers 3, 3 has the strength enough for resisting the pressure applied upon compacting the contained rice. For example, the containers 3, 3 may be formed by using various kinds of materials like a sheet of foodstuff including giant kelp, plate-like seasoned layer, or a bamboo leaf like Kumazasa, as well as the paper or the plastic as mentioned above. As the film-like object, the sheet of foodstuff may also be used as well as the above-mentioned wrapping film.

Figure 58:
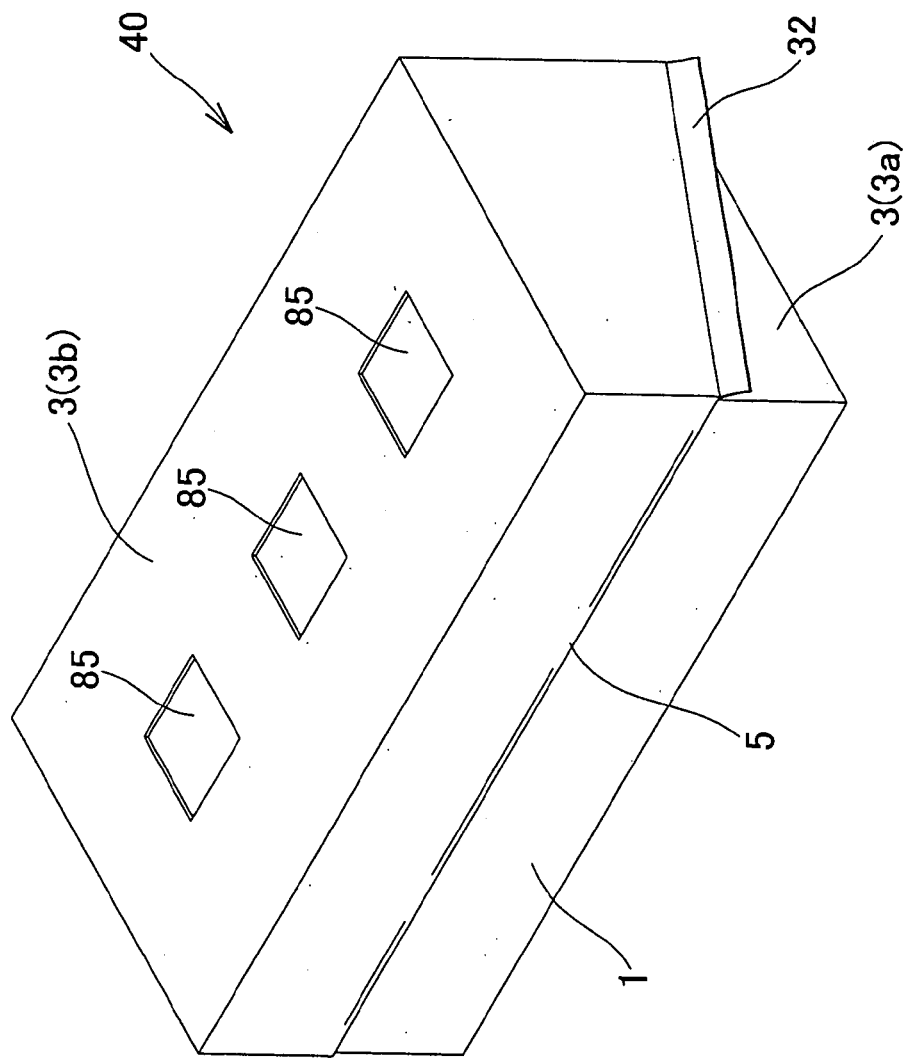
FIG. 58 is a perspective view showing another embodiment of the rice-ball making implement in use.

(3) As shown in FIG. 58, a window part 85 may be formed in the containers 3, 3 so that the ingredient placed on the prepared rice ball can be recognized. FIG. 58 shows the packed rice ball 40 having the shape of the quadrangular prism, as an example. In FIG. 58, since the ingredient is arranged only on one face of the rice ball, the window part 85 is formed only in the container 3b. When the ingredient is arranged on both faces of the rice ball, the window parts 85 are formed in both of the containers 3a, 3b.

Figure 59:
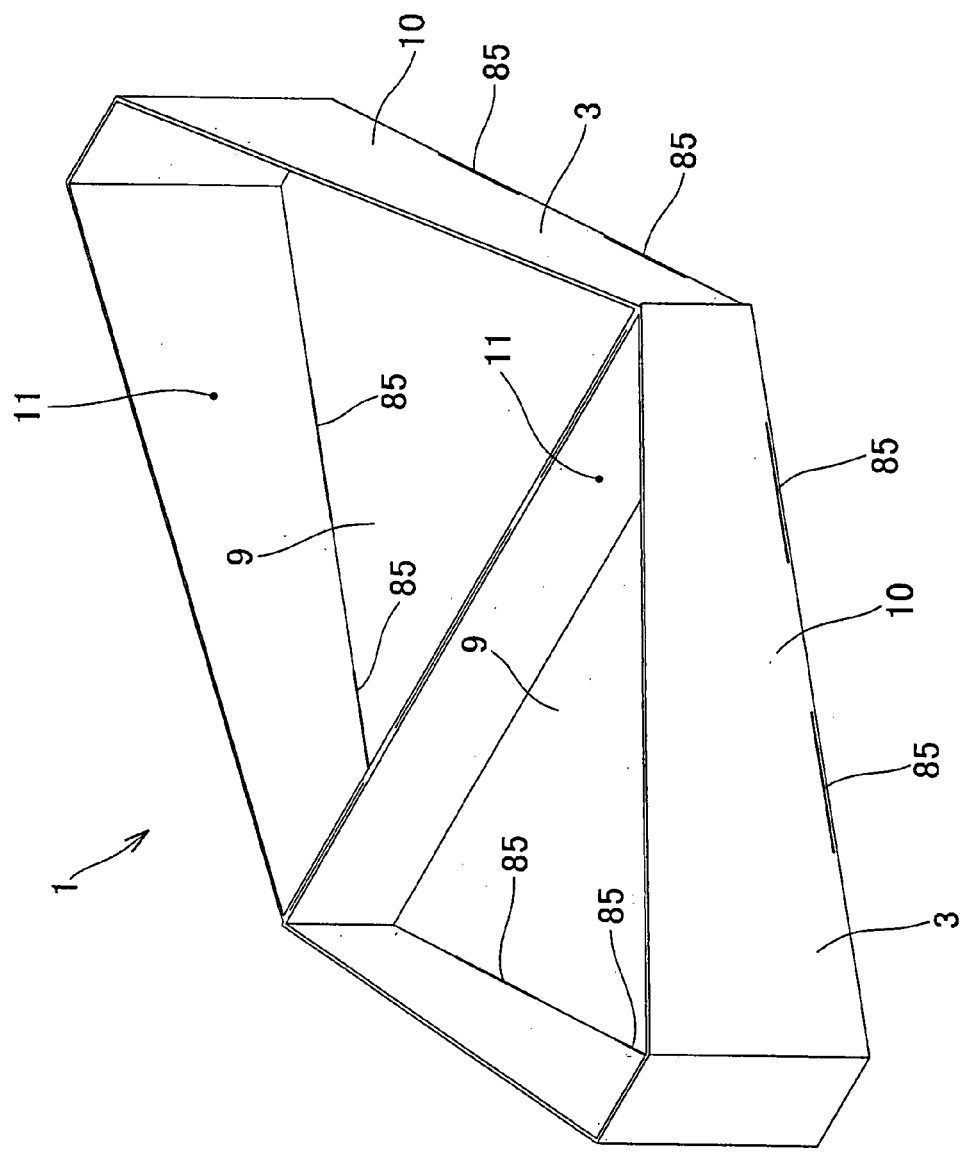
FIG. 59 is a perspective view showing another embodiment of the rice-ball making implement of this invention.
Figure 60:
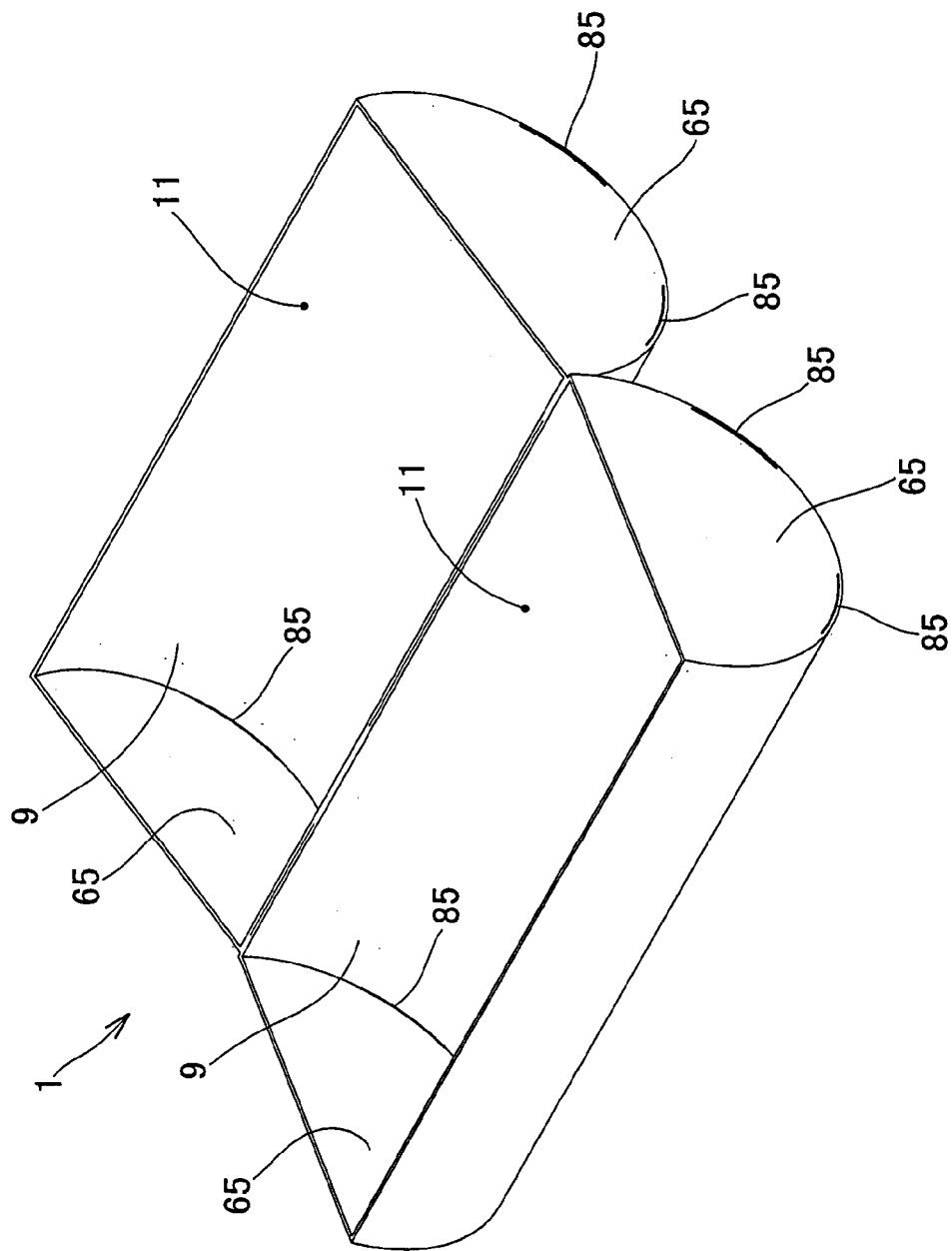
FIG. 60 is a perspective view showing another embodiment of the rice-ball making implement of this invention.
Figure 61:
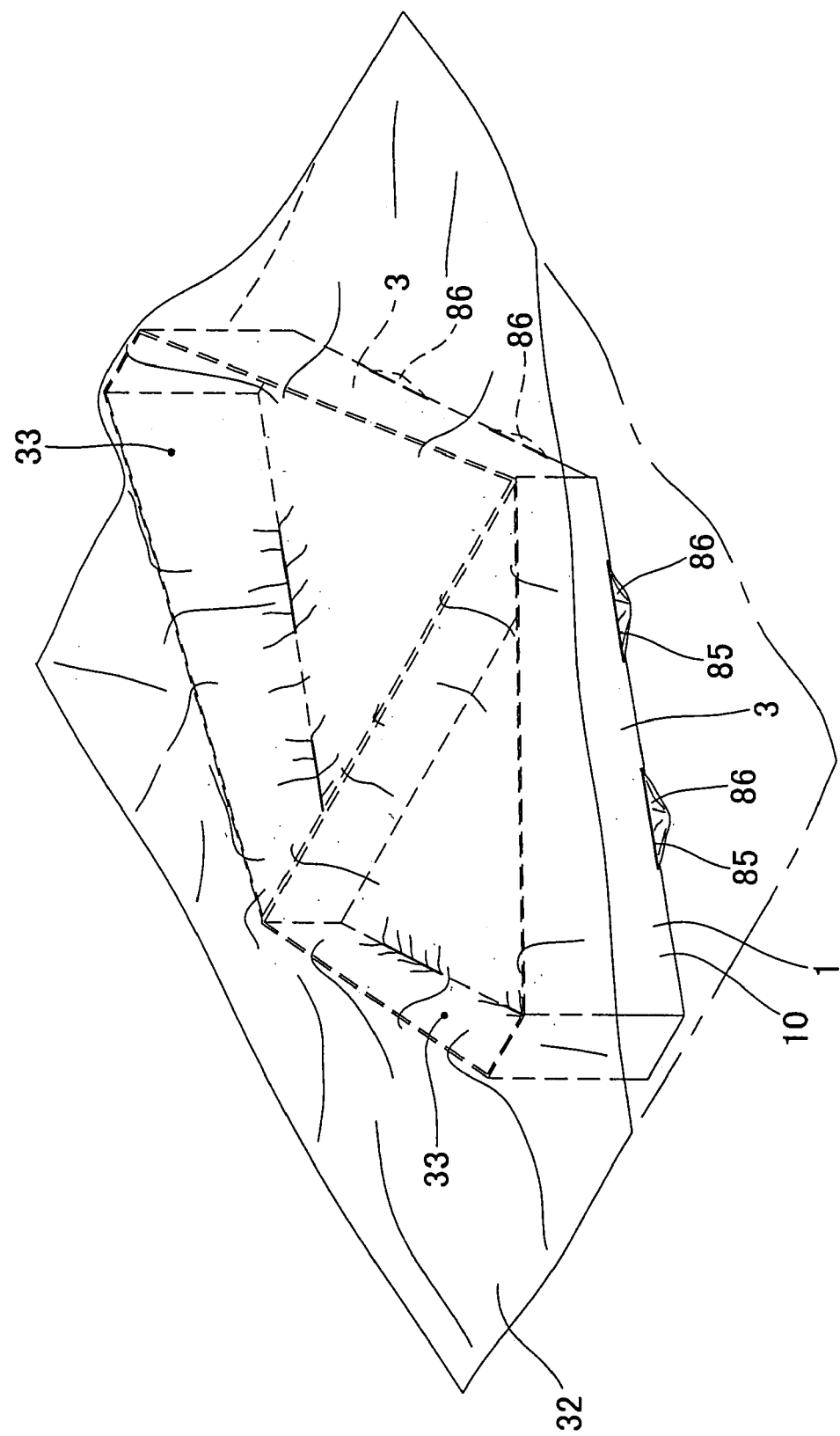
FIG. 61 is a perspective view showing the state that the rice-ball making implement as shown in FIG. 59 is covered with the film-like object and the containing recesses are formed.
Figure 62:
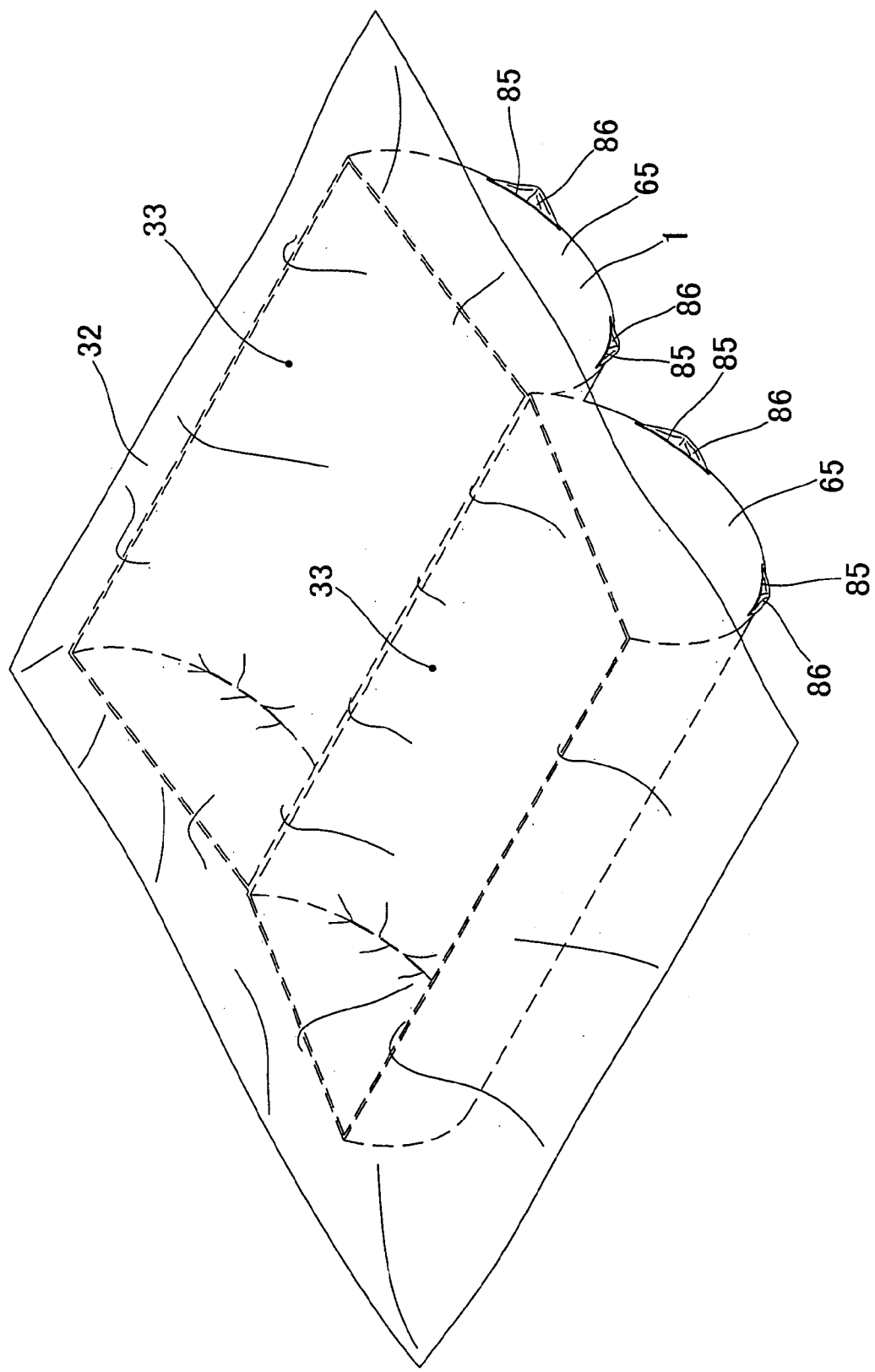
FIG. 62 is a perspective view showing the state that the rice-ball making implement as shown in FIG. 60 is covered with the film-like object and the containing recesses are formed.

(4) In the rice-ball making implement 1 shown in FIG. 59, a slit 85 is formed at a connection part between the base element 9 and the standing wall 10. In the rice-ball making implement 1 shown in FIG. 60, the slit 85 is formed in the connection part between the base element 9 and the side element 65. In this structure, when the film-like object 32 having a necessary size is spread over the two opened containers 3, 3, and is pressed to form the containing recesses 33, 33, a part 86 of the film-like object 32 is made to protrude outside through the slit 85 using a pallet or the like, as shown in FIGS. 61 and 62, so that the part 86 which is protruded may be pinched and fixed by the slit 85. Thus, the form of the formed containing recesses 33, 33 can be retained, and the work for placing the foodstuff in the containing recess 33 is facilitated. The part 86 which is protruded through the slit 85 is easily released from the slit 85 when the covered rice ball covered by the film-like object 32 is taken out of the container. The width, the number, and the length of the slit 85 are determined so that the film-like object 32 may be fixed to the container 3 by being pinched by the slit 85.

(5) In forming the rice-ball making implement, when a sheet material comprising a base material like paper or plastic, and the film-like object like a wrapping film which is releaseably glued to the surface of the base material is used, there is no trouble of forming the containing recess by fitting the film-like object as mentioned above, since the container has the containing recess comprising the releaseable film-like object.

(6) In selling the rice-ball making implement having the above-mentioned structure, it is convenient for a user to place the foodstuff immediately without fitting the film-like object, when the containing recess 33 is formed in advance by releasably gluing the film-like object to the inner face of the containers 3, 3, or when the containing recess 33 is formed in advance by fitting the film-like object to the containers 3, 3 as shown in FIGS. 61 and 62. When the film-like object is fitted in advance like this, the ingredient may be arranged in the formed containing recess in advance. In the meantime, when the film-like object is fitted in advance, the ingredient may be arranged in the formed containing recess in advance.

In this structure, when the covered rice ball covered with the film-like object 32 is taken out of the containers, the film-like object can be easily separated from the containers.

Figure 63:
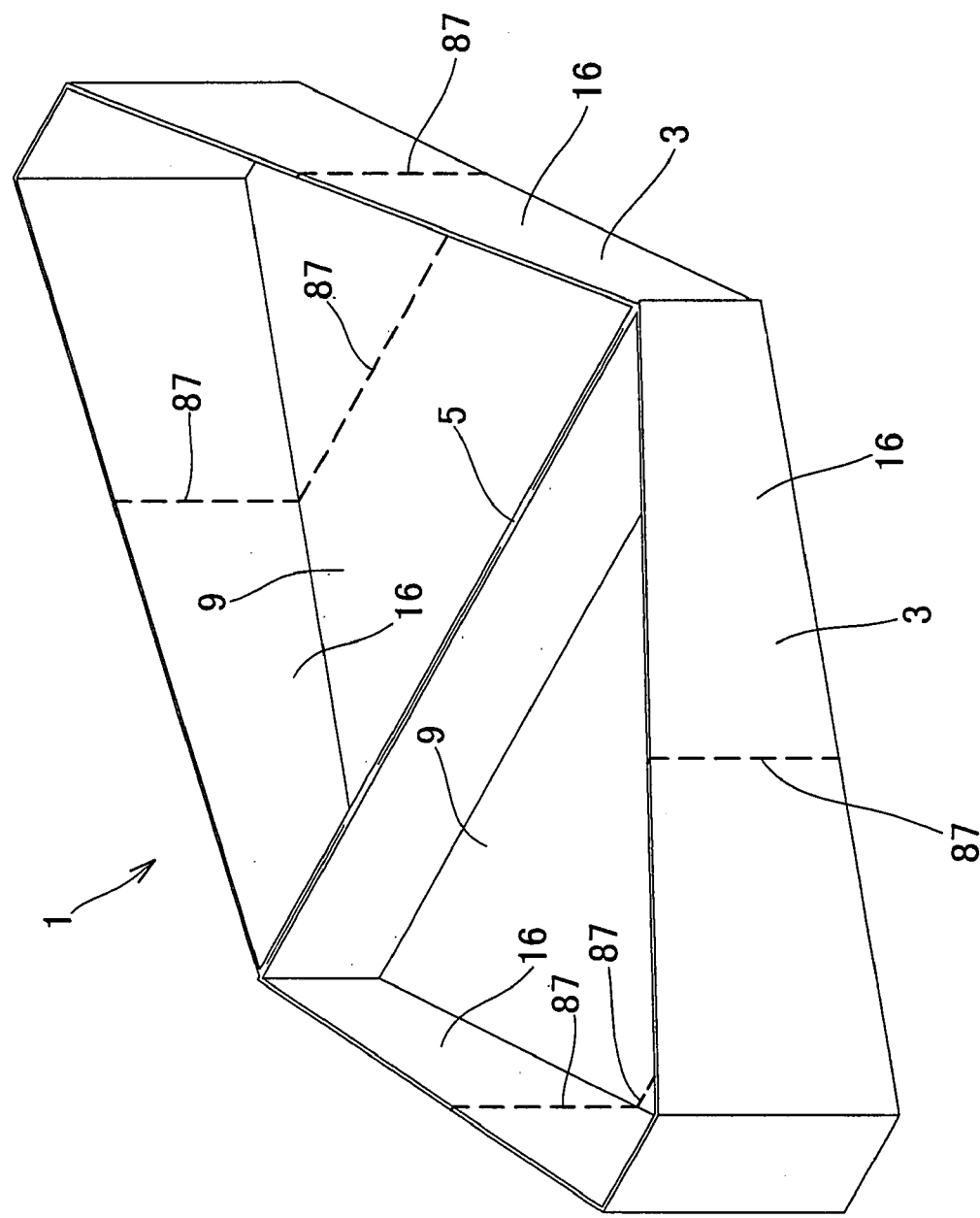
FIG. 63 is a perspective view showing another embodiment of the rice-ball making implement of this invention.

(7) FIG. 63 shows the containers 3, 3 having a triangular shape in plan view, in which a cutoff line 87, being a perforated line, is formed continuously in the base element 9 and the two side-part standing walls 16, 16 at the opposite parts which are arranged when the containers are folded.

Figure 64:
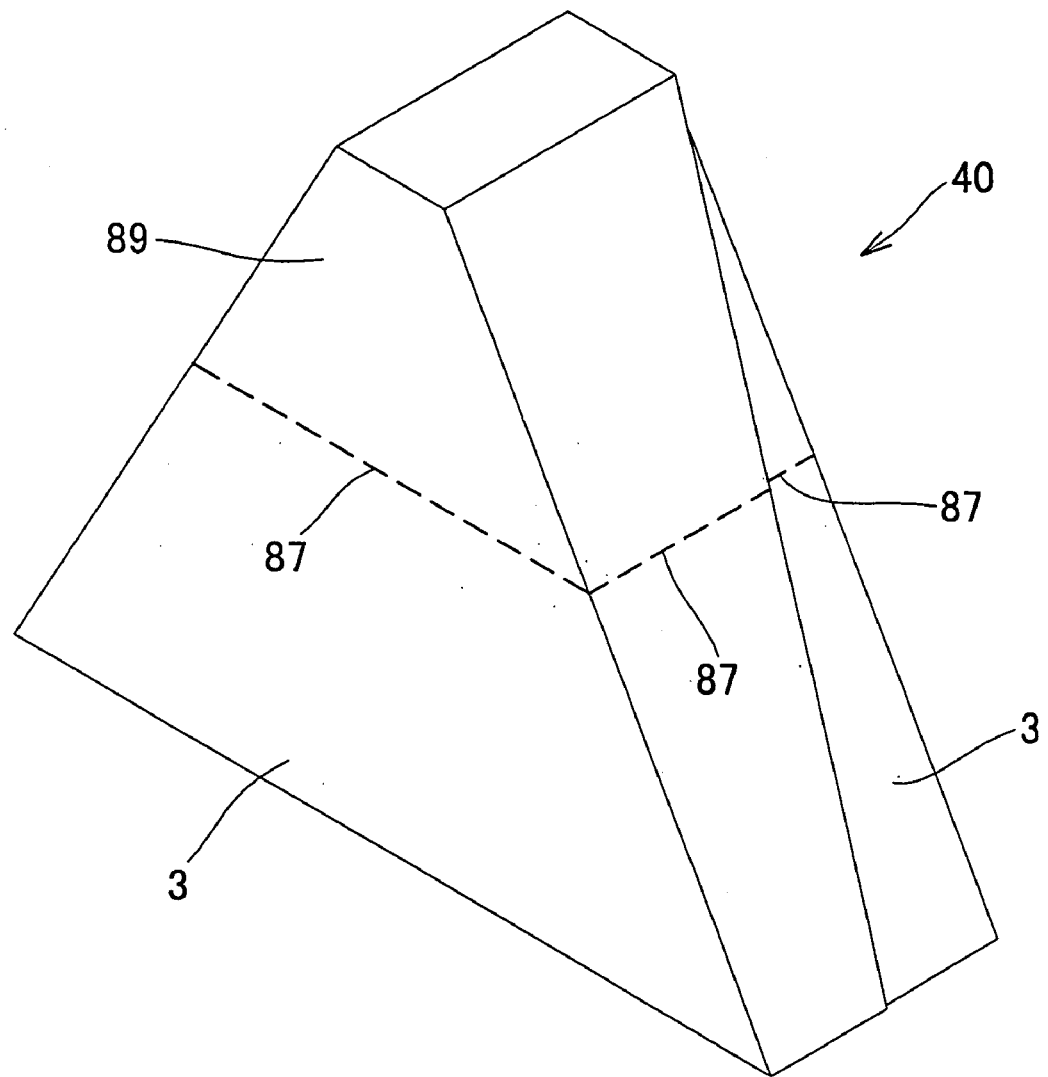
FIG. 64 is a perspective view showing the packed rice ball which is made by using the rice-ball making implement.
Figure 65:
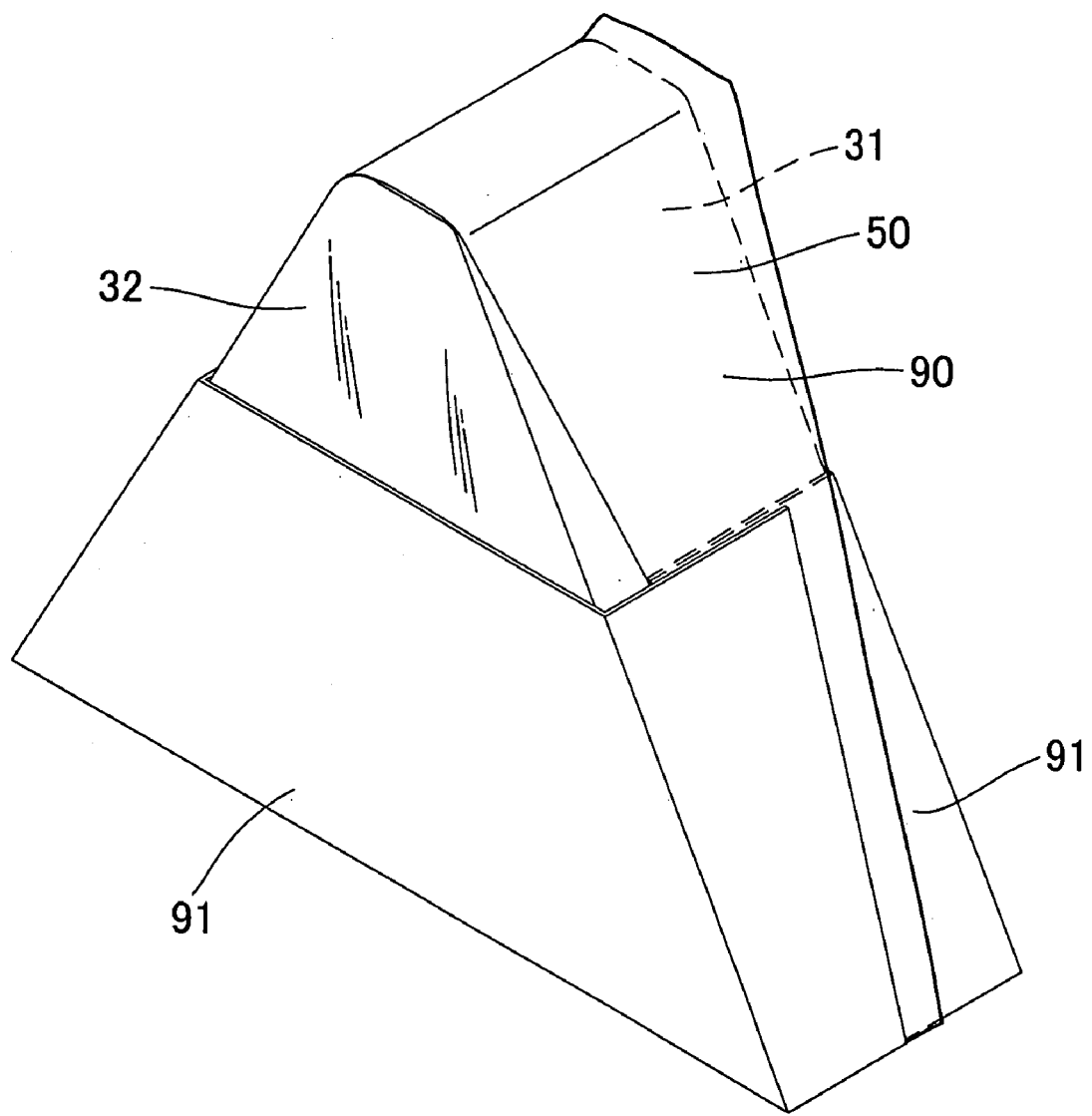
FIG. 65 is a perspective view showing the state that an upper part of the containers of the packed rice ball is removed.

When the containers 3, 3 have the structure like this, after the packed rice ball 40 as shown in FIG. 64 is made according to the process similar to the one explained in the embodiment 1, an upper part 90 of the covered rice ball 50 covered by the film-like object 32 can be exposed as shown in FIG. 65 by removing the upper part 89 of the containers 3, 3 by cutting it at the cutoff line 87. Consequently, the upper part of the rice ball can be eaten in a stable condition by holding the part 91 lower than the cutoff line 87 of the container by hand. After the upper part of the rice ball is eaten, the lower parts 91, 91 of the right and left container are opened, and the lower part of the rice ball 31 is taken out for eating.

Figure 66:
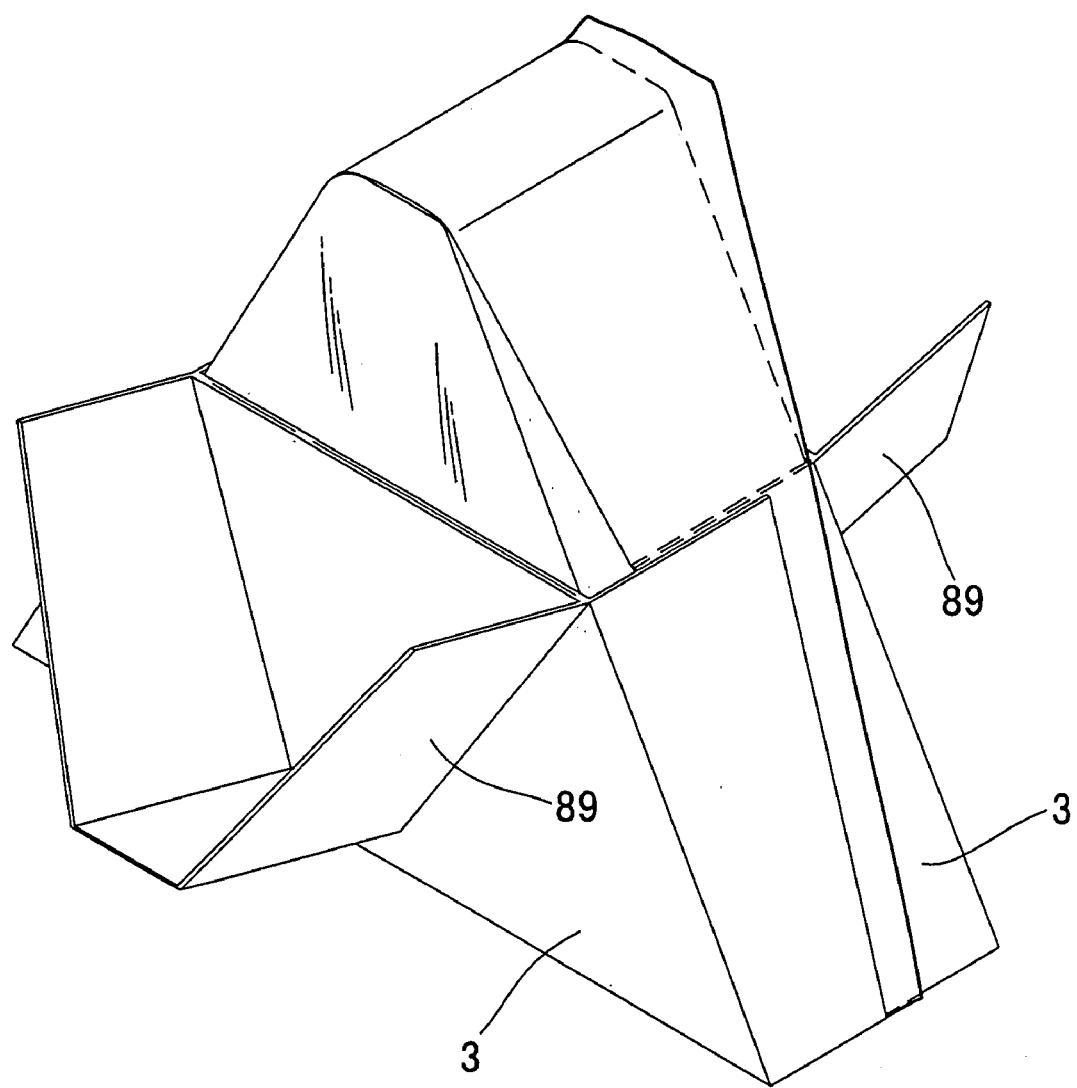
FIG. 66 is a perspective view showing the state that the upper part of the containers of the packed rice ball is bent outward.
Figure 67:
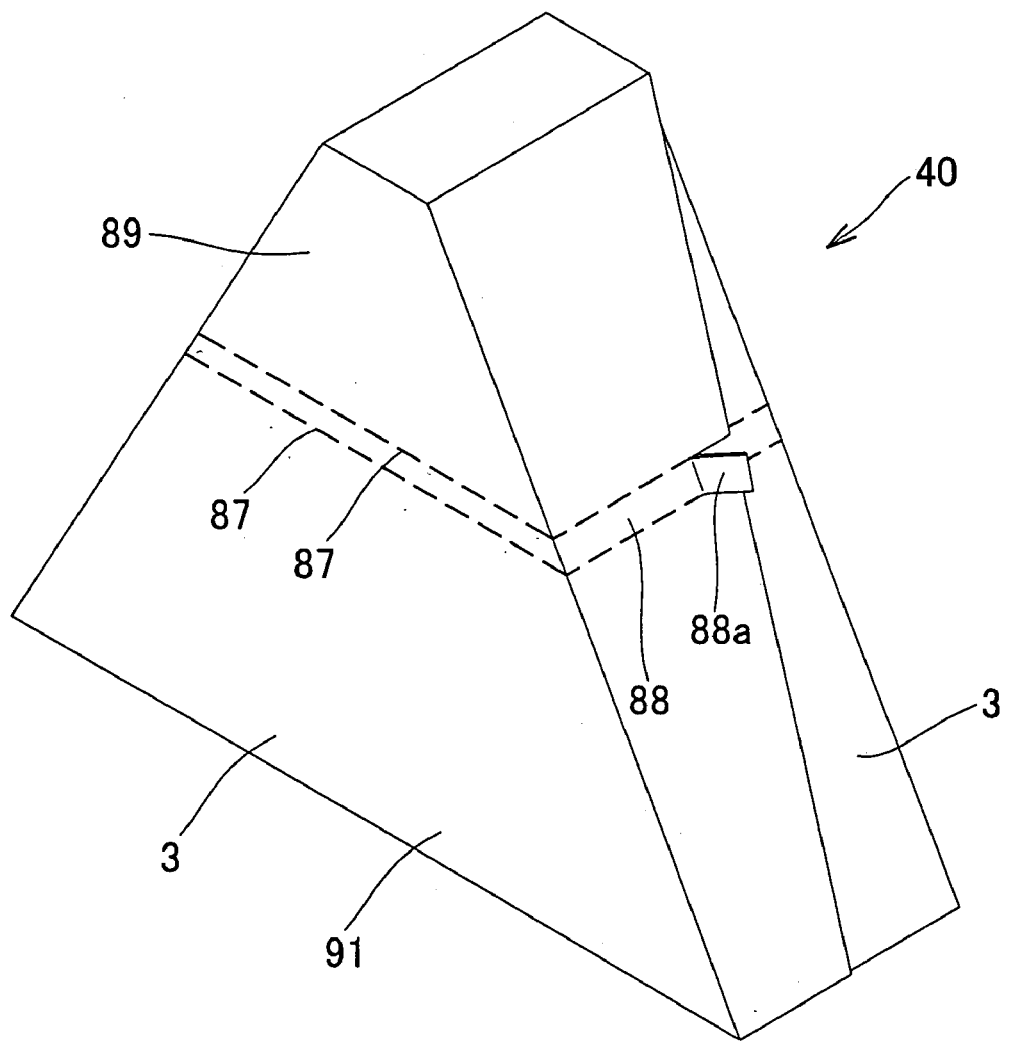
FIG. 67 is a perspective view showing another aspect in which the upper part of the containers of the packed rice ball is removed.

When the two side-part standing walls 16, 16 are cut off at the cutoff lines 87, 87 but the base element is not cut off, the upper part 89 of the container on the upper side of the cutoff line 87 may be folded outward, as shown in FIG. 66. Therefore, when only the upper part of the rice ball is eaten but not the lower part, the remaining rice ball can be packed again by returning the folded upper parts 89, 89 of the containers. The cutoff line 87 may be formed in two rows as shown in FIG. 67 to make the part between the two rows a strip-like tear-off section 88 which is removed by tearing off. In FIG. 67, the code 88a represents a tub piece.

Figure 68:
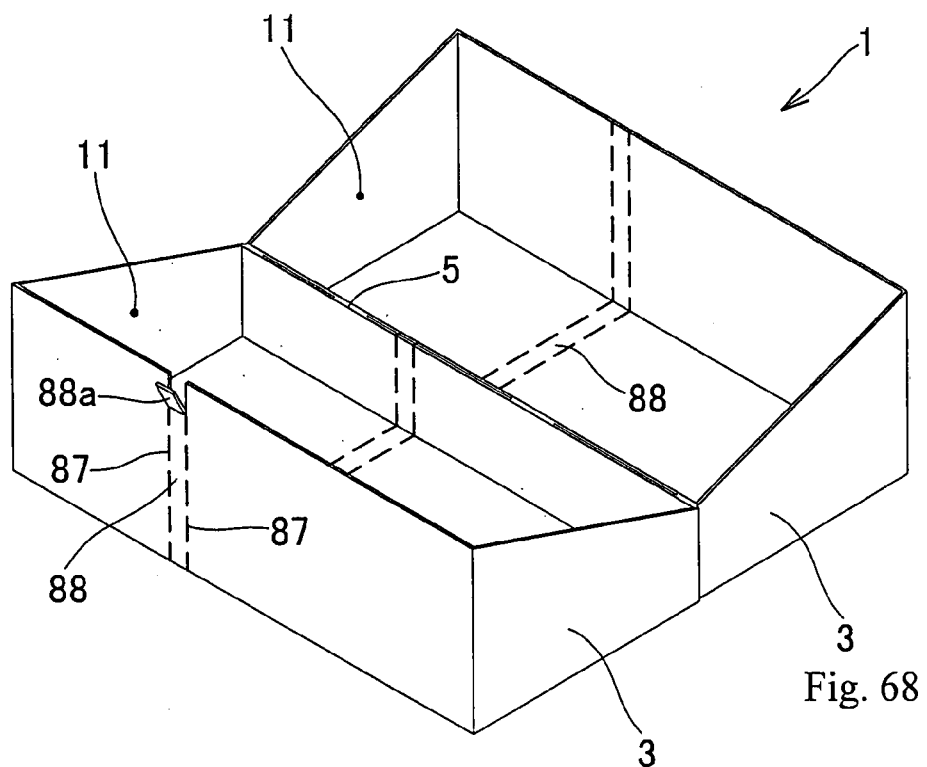
FIG. 68 is a perspective view showing another embodiment of the rice-ball making implement of this invention.
Figure 69:
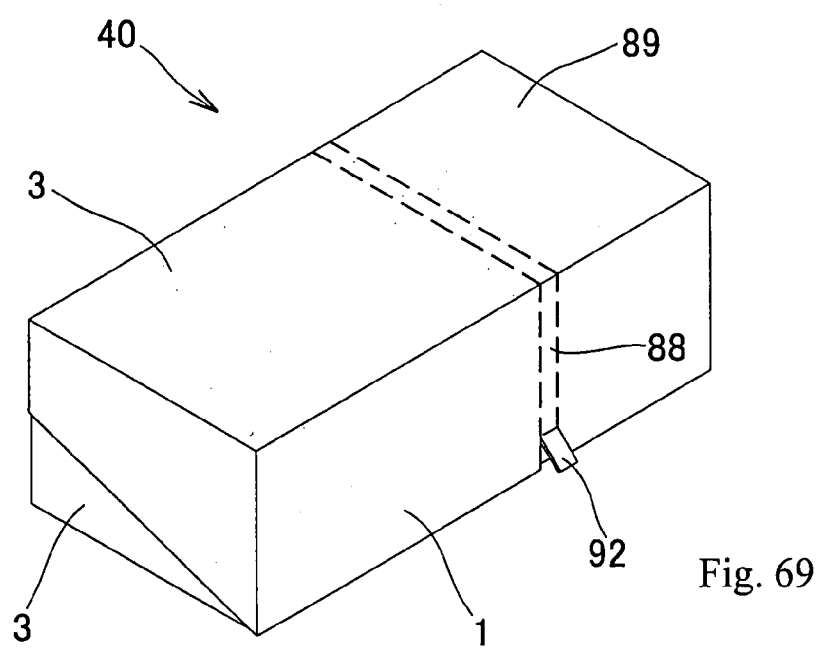
FIG. 69 is a perspective view showing the packed rice ball made by using the rice-ball making implement.
Figure 70:
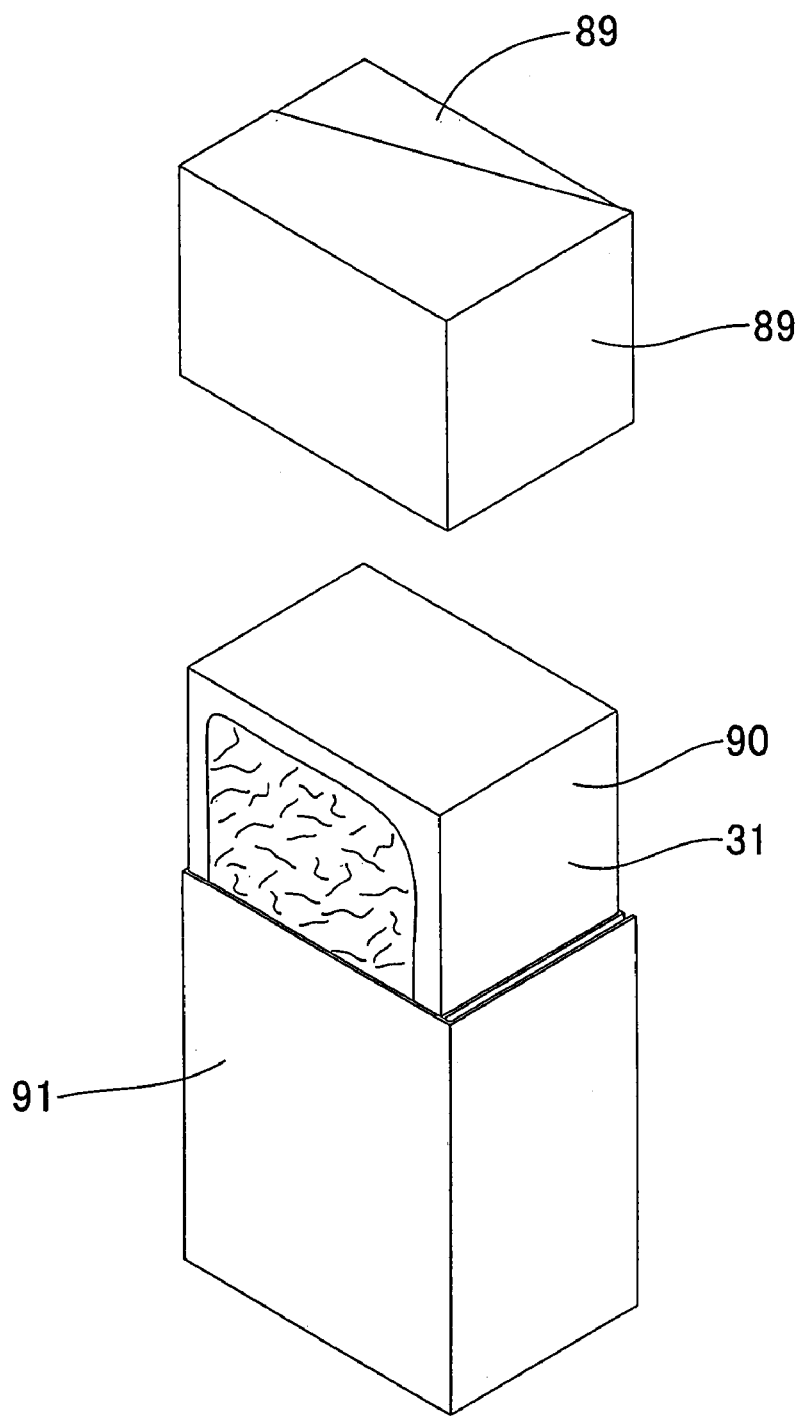
FIG. 70 is a perspective view showing the state that the upper part of the containers of the packed rice ball is removed.

The formation having the cutoff line 87 like this can be applied to the other rice-ball making implements in addition to the one shown in FIG. 68. In the rice-ball making implement 1 shown in FIG. 68, the two containers 3, 3 present a quadrangular shape in plan view, and are made of a transparent resin from which the rice is easily releasable. The ingredient or the like can be seen through the rice-ball making implement 1 made of the transparent resin. Being made like this, the foodstuff like the rice may be directly contained in the containing parts 11, 11 without interposing the film-like object 32. The two cutoff lines 87, 87 are formed in parallel to each other in the containers 3, 3 in a manner of crossing the bend part 5 so that the strip-like tear-off section 88 between the two cutoff lines 87, 87 may be torn off and removed. FIG. 69 shows the packed rice-ball 40 covered by the containers 3, 3. FIG. 70 shows the state that the tub piece 88a at the end of the strip-like tear-off section 88 is held, the strip-like tear-off section 88 is torn off in the peripheral direction, and upper parts 89, 89 of the containers 3, 3 are removed. Thus, the upper side part 90 of the rice ball 31 is exposed. When the lower side part is eaten after eating the upper side part 90, one of the lower-side parts 91, 91 of the containers 3, 3 is opened, for example.

Figure 71:
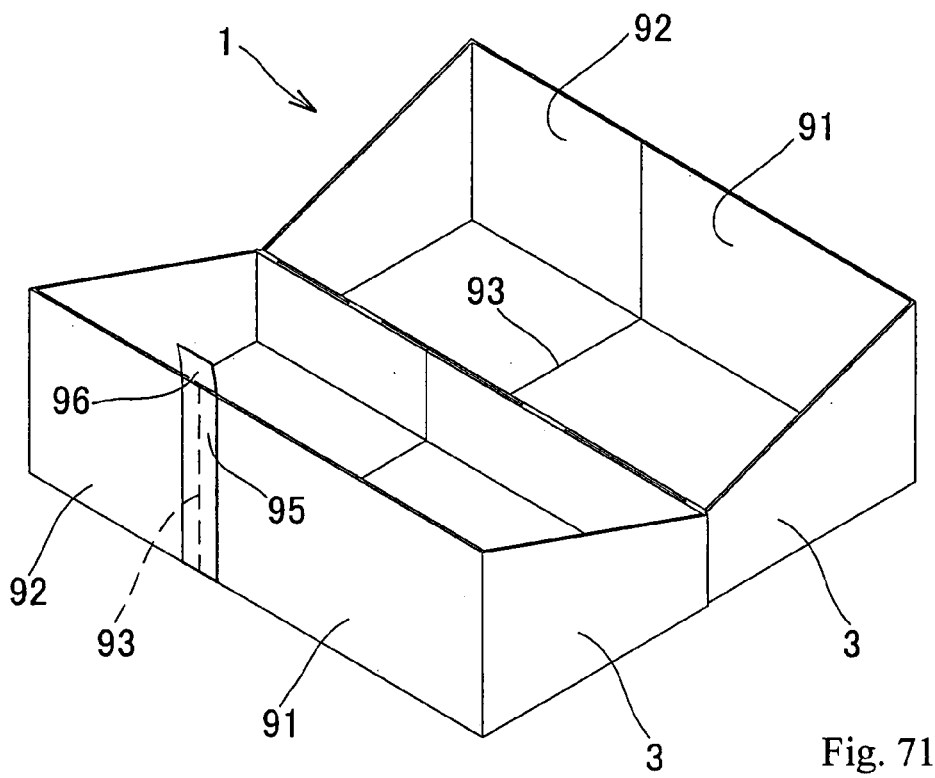
FIG. 71 is a perspective view showing another embodiment of the rice-ball making implement of this invention.
Figure 72:
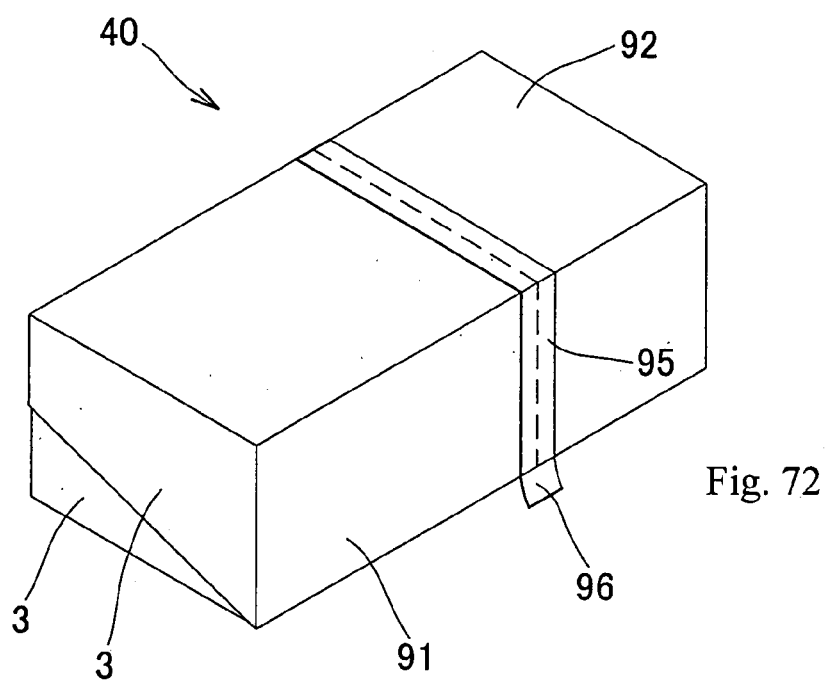
FIG. 72 is a perspective view showing the packed rice ball made which is made by using the rice-ball making implement.
Figure 73:
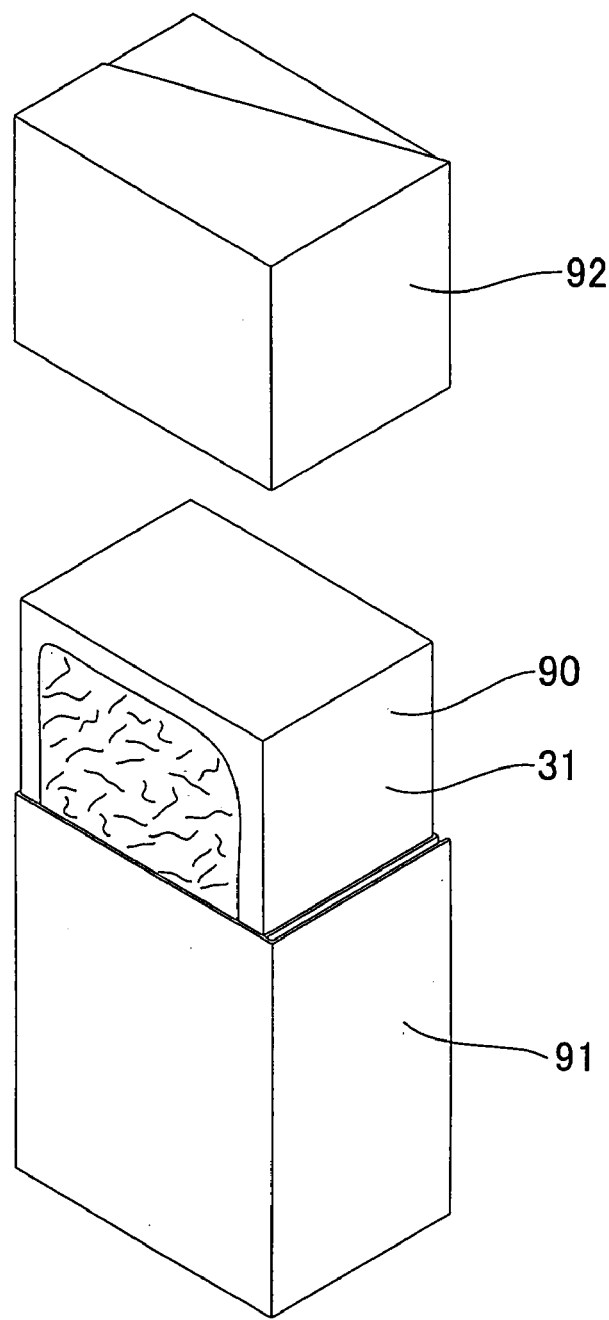
FIG. 73 is a perspective view showing the state that the upper part of the containers of the packed rice ball is removed.

FIG. 71 shows the rice-ball making implement 1 comprising the containers 3, 3 formed by joining separated lower-side part 91 and the upper-side part 92. The lower-side part 91 and the upper-side part 92 are mutually abutted. The lower-side part 91 and the upper-side part 92 are joined by a releasable adhesive tape 95 covering an outer surface side of the abutting part 93. A tub piece 96 is arranged to protrude at the end of the adhesive tape 95. After making the packed rice ball 40 covered by the containers 3, 3, as shown in FIG. 72, the upper-side part 90 of the rice ball 31 can be exposed as shown in FIG. 73, by removing the adhesive tape 95 to remove the upper parts 92, 92 of the containers 3, 3. After eating the upper-side part 90, the lower-side part is eaten by opening the lower-side parts 91, 91 of the containers 3, 3.

Figure 74:
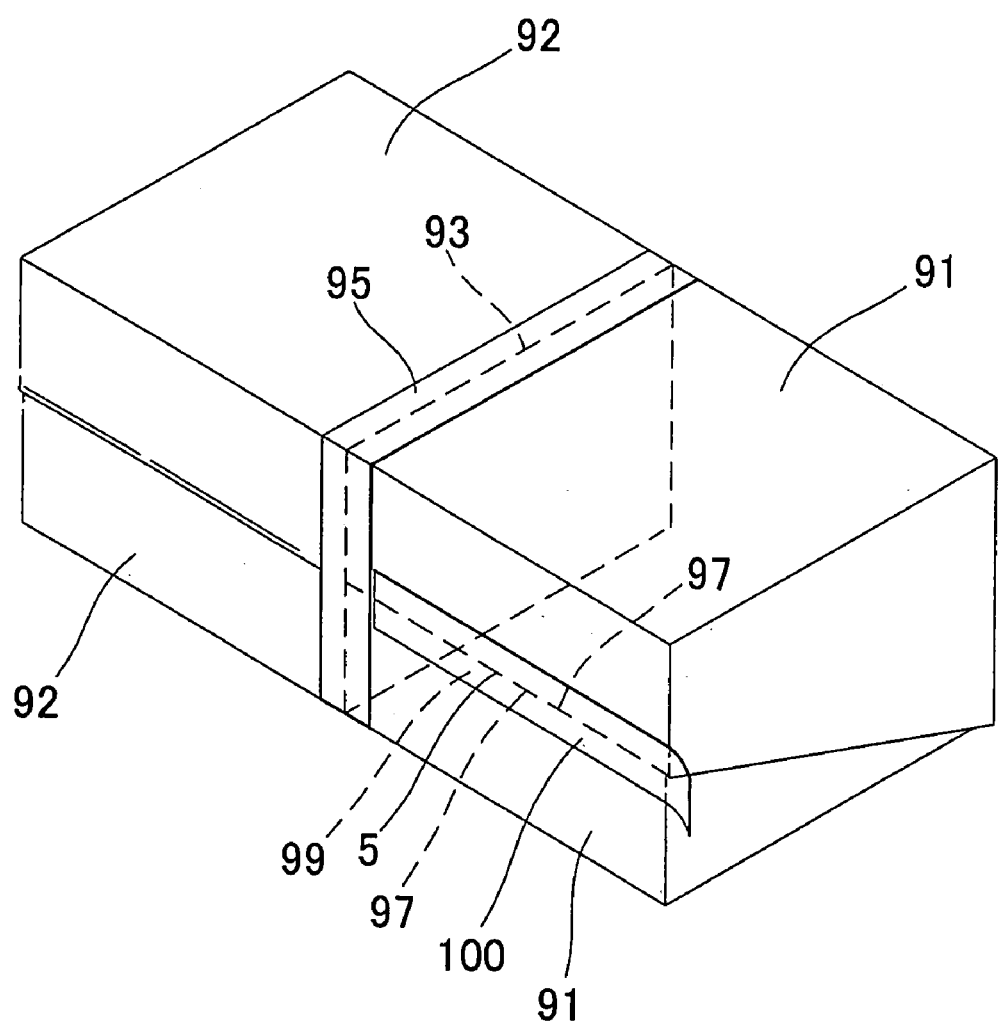
FIG. 74 is a perspective view showing another embodiment of the rice-ball making implement of this invention.
Figure 75:
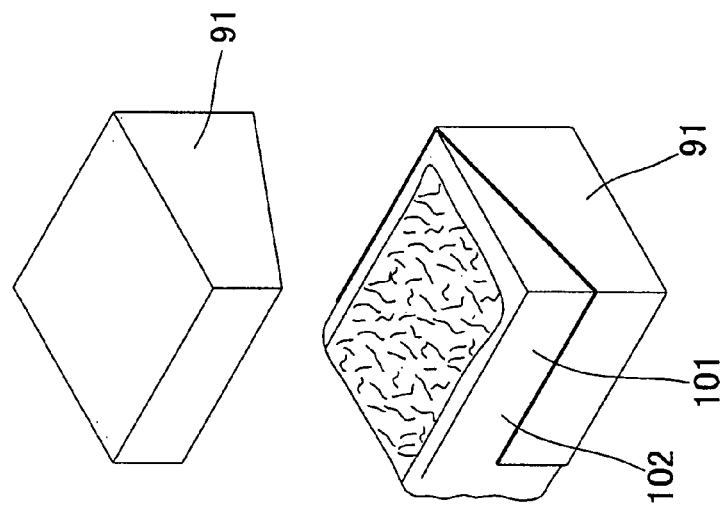
FIG. 75 is a perspective view explaining the process for removing the upper part and lower part of the containers of the packed rice ball.
Figure 75:
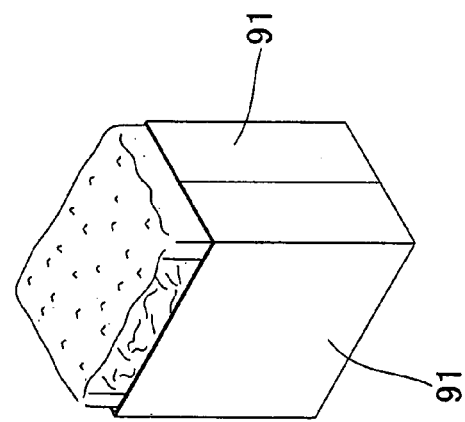
Figure 75:
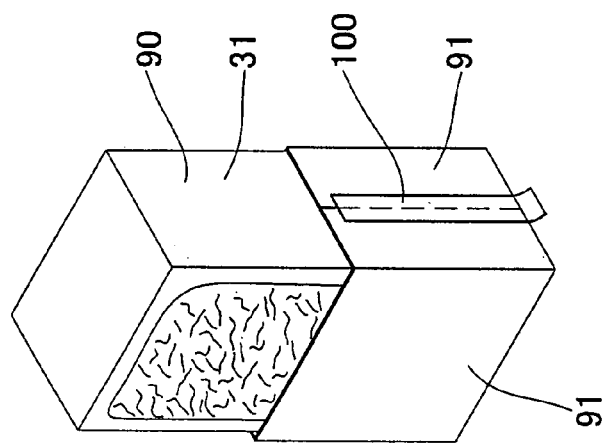

FIG. 74 shows another embodiment of the rice-ball making implement 1. The bend part 5 of the lower-side parts 91, 91 of the implement 1 shown in FIG. 71 is cut off over the entire length. The cut-off ends 97,97 are mutually abutted, and the outer surface side of the abutted part 99 is covered by a vertical releasable adhesive tape 100 so that the lower-side parts 91, 91 may be interconnected in a bendable manner. When the rice-ball making implement 1 is formed like this, the upper-side part 90 of the rice ball 31 can be exposed as shown in FIG. 75(A) by removing the adhesive tape 95 and then removing the upper-side parts 92, 92 of the containers 3, 3. After the upper-side part 90 is eaten, the vertical adhesive tape 100 is removed as shown in FIG. 75(B), and one of the lower-side parts 91, 91 is removed as shown in FIG. 75(C). Then about a half 102 of the lower-side part 101 of the rice ball is exposed, and it can be eaten without dirtying the hand.

The formation as mentioned above can also be applied to the case where the strip-like tear-off section 88 as shown in FIG. 68 is provided. In this case, the strip-like tear-off section 88 structured similarly to the above-mentioned formation is provided over the entire length of the part where the bend part 5 of the lower part is provided.

(8) Various foodstuffs having flexibility to be compacted into an intended shape can be used as the foodstuffs to be contained in the container of the rice-ball making implement of this invention. For example, cooked barley, bean curd lees, cooked potatoes and pumpkins, fried noodles, fine noodles, pasta, as well as rice can be used. In addition, flexible dairy products like cheese or butter, or fruits like bananas or avocados that can be deformed to be an intended shape can also be used. Each of these foodstuffs can be used alone or in mixture with the other foodstuffs. Further, a mixture of inflexible foodstuffs like nuts and cornflakes with these flexible foodstuffs can also be used.

Figure 76:
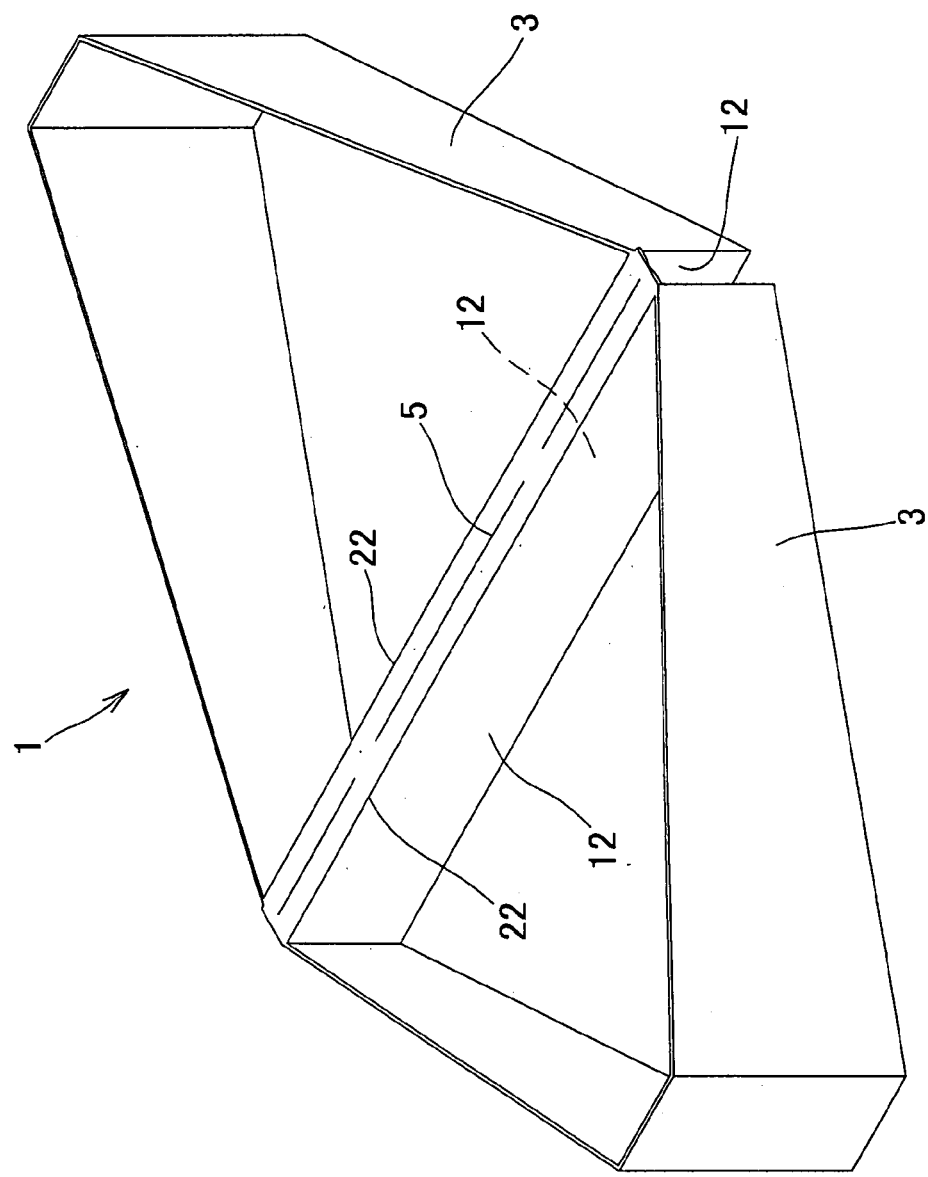
FIG. 76 is a perspective view showing another embodiment of the rice-ball making implement of this invention.
Figure 77:
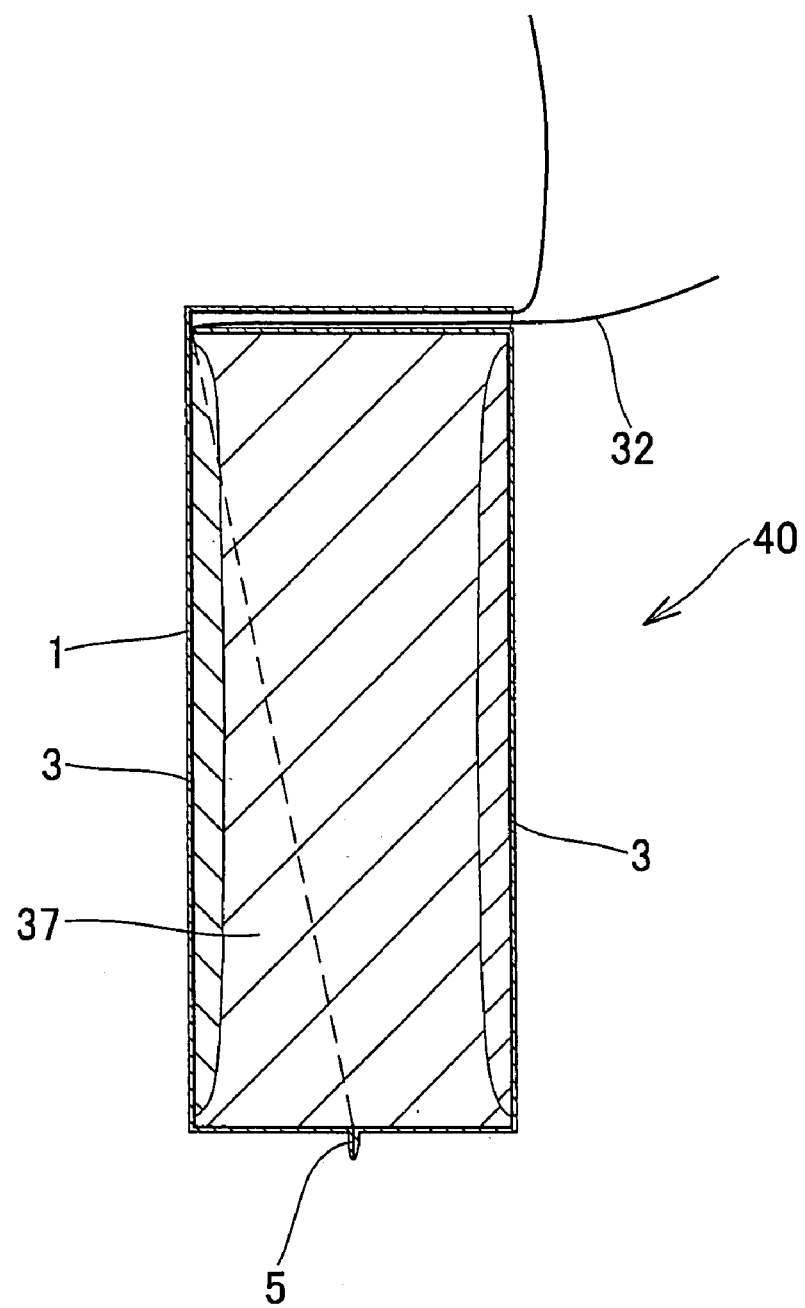
FIG. 77 is a cross sectional view showing the packed rice ball which is made by using the rice-ball making implement.
Figure 78:
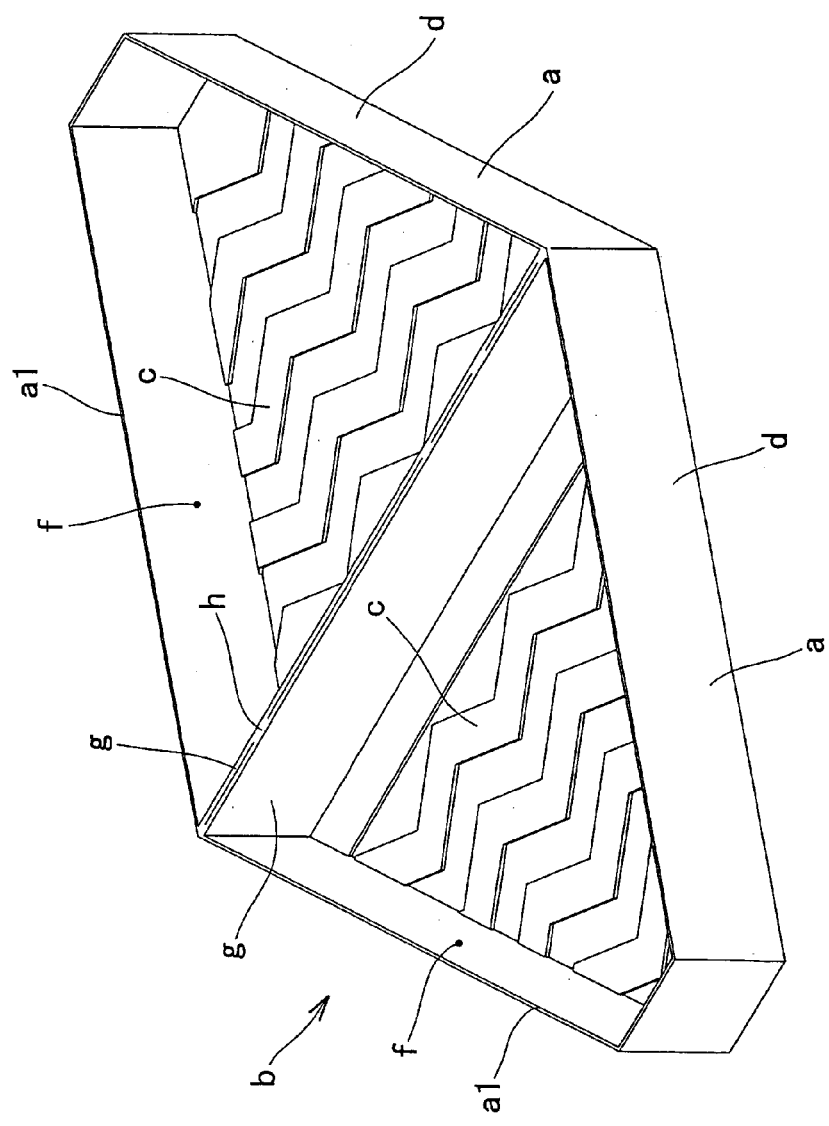
FIG. 78 is a perspective view showing a conventional rice-ball making implement.
Figure 79:
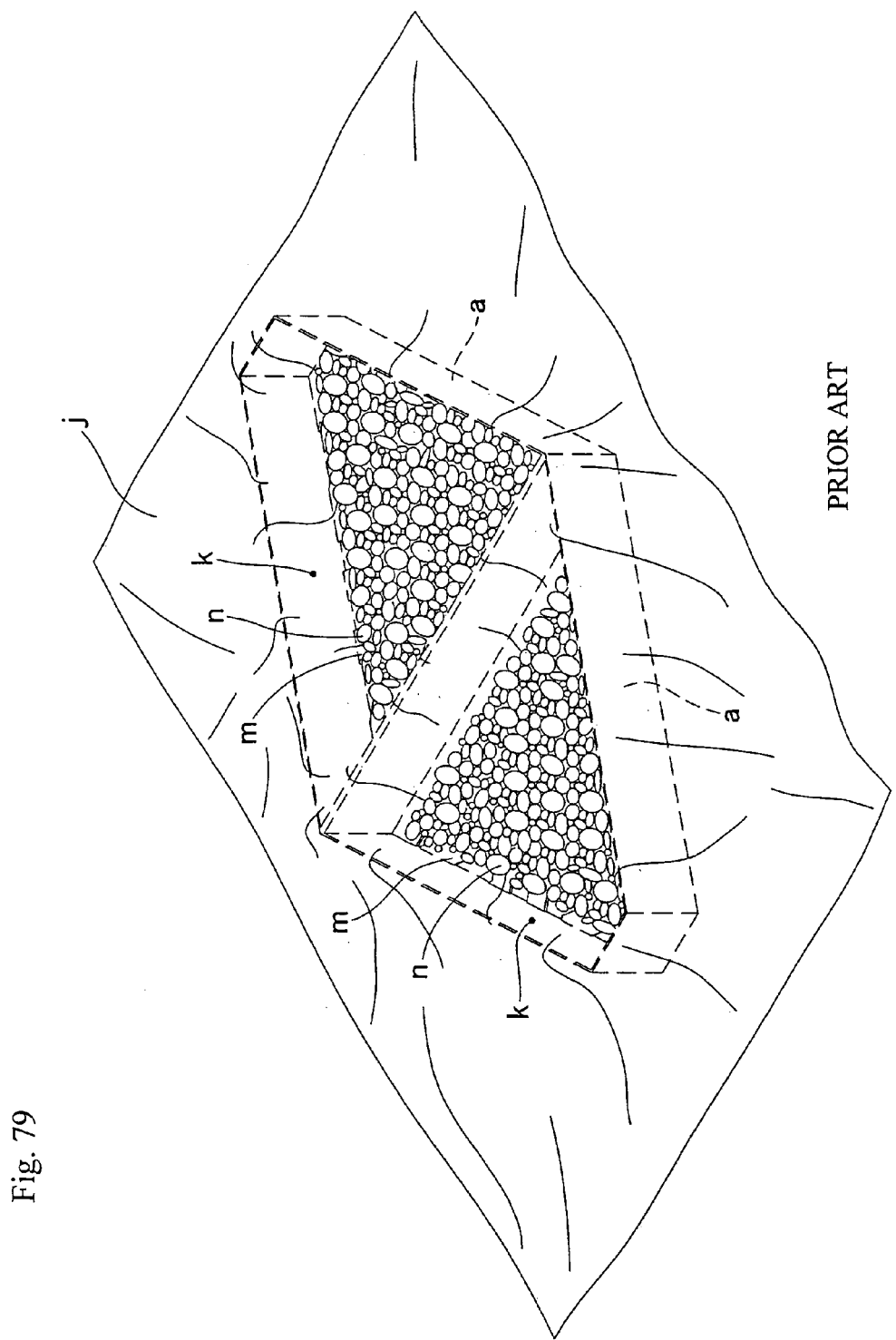
FIG. 79 is a perspective view showing the state that the containing recesses are formed by placing the film-like object over the opened-up rice-ball making implement.
Figure 80:
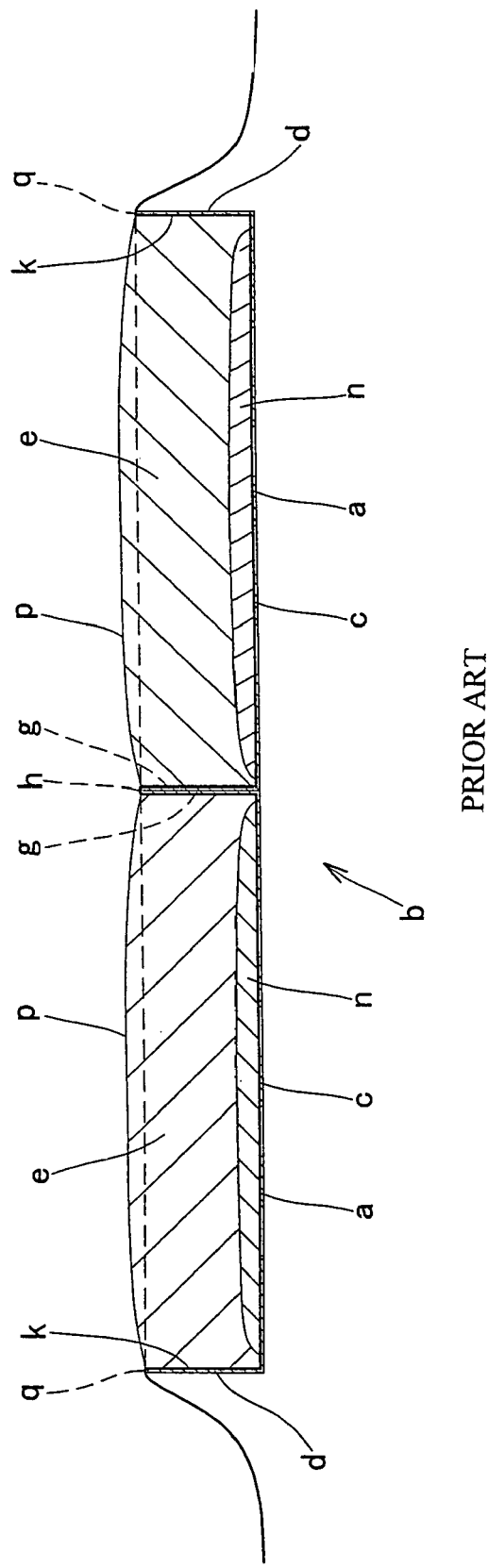
FIG. 80 is a cross sectional view showing the state that the rice is contained in the containing recesses of the opened-up containers.
Figure 81:
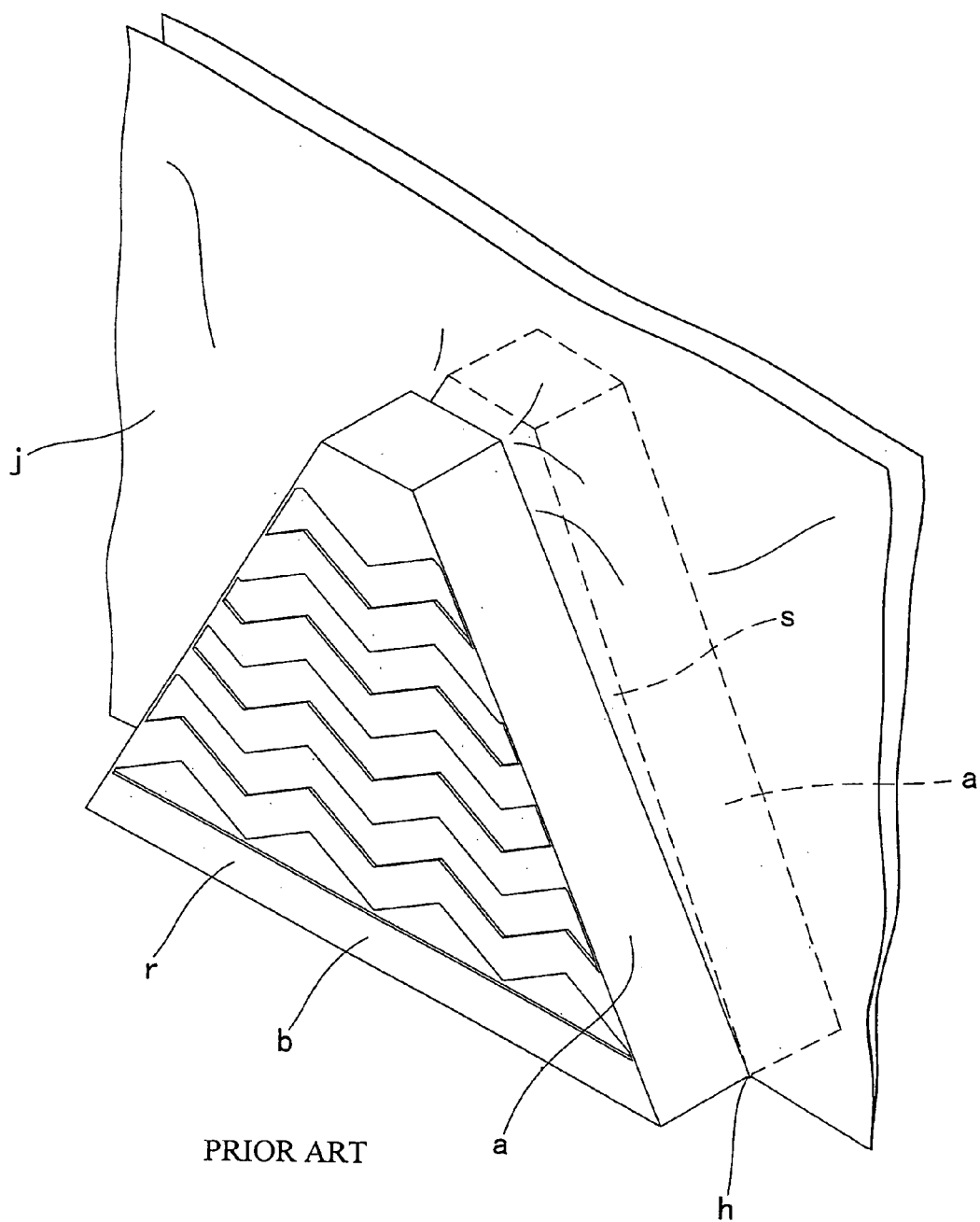
FIG. 81 is a perspective view showing the process of bending the containers filled with the rice.
Figure 82:
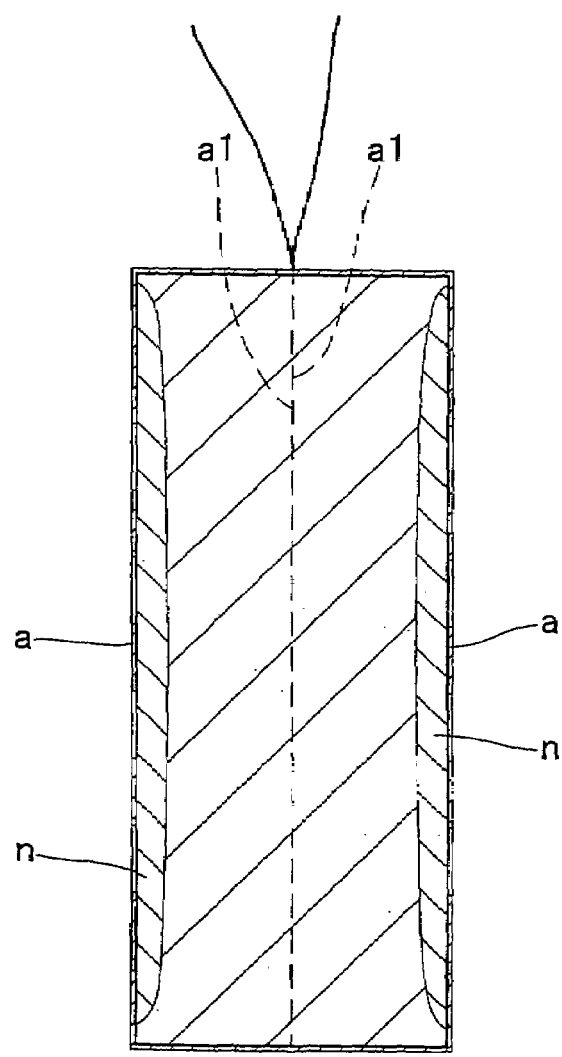
FIG. 82 is a cross sectional view showing the state that the rice ball is made by closing the two containers.
Figure 83:
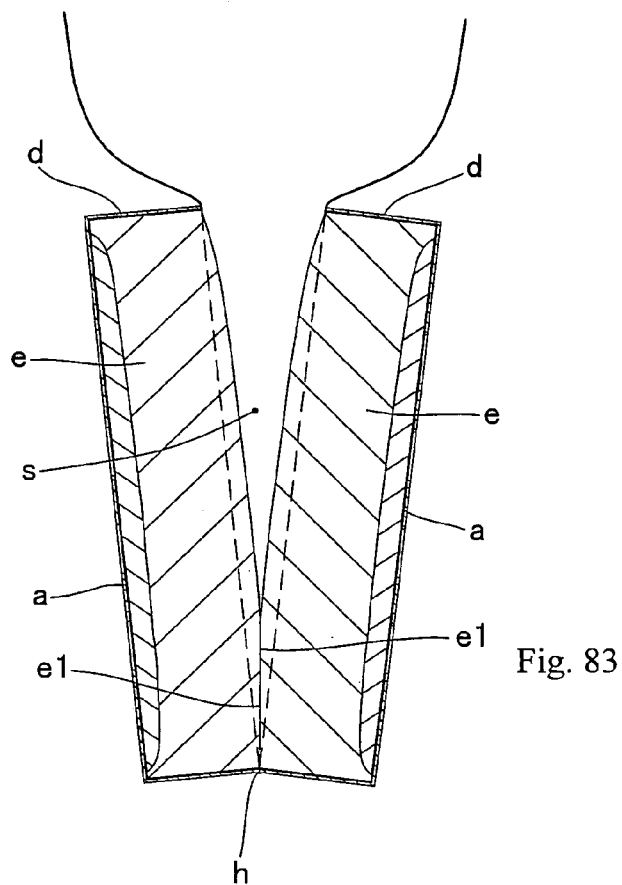
FIG. 83 is a cross sectional view showing the process of bending the two containers filled with the rice.
Figure 84:
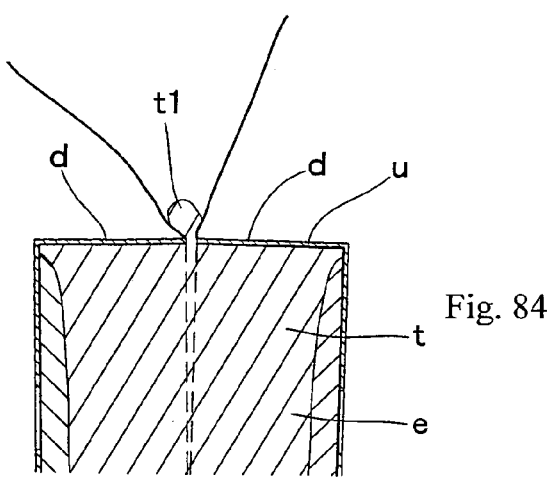
FIG. 84 is a cross sectional view explaining the problems in the conventional rice-ball making implement.
Figure 85:
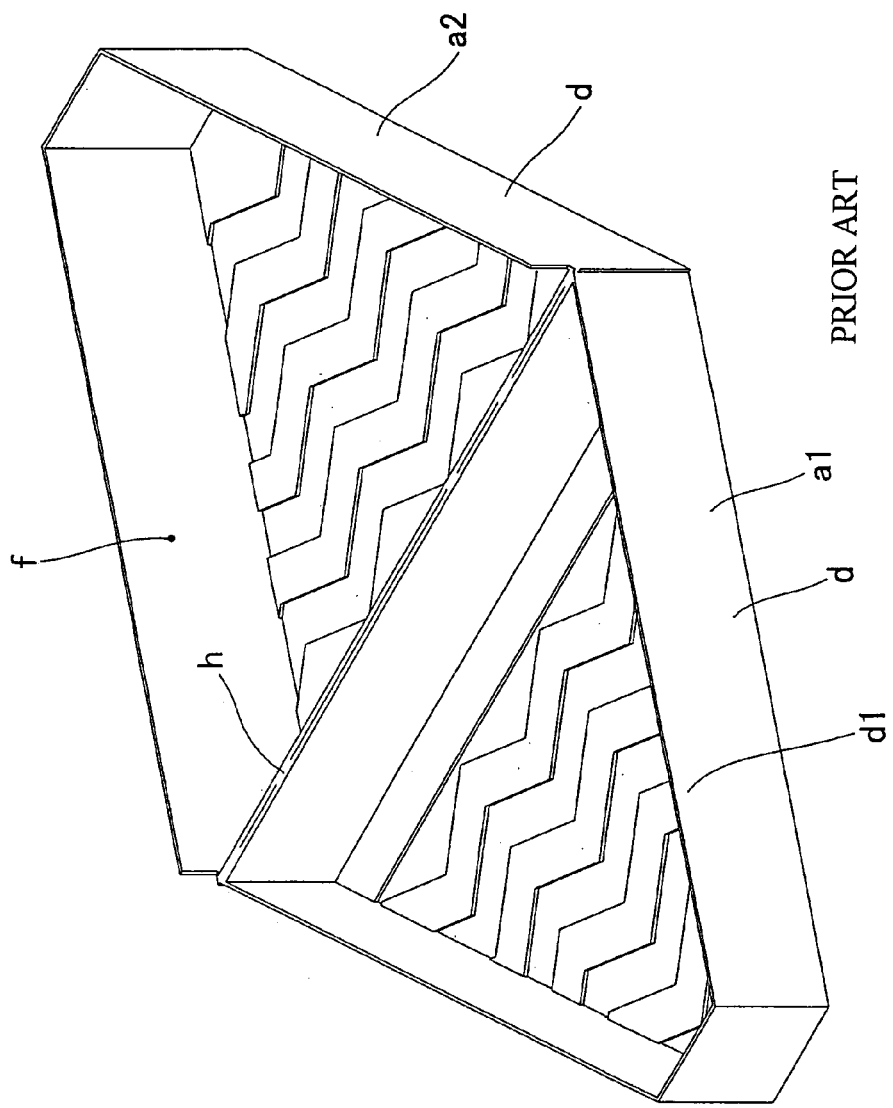
FIG. 85 is a perspective view showing another aspect of the conventional rice-ball making implement.
Figure 86:
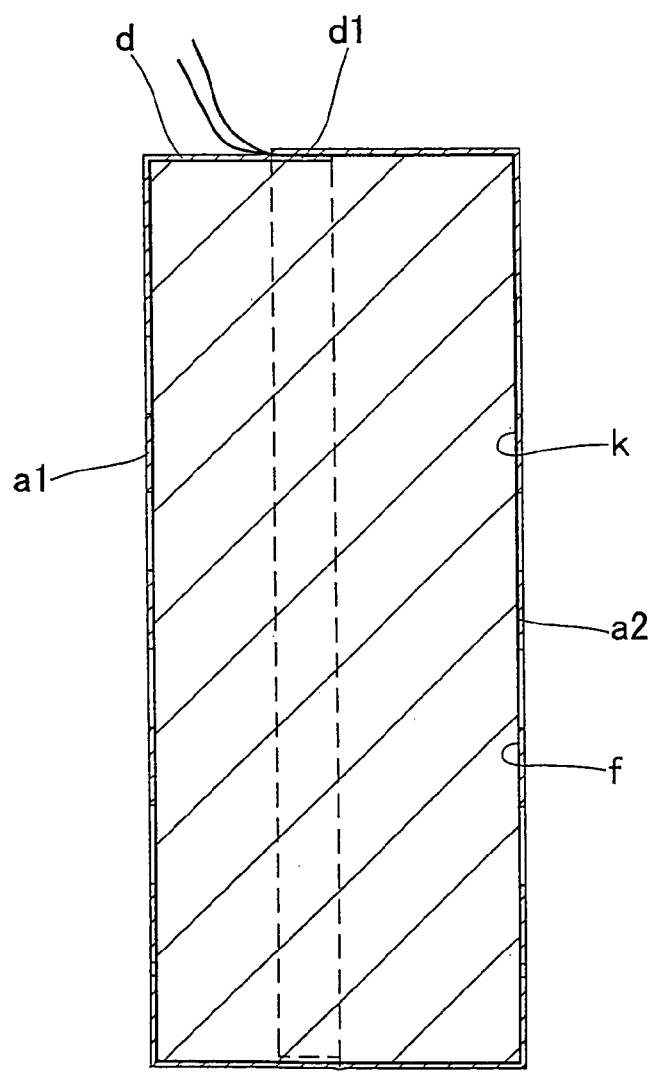
FIG. 86 is a cross sectional view showing the state that the rice ball is made by closing the two containers of the conventional rice-ball making implement.
Figure 87:
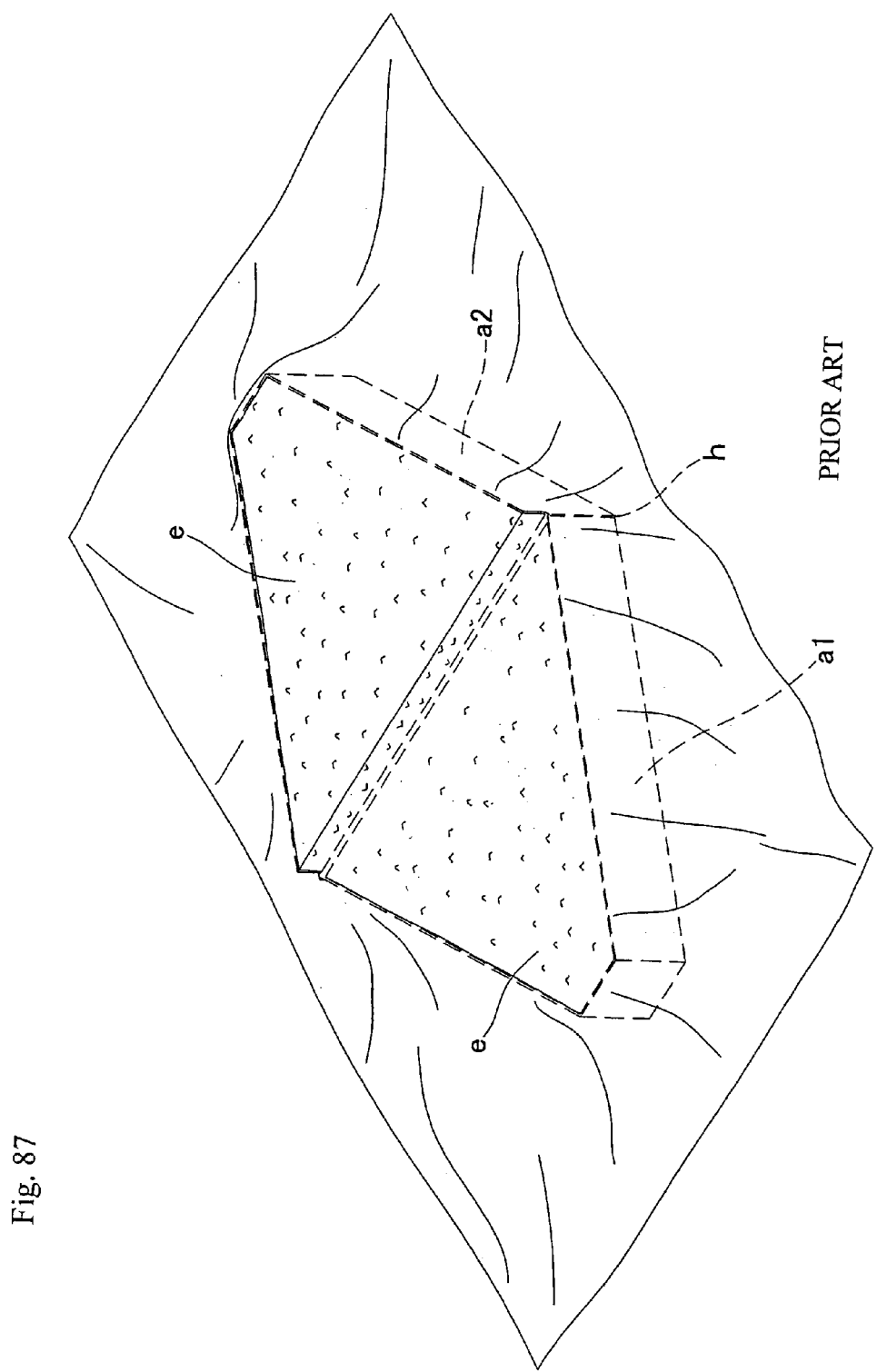
FIG. 87 is a perspective view showing the state that the rice is contained in each of the containing recesses of the conventional rice-ball making implement.
Figure 88:
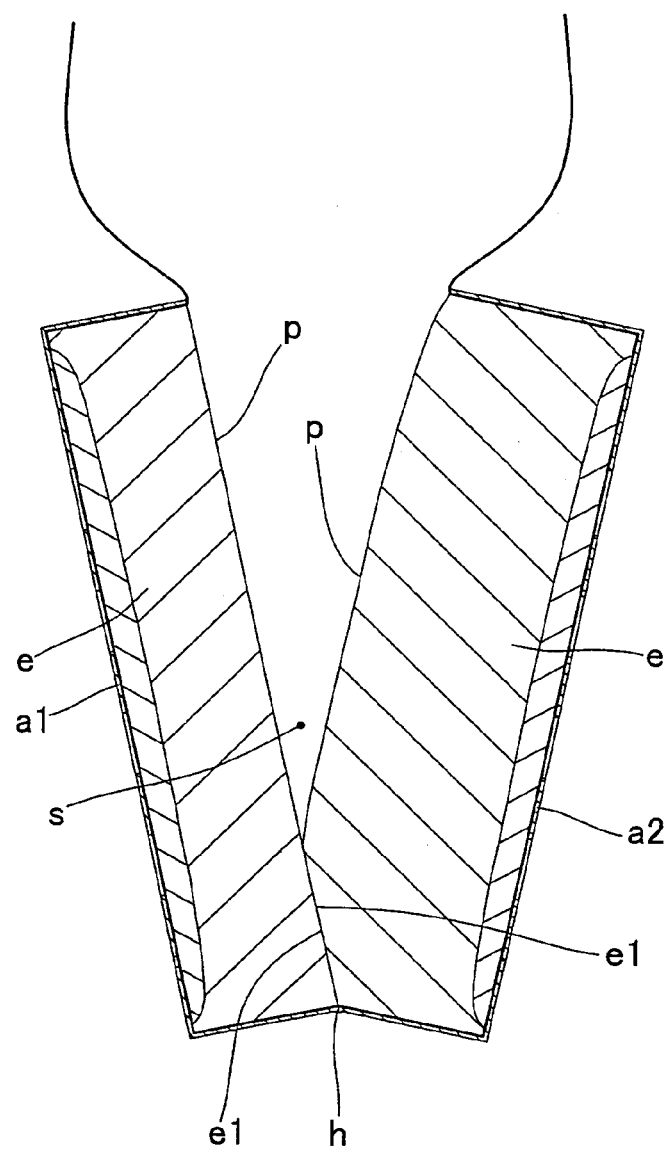
FIG. 88 is a cross sectional view showing the process of bending the containers filled with the rice.
Figure 89:
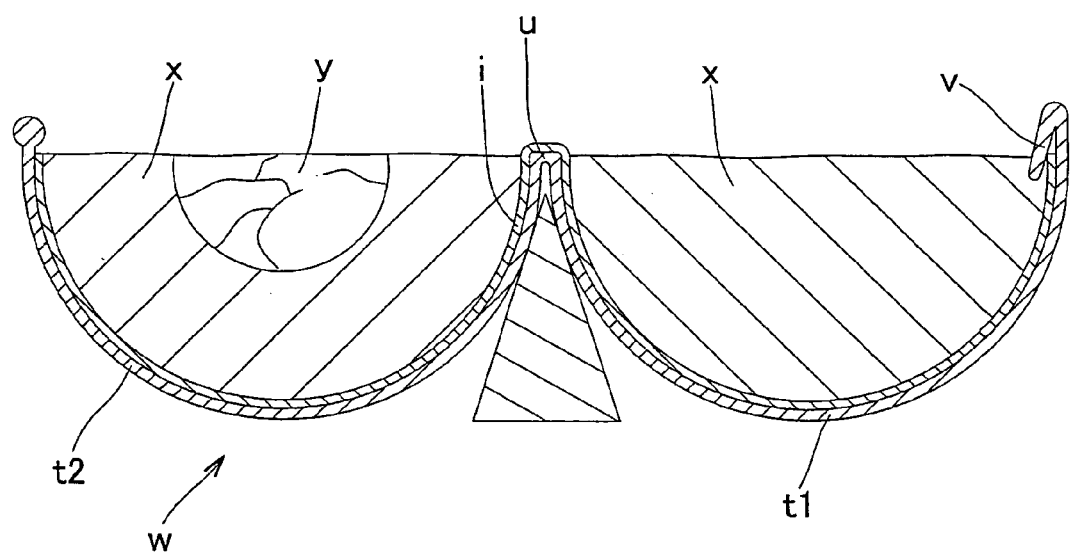
FIG. 89 is a cross sectional view showing a conventional sushi-roll making implement in a state that the vinegared rice and the filling are contained in the two rolling cylinder parts.
Figure 90:
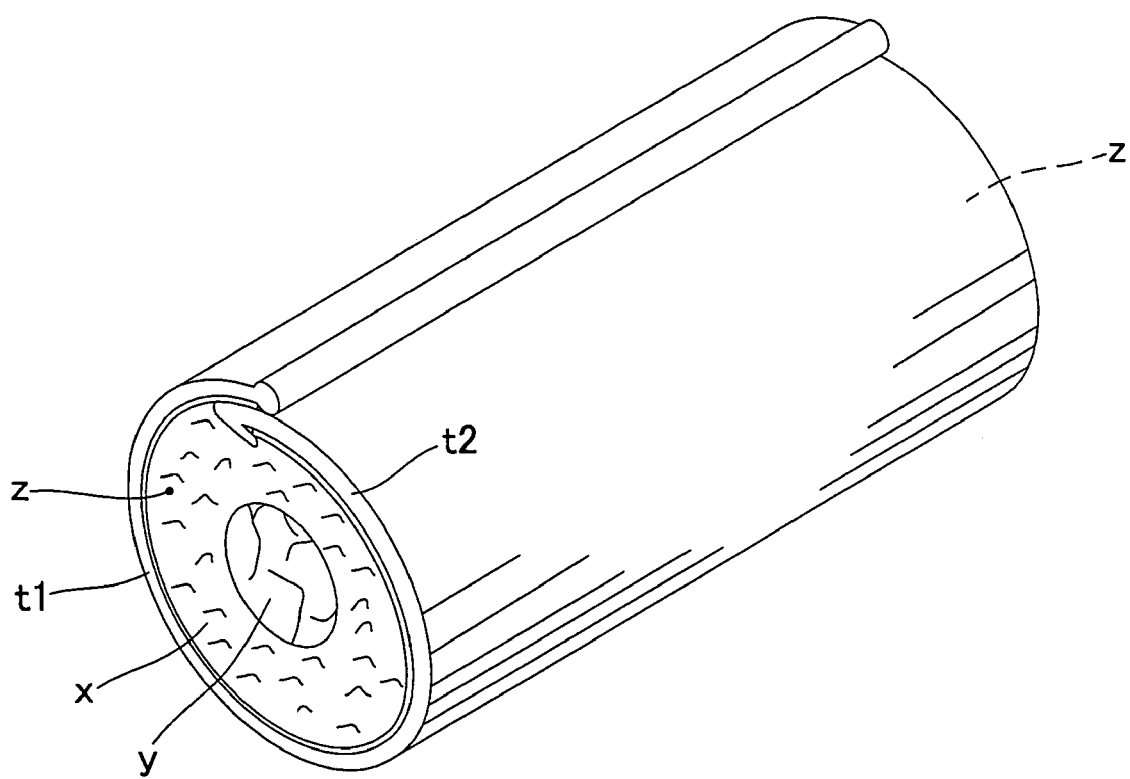
FIG. 90 is a perspective view showing the sushi-roll made by fastening and compacting the two rolling cylinder parts.

(9) FIG. 76 shows another embodiment of the rice-ball making implement 1 of this invention, in which the bend part 5 connecting the upper edges 22, 22 of the base-end standing wall 12, 12 of the right and left containers 3, 3 is formed to be comparatively long. FIG. 77 shows the state where the containers 3, 3 are folded at the bend part 5 in a manner of closing them. The packed rice ball 40 in a shape of a triangular prism can also be made with this implement in a way similar to the above-mentioned way.

Figure 31:
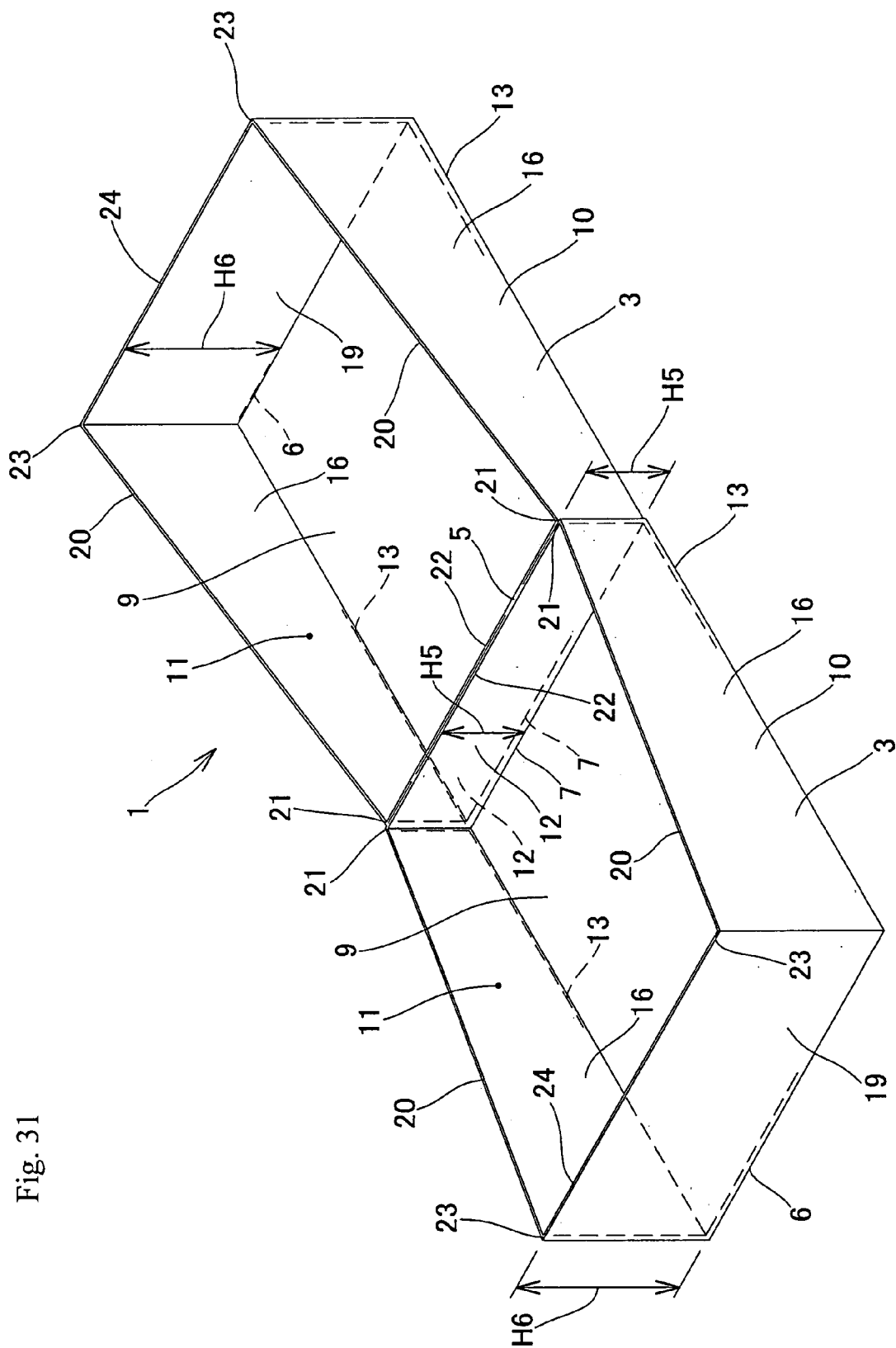
FIG. 31 is a perspective view of another embodiment of the rice-ball making implement.

(10) The structure that the compression containing part 43 is provided only in one container can also be applied to the rice-ball making implement shown in FIG. 20, and the rice-ball making implements shown in FIGS. 28, 31, etc.

(11) When the compression containing part 43 is provided only in one container like the rice-ball making implement shown in FIGS. 22-23 and FIGS. 50-51, the container is made to be larger than the other container so that the other container may enter into the container. Alternatively, the other container may be made larger than the container so that the container may enter into the other container.

(12) The containers 3a, 3b may also be formed to have a shape of a regular hexagonal prism, a regular octagonal prism, a regular triangular prism or the like, by which the rice ball in the shape of the regular hexagonal prism, the regular octagonal prism, the regular triangular prism or the like can be made.

(13) When the packed rice ball packed by the rice-ball making implement is for sale, an inner surface of the container may be utilized for advertisement. Since it is considered that the outer container 3b which is larger should be opened first in many cases, when the rice ball is taken out, use of an inner surface 92 of the outer container 3b for the advertisement is more effective from the view point of advertisement, since the advertisement is seen as soon as the outer container 3b is opened.

What is claimed is:

1. A rice-ball making implement comprising two containers having opened tops and being connected to each other to be openable/closeable,
   each of said containers being interconnected by a bend part interconnecting upper edges of opposite base-end standing walls comprising;
      a base element,
      standing walls with necessary heights projecting from outer peripheral edges of one side of the base element,
   a containing part formed between the base element and the standing walls to contain foodstuff,
   wherein:
      a height of each of upper edges of two side-part standing walls extending from both ends of a base-end standing wall toward a front-side is set to be substantially the same as that of an upper edge of the base-end standing wall near the base end but the height gradually increases toward the front end,
      the heights of the upper edges of the two side-part standing walls are set to be substantially the same,
      front ends of the two side-part standing walls are connected by a front-end standing wall,
      a height of the upper edge of the front-end standing wall is set to be substantially the same as that of the front ends of the upper edges of the side-part standing walls, and
      the container is made to be slightly larger than the other container so that the side-part standing walls and the front-end standing wall of the latter container may overlap with insides of the side-part standing walls and the front-end standing wall of the former container when the two containers are bent at the bend part in a manner of closing them.

2. A rice-ball making implement comprising two containers having opened tops and being connected to each other to be openable/closeable,
   said containers being interconnected by a bend part interconnecting upper edges of opposite base-end standing walls comprising;
      base elements,
      standing walls with necessary heights projecting from outer peripheral edges of each of the sides of the base elements,
      containing parts formed between the base elements and the standing walls, respectively, to contain the foodstuff,
   wherein:
      a height of the upper edge of the two side-part standing walls extending from both ends of a base-end standing wall toward a front-side of one of the containers is set to be substantially the same as that of an upper edge of the base-end standing wall near the base end but the height gradually increases toward the front end,
      the heights of the upper edges of the two side-part standing walls are set to be substantially the same,
      front ends of the two side-part standing walls are connected by a front-end standing wall,
      a height of the upper edge of the front-end standing wall is set to be substantially the same as that of the front ends of the upper edges of the side-part standing walls, and
      the container is made to be slightly larger than the other container so that the side-part standing walls and the front-end standing wall of the latter container may overlap with insides of the side-part standing walls and the front-end standing wall of the former container when the two containers are bent at the bend part in a manner of closing them.

3. A rice-ball making implement comprising two containers having opened tops and being connected to each other to be openable/closeable, each of said containers being interconnected by a bend part interconnecting upper edges of opposite base-end standing walls comprising;

a base element, standing walls with necessary heights projecting from outer peripheral edges of one side of the base element, a containing part formed between the base element and the standing walls to contain the foodstuff, wherein:

a height of each of upper edges of two side-part standing walls extending from both ends of a base-end standing wall toward a front-side is set to be substantially the same as that of an upper edge of the base-end standing wall near the base end but the height gradually increases toward the front end, the heights of the upper edges of the two side-part standing walls are set to be substantially the same, front ends of the two side-part standing walls are connected with each other, the container is made to be slightly larger than the other container so that the side-part standing walls and the front-end standing wall of the latter container may overlap with insides of the side-part standing walls and the front-end standing wall of the former container when the two containers are bent at the bend part in a manner of closing them.

4. A rice-ball making implement comprising two containers having opened tops and being connected to each other to be openable/closeable, said containers being interconnected by a bend part interconnecting upper edges of opposite base-end standing walls comprising;

base elements, standing walls with necessary heights projecting from outer peripheral edges of each of the sides of the base elements, containing parts formed between the base elements and the standing walls, respectively, to contain the foodstuff, wherein:

a height of the upper edge of the two side-part standing walls extending from both ends of a base-end standing wall toward a front-side of one of the containers is set to be substantially the same as that of an upper edge of the base-end standing wall near the base end but the height gradually increases toward the front end, the heights of the upper edges of the two side-part standing walls are set to be substantially the same, front ends of the two side-part standing walls are connected with each other, and the container is made to be slightly larger than the other container so that the side-part standing walls and the front-end standing wall of the latter container may overlap with insides of the side-part standing walls and the front-end standing wall of the former container when the two containers are bent at the bend part in a manner of closing them.

5. The rice-ball making implement according to claim 1, wherein the front ends of the upper edges of the side-part standing walls are set to be twice as tall as the height of the upper edge of the base-end standing wall.

6. The rice-ball making implement according to claim 2, wherein the front ends of the upper edges of the side-part standing walls are set to be twice as tall as the height of the upper edge of the base-end standing wall.

7. The rice-ball making implement according to claim 3, wherein the front ends of the upper edges of the side-part standing walls are set to be twice as tall as the height of the upper edge of the base-end standing wall.

8. The rice-ball making implement according to claim 4, wherein the front ends of the upper edges of the side-part standing walls are set to be twice as tall as the height of the upper edge of the base-end standing wall.

9. The rice-ball making implement comprising two containers having opened tops and being connected to each other to be openable/closeable, said containers comprising;

half-circular-arc-shaped base elements bent to form the half-circular arc shape, side elements for closing two end-opening parts at both sides of the base elements, respectively, so that the containing part for containing the foodstuff may be formed between the base elements and the side elements, and the bend part connecting the base ends of the base elements to each other, wherein:

the height of the upper edges of the side elements of the two containers gradually increases from the base end toward the front end, and one of the containers is made to be slightly larger than the other so that the front-side part and the two side elements of the latter container may overlap the insides of the front-side part and the two side elements of the former container when the containers are bent at the bend part in a manner of closing them.

10. The rice-ball making implement comprising two containers having opened tops and being connected to each other to be openable/closeable, said containers comprising;

half-circular-arc-shaped base elements bent to form the half-circular arc shape, side elements for closing two end-opening parts at both sides of the base elements, respectively, so that the containing part for containing the foodstuff may be formed between the base elements and the side elements, and the bend part connecting the base ends of the base elements to each other, wherein:

the height of the upper edges of the side elements of one of the containers gradually increases from the base end toward the front end, and one of the containers is made to be slightly larger than the other so that the front-side part and the two side elements of the latter container may overlap the insides of the front-side part and the two side elements of the former container when the containers are bent at the bend part in a manner of closing them.

11. The rice-ball making implement according to claim 1, further comprising a slit formed at a part connecting the base element and the standing walls.

12. The rice-ball making implement according to claim 2, further comprising a slit formed at a part connecting the base element and the standing walls.

13. The rice-ball making implement according to claim 3, further comprising a slit formed at a part connecting the base element and the standing walls.

14. The rice-ball making implement according to claim 4, further comprising a slit formed at a part connecting the base element and the standing walls.

15. The rice-ball making implement according to claim 9, further comprising a slit formed at a part connecting the base element and the side elements.

16. The rice-ball making implement according to claim 10, further comprising a slit formed at a part connecting the base element and the side elements.

* * * * *